US012650627B2

(12) United States Patent
Harrold et al.

(10) Patent No.: US 12,650,627 B2
(45) Date of Patent: Jun. 9, 2026

(54) MARKS FOR ANGULAR OPTICAL FILTERS

(71) Applicant: RealD Spark, LLC, Boulder, CO (US)

(72) Inventors: Jonathan Harrold, Leamington Spa (GB); Graham J. Woodgate, Henley-on-Thames (GB); Michael G Robinson, Boulder, CO (US); Robert Ramsey, Boulder, CO (US); Ben Ihas, Boulder, CO (US)

(73) Assignee: RealD Spark, LLC, Boulder, CO (US)

( * ) Notice: Subject to any disclaimer, the term of this patent is extended or adjusted under 35 U.S.C. 154(b) by 2 days.

(21) Appl. No.: 18/609,272

(22) Filed: Mar. 19, 2024

(65) Prior Publication Data

US 2024/0329471 A1 Oct. 3, 2024

Related U.S. Application Data

(60) Provisional application No. 63/455,368, filed on Mar. 29, 2023.

(51) Int. Cl.
*G02F 1/1347* (2006.01)
*G02F 1/13* (2006.01)
(Continued)

(52) U.S. Cl.
CPC ........ *G02F 1/13471* (2013.01); *G02F 1/1323* (2013.01); *G02F 1/133374* (2021.01);
(Continued)

(58) Field of Classification Search
CPC ............. G02F 1/133374; G02F 1/1347; G02F 1/13471; G02F 1/1323; G02F 1/133531; G02F 1/133536; G02F 1/133638; G02F 1/133738; G02F 1/133742; G02F 1/133761; G02F 1/13398; G02F 1/134363
See application file for complete search history.

(56) References Cited

U.S. PATENT DOCUMENTS 3,914,022 A 10/1975 Kashnow
4,059,916 A 11/1977 Tachihara et al.
(Continued)

FOREIGN PATENT DOCUMENTS

CA 2222313 A1 6/1998
CN 1125943 C 10/2003
(Continued)

OTHER PUBLICATIONS

CN201980056022.0 Notification of the Second Office Action dated Jul. 26, 2024.
(Continued)

*Primary Examiner* — Jessica M Merlin
(74) *Attorney, Agent, or Firm* — Foley & Lardner LLP

(57) ABSTRACT

A privacy display comprises a spatial light modulator and a view angle control element that may comprise a first polariser that may be a reflective polariser, a liquid crystal retarder, a compensation retarder and an additional polariser. The layer of liquid crystal material is patterned with a mark. The display provides visibility of the mark in reflected light to an off-axis snooper but no visibility of the image on the spatial light modulator; and provides high visibility of an image with no visibility of the mark to an on-axis display user.

40 Claims, 41 Drawing Sheets

(51) Int. Cl.

| | |
|---|---|
| *G02F 1/1333* | (2006.01) |
| *G02F 1/1335* | (2006.01) |
| *G02F 1/13363* | (2006.01) |
| *G02F 1/1337* | (2006.01) |
| *G02F 1/1339* | (2006.01) |
| *G02F 1/1343* | (2006.01) |

(52) U.S. Cl.
CPC .. *G02F 1/133531* (2021.01); *G02F 1/133536* (2013.01); *G02F 1/133638* (2021.01); *G02F 1/133738* (2021.01); *G02F 1/133742* (2021.01); *G02F 1/133761* (2021.01); *G02F 1/13398* (2021.01); *G02F 1/134363* (2013.01)

(56) References Cited

U.S. PATENT DOCUMENTS

| | | | |
|---|---|---|---|
| 4,586,790 | A | 5/1986 | Umeda et al. |
| 4,621,898 | A | 11/1986 | Cohen |
| 4,974,941 | A | 12/1990 | Gibbons et al. |
| 5,005,108 | A | 4/1991 | Pristash et al. |
| 5,035,491 | A | 7/1991 | Kawagishi et al. |
| 5,126,882 | A | 6/1992 | Oe et al. |
| 5,579,139 | A | 11/1996 | Abileah et al. |
| 5,608,550 | A | 3/1997 | Epstein et al. |
| 5,658,490 | A | 8/1997 | Sharp et al. |
| 5,671,994 | A | 9/1997 | Tai et al. |
| 5,715,028 | A | 2/1998 | Abileah et al. |
| 5,726,729 | A | 3/1998 | Takei |
| 5,779,337 | A | 7/1998 | Saito et al. |
| 5,791,757 | A | 8/1998 | O'Neil et al. |
| 5,808,784 | A | 9/1998 | Ando et al. |
| 5,835,166 | A | 11/1998 | Hall et al. |
| 5,852,509 | A | 12/1998 | Coleman |
| 5,854,872 | A | 12/1998 | Tai |
| 5,894,361 | A | 4/1999 | Yamazaki et al. |
| 5,914,760 | A | 6/1999 | Daiku |
| 5,997,148 | A | 12/1999 | Ohkawa |
| 6,055,103 | A | 4/2000 | Woodgate et al. |
| 6,099,758 | A | 8/2000 | Verrall et al. |
| 6,144,433 | A | 11/2000 | Tillin et al. |
| 6,169,589 | B1 | 1/2001 | Kaneko |
| 6,204,904 | B1 | 3/2001 | Tillin et al. |
| 6,222,672 | B1 | 4/2001 | Towler et al. |
| 6,280,043 | B1 | 8/2001 | Ohkawa |
| 6,364,497 | B1 | 4/2002 | Park et al. |
| 6,379,016 | B1 | 4/2002 | Boyd et al. |
| 6,392,727 | B1 | 5/2002 | Larson et al. |
| 6,437,915 | B2 | 8/2002 | Moseley et al. |
| 6,731,355 | B2 | 5/2004 | Miyashita |
| 6,752,505 | B2 | 6/2004 | Parker et al. |
| 6,987,550 | B2 | 1/2006 | Takato et al. |
| 7,067,985 | B2 | 6/2006 | Adachi |
| 7,072,096 | B2 | 7/2006 | Holman et al. |
| 7,163,319 | B2 | 1/2007 | Kuo et al. |
| 7,227,602 | B2 | 6/2007 | Jeon et al. |
| 7,366,392 | B2 | 4/2008 | Honma et al. |
| 7,524,542 | B2 | 4/2009 | Kim et al. |
| 7,528,893 | B2 | 5/2009 | Schultz et al. |
| 7,528,913 | B2 | 5/2009 | Kobayashi |
| 7,633,586 | B2 | 12/2009 | Winlow et al. |
| 7,660,047 | B1 | 2/2010 | Travis et al. |
| 7,766,534 | B2 | 8/2010 | Iwasaki |
| 7,834,834 | B2 | 11/2010 | Takatani et al. |
| 7,970,246 | B2 | 6/2011 | Travis et al. |
| 7,991,257 | B1 | 8/2011 | Coleman |
| 8,070,346 | B2 | 12/2011 | Maeda et al. |
| 8,098,350 | B2 | 1/2012 | Sakai et al. |
| 8,154,686 | B2 | 4/2012 | Mather et al. |
| 8,228,476 | B2 | 7/2012 | Shibazaki |
| 8,237,876 | B2 | 8/2012 | Tan et al. |
| 8,249,408 | B2 | 8/2012 | Coleman |
| 8,262,271 | B2 | 9/2012 | Tillin et al. |
| 8,469,575 | B2 | 6/2013 | Weber et al. |
| 8,646,931 | B2 | 2/2014 | Choi et al. |
| 8,801,260 | B2 | 8/2014 | Urano et al. |
| 8,848,132 | B2 | 9/2014 | O'Neill et al. |
| 8,939,595 | B2 | 1/2015 | Choi et al. |
| 8,973,149 | B2 | 3/2015 | Buck |
| 9,195,087 | B2 | 11/2015 | Terashima |
| 9,274,260 | B2 | 3/2016 | Urano et al. |
| 9,304,241 | B2 | 4/2016 | Wang et al. |
| 9,324,234 | B2 | 4/2016 | Ricci et al. |
| 9,448,355 | B2 | 9/2016 | Urano et al. |
| 9,501,036 | B2 | 11/2016 | Kang et al. |
| 9,519,153 | B2 | 12/2016 | Robinson et al. |
| 9,541,698 | B2 | 1/2017 | Wheatley et al. |
| 9,798,169 | B2 | 10/2017 | Su et al. |
| 9,939,675 | B2 | 4/2018 | Peng et al. |
| 10,054,732 | B2 | 8/2018 | Robinson et al. |
| 10,067,726 | B2 | 9/2018 | Wakamoto et al. |
| 10,126,575 | B1 | 11/2018 | Robinson et al. |
| 10,146,093 | B2 | 12/2018 | Sakai et al. |
| 10,216,018 | B2 | 2/2019 | Fang et al. |
| 10,288,914 | B2 | 5/2019 | Chung et al. |
| 10,303,030 | B2 | 5/2019 | Robinson et al. |
| 10,401,638 | B2 | 9/2019 | Robinson et al. |
| 10,424,232 | B2 | 9/2019 | Schubert et al. |
| 10,488,705 | B2 | 11/2019 | Xu et al. |
| 10,527,775 | B2 | 1/2020 | Yang et al. |
| 10,627,670 | B2 | 4/2020 | Robinson et al. |
| 10,649,248 | B1 | 5/2020 | Jiang et al. |
| 10,649,259 | B2 | 5/2020 | Lee et al. |
| 10,712,608 | B2 | 7/2020 | Robinson et al. |
| 10,802,356 | B2 | 10/2020 | Harrold et al. |
| 10,935,714 | B2 | 3/2021 | Woodgate et al. |
| 10,948,648 | B2 | 3/2021 | Ihas et al. |
| 10,976,578 | B2 | 4/2021 | Robinson et al. |
| 11,016,341 | B2 | 5/2021 | Robinson et al. |
| 11,070,791 | B2 | 7/2021 | Woodgate et al. |
| 11,079,645 | B2 | 8/2021 | Harrold et al. |
| 11,079,646 | B2 | 8/2021 | Robinson et al. |
| 11,092,851 | B2 | 8/2021 | Robinson et al. |
| 11,092,852 | B2 | 8/2021 | Robinson et al. |
| 11,099,433 | B2 | 8/2021 | Robinson et al. |
| 11,099,447 | B2 | 8/2021 | Woodgate et al. |
| 11,099,448 | B2 | 8/2021 | Woodgate et al. |
| 11,237,417 | B2 | 2/2022 | Woodgate et al. |
| 11,327,358 | B2 | 5/2022 | Robinson et al. |
| 11,340,482 | B2 | 5/2022 | Robinson et al. |
| 11,366,358 | B2 | 6/2022 | Wu et al. |
| 11,442,316 | B2 | 9/2022 | Woodgate et al. |
| 11,573,437 | B2 | 2/2023 | Woodgate et al. |
| 11,892,717 | B2 | 2/2024 | Harrold et al. |
| 11,977,286 | B2 | 5/2024 | Woodgate et al. |
| 2001/0024561 | A1 | 9/2001 | Cornelissen et al. |
| 2002/0015300 | A1 | 2/2002 | Katsu et al. |
| 2002/0024529 | A1 | 2/2002 | Miller et al. |
| 2002/0140342 | A1 | 10/2002 | Sundahl |
| 2002/0163790 | A1 | 11/2002 | Yamashita et al. |
| 2002/0171793 | A1 | 11/2002 | Sharp et al. |
| 2003/0030764 | A1 | 2/2003 | Lee |
| 2003/0058381 | A1 | 3/2003 | Shinohara et al. |
| 2003/0089956 | A1 | 5/2003 | Allen et al. |
| 2003/0107686 | A1 | 6/2003 | Sato et al. |
| 2003/0117792 | A1 | 6/2003 | Kunimochi et al. |
| 2003/0169499 | A1 | 9/2003 | Bourdelais et al. |
| 2003/0214615 | A1 | 11/2003 | Colgan et al. |
| 2003/0222857 | A1 | 12/2003 | Abileah |
| 2004/0015729 | A1 | 1/2004 | Elms et al. |
| 2004/0100598 | A1 | 5/2004 | Adachi et al. |
| 2004/0125430 | A1 | 7/2004 | Kasajima et al. |
| 2004/0141107 | A1 | 7/2004 | Jones |
| 2004/0145703 | A1 | 7/2004 | O'Connor et al. |
| 2004/0223094 | A1 | 11/2004 | Hamada et al. |
| 2004/0240777 | A1 | 12/2004 | Woodgate et al. |
| 2004/0246418 | A1 | 12/2004 | Kumagai et al. |
| 2004/0264910 | A1 | 12/2004 | Suzuki et al. |
| 2005/0002174 | A1 | 1/2005 | Min et al. |
| 2005/0014913 | A1 | 1/2005 | Kim et al. |
| 2005/0041311 | A1 | 2/2005 | Mi et al. |
| 2005/0111100 | A1 | 5/2005 | Mather et al. |
| 2005/0117186 | A1 | 6/2005 | Li et al. |
| 2005/0135116 | A1 | 6/2005 | Epstein et al. |

(56) References Cited

U.S. PATENT DOCUMENTS

| | | |
|---|---|---|
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0206814 A1 | 9/2005 | Histake |
| 2005/0213348 A1 | 9/2005 | Parikka et al. |
| 2005/0219693 A1 | 10/2005 | Hartkop et al. |
| 2005/0243265 A1 | 11/2005 | Winlow et al. |
| 2005/0259193 A1 | 11/2005 | Sumiyoshi et al. |
| 2005/0259205 A1 | 11/2005 | Sharp et al. |
| 2005/0270798 A1 | 12/2005 | Lee et al. |
| 2006/0050209 A1 | 3/2006 | Higa |
| 2006/0066785 A1 | 3/2006 | Moriya |
| 2006/0082702 A1 | 4/2006 | Jacobs et al. |
| 2006/0092512 A1 | 5/2006 | Shioya |
| 2006/0098296 A1 | 5/2006 | Woodgate et al. |
| 2006/0146405 A1 | 7/2006 | MacMaster |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262255 A1 | 11/2006 | Wang et al. |
| 2006/0262258 A1 | 11/2006 | Wang et al. |
| 2006/0262376 A1 | 11/2006 | Mather et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0008471 A1 | 1/2007 | Wang et al. |
| 2007/0024970 A1 | 2/2007 | Lub et al. |
| 2007/0030240 A1 | 2/2007 | Sumiyoshi et al. |
| 2007/0035964 A1 | 2/2007 | Olczak |
| 2007/0040780 A1* | 2/2007 | Gass ................. G02F 1/134363 |
| | | 345/87 |
| 2007/0047254 A1 | 3/2007 | Schardt et al. |
| 2007/0064163 A1 | 3/2007 | Tan et al. |
| 2007/0076406 A1 | 4/2007 | Kodama et al. |
| 2007/0139772 A1 | 6/2007 | Wang |
| 2007/0147088 A1 | 6/2007 | Chien et al. |
| 2007/0223251 A1 | 9/2007 | Liao |
| 2007/0268427 A1 | 11/2007 | Uehara |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0106689 A1 | 5/2008 | Inoue et al. |
| 2008/0117364 A1 | 5/2008 | Matsushima |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2008/0316366 A1 | 12/2008 | Takatani et al. |
| 2009/0009894 A1 | 1/2009 | Chuang |
| 2009/0021657 A1 | 1/2009 | Yang et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109381 A1 | 4/2009 | Haruyama |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213147 A1 | 8/2009 | Sagardoyburu et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0014313 A1 | 1/2010 | Tillin et al. |
| 2010/0066960 A1 | 3/2010 | Smith et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0187704 A1 | 7/2010 | Hsu et al. |
| 2010/0205667 A1 | 8/2010 | Anderson et al. |
| 2010/0214324 A1 | 8/2010 | Broughton et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0309204 A1 | 12/2010 | Smith et al. |
| 2010/0328438 A1 | 12/2010 | Ohyama et al. |
| 2011/0018860 A1 | 1/2011 | Parry-Jones et al. |
| 2011/0032437 A1 | 2/2011 | Yoshimi et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0020078 A1 | 1/2012 | Chang |
| 2012/0086875 A1 | 4/2012 | Yokota |
| 2012/0086893 A1 | 4/2012 | Ou et al. |
| 2012/0113158 A1 | 5/2012 | Goto et al. |
| 2012/0120351 A1 | 5/2012 | Kawata |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0170315 A1 | 7/2012 | Fan et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0050610 A1 | 2/2013 | Parry-Jones et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0120817 A1 | 5/2013 | Yoon et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308185 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0104147 A1 | 4/2014 | Nakahara et al. |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0185322 A1 | 7/2014 | Liao |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0313464 A1 | 10/2014 | Li et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0029449 A1 | 1/2015 | Woo et al. |

(56) References Cited

U.S. PATENT DOCUMENTS

| | | |
|---|---|---|
| 2015/0035872 A1 | 2/2015 | Shima et al. |
| 2015/0055366 A1 | 2/2015 | Chang et al. |
| 2015/0088284 A1 | 3/2015 | Hendricks et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293273 A1 | 10/2015 | Chen et al. |
| 2015/0293289 A1 | 10/2015 | Shinohara et al. |
| 2015/0293409 A1 | 10/2015 | Usukura et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0154458 A1 | 6/2016 | Liu et al. |
| 2016/0216420 A1 | 7/2016 | Gaides et al. |
| 2016/0216540 A1* | 7/2016 | Cho .................... G02F 1/13471 |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0291358 A1 | 10/2016 | Kikuchi et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0023725 A1 | 1/2017 | Oki et al. |
| 2017/0031206 A1 | 2/2017 | Smith et al. |
| 2017/0085869 A1 | 3/2017 | Choi et al. |
| 2017/0090103 A1 | 3/2017 | Holman |
| 2017/0090237 A1 | 3/2017 | Kim et al. |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1 | 1/2018 | Newman |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0210253 A1 | 7/2018 | Kashima |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1* | 11/2018 | Robinson ............ G02F 1/13363 |
| 2018/0321553 A1 | 11/2018 | Robinson et al. |
| 2018/0329245 A1* | 11/2018 | Robinson .......... G02F 1/134309 |
| 2018/0364526 A1 | 12/2018 | Finnemeyer et al. |
| 2019/0056628 A1 | 2/2019 | Inokuchi |
| 2019/0086706 A1 | 3/2019 | Robinson et al. |
| 2019/0121173 A1 | 4/2019 | Robinson et al. |
| 2019/0146134 A1 | 5/2019 | Miura et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0331944 A1 | 10/2019 | Fang et al. |
| 2019/0339433 A1 | 11/2019 | Benoit et al. |
| 2019/0353944 A1 | 11/2019 | Acreman et al. |
| 2019/0361165 A1 | 11/2019 | Chang et al. |
| 2020/0004058 A1* | 1/2020 | Harrold ................ G02B 6/0038 |
| 2020/0019006 A1 | 1/2020 | Robinson et al. |
| 2020/0026114 A1 | 1/2020 | Harrold et al. |
| 2020/0026125 A1 | 1/2020 | Robinson et al. |
| 2020/0041839 A1 | 2/2020 | Robinson et al. |
| 2020/0110301 A1 | 4/2020 | Harrold et al. |
| 2020/0132904 A1 | 4/2020 | Smith et al. |
| 2020/0159055 A1 | 5/2020 | Robinson et al. |
| 2020/0185590 A1 | 6/2020 | Malhotra et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2020/0409156 A1 | 12/2020 | Sissom et al. |
| 2021/0018773 A1 | 1/2021 | Woodgate et al. |
| 2021/0033898 A1* | 2/2021 | Woodgate ............... G02F 1/137 |
| 2021/0072448 A1 | 3/2021 | Peng et al. |
| 2021/0116627 A1 | 4/2021 | Tsuji |
| 2021/0149233 A1 | 5/2021 | Robinson et al. |
| 2021/0149234 A1* | 5/2021 | Woodgate ......... G02F 1/133633 |
| 2021/0271121 A1 | 9/2021 | Woodgate et al. |
| 2021/0333577 A1 | 10/2021 | Robinson et al. |
| 2021/0333580 A1 | 10/2021 | Matsushima |
| 2021/0341769 A1 | 11/2021 | Woodgate et al. |
| 2021/0373382 A1 | 12/2021 | Sakai et al. |
| 2022/0269128 A1 | 8/2022 | Matsushima |
| 2022/0404540 A1 | 12/2022 | Robinson et al. |
| 2022/0413338 A1 | 12/2022 | Matsushima et al. |
| 2023/0099000 A1 | 3/2023 | Harrold et al. |
| 2023/0254457 A1 | 8/2023 | Robinson et al. |
| 2023/0375863 A1 | 11/2023 | Woodgate et al. |

FOREIGN PATENT DOCUMENTS

| | | |
|---|---|---|
| CN | 1690800 A | 11/2005 |
| CN | 1776484 A | 5/2006 |
| CN | 101042449 A | 9/2007 |
| CN | 101256251 A | 9/2008 |
| CN | 101435952 A | 5/2009 |
| CN | 101454712 A | 6/2009 |
| CN | 101518095 A | 8/2009 |
| CN | 101681061 A | 3/2010 |
| CN | 102540544 A | 7/2012 |
| CN | 103109226 A | 5/2013 |
| CN | 103473494 A | 12/2013 |
| CN | 103688211 A | 3/2014 |
| CN | 103988121 A | 8/2014 |
| CN | 104133292 A | 11/2014 |
| CN | 104303085 A | 1/2015 |
| CN | 104321686 A | 1/2015 |
| CN | 104380177 A | 2/2015 |
| CN | 104597661 A | 5/2015 |
| CN | 204740413 U | 11/2015 |
| CN | 105842909 A | 8/2016 |
| CN | 105960609 A | 9/2016 |
| CN | 106104372 A | 11/2016 |

(56) References Cited

FOREIGN PATENT DOCUMENTS

| | | | |
|---|---|---|---|
| CN | 106415342 A | 2/2017 |
| CN | 106557711 A | 4/2017 |
| CN | 107102460 A | 8/2017 |
| CN | 209171779 U | 7/2019 |
| EP | 1326102 A1 | 7/2003 |
| EP | 1060344 B1 | 5/2004 |
| EP | 1956423 A1 | 8/2008 |
| EP | 2037318 A1 | 3/2009 |
| GB | 2405542 A | 3/2005 |
| GB | 2415850 A | 1/2006 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | S58143305 A | 8/1983 |
| JP | H01130783 U | 9/1989 |
| JP | H09197405 A | 7/1997 |
| JP | H10268251 A | 10/1998 |
| JP | H11174489 A | 7/1999 |
| JP | 2005316470 A | 11/2005 |
| JP | 2005345799 A | 12/2005 |
| JP | 2006139160 A | 6/2006 |
| JP | 2006201326 A | 8/2006 |
| JP | 2006330164 A | 12/2006 |
| JP | 2007501966 A | 2/2007 |
| JP | 2007148279 A | 6/2007 |
| JP | 2007273288 A | 10/2007 |
| JP | 2008310271 A | 12/2008 |
| JP | 2009020293 A | 1/2009 |
| JP | 2011095719 A | 5/2011 |
| JP | 2011103241 A | 5/2011 |
| JP | 2013160818 A | 8/2013 |
| JP | 2014032953 A | 2/2014 |
| JP | 2014099363 A | 5/2014 |
| KR | 20090106062 A | 10/2009 |
| KR | 20090108231 A | 10/2009 |
| KR | 20120011228 A | 2/2012 |
| KR | 101227145 B1 | 2/2013 |
| KR | 20130046116 A | 5/2013 |
| KR | 1020150021937 A | 3/2015 |
| KR | 20160053264 A | 5/2016 |
| KR | 1020170013915 A | 2/2017 |
| KR | 1020170019006 A | 2/2017 |
| KR | 1020170040565 A | 4/2017 |
| KR | 101990286 B1 | 6/2019 |
| TW | M537663 U | 3/2017 |
| TW | I612360 B | 1/2018 |
| WO | 2005071449 A2 | 8/2005 |
| WO | 2005071474 A2 | 8/2005 |
| WO | 2006030702 A1 | 3/2006 |
| WO | 2008001896 A1 | 1/2008 |
| WO | 2008078764 A1 | 7/2008 |
| WO | 2008093445 A1 | 8/2008 |
| WO | 2009008406 A1 | 1/2009 |
| WO | 2009011199 A1 | 1/2009 |
| WO | 2010021926 A2 | 2/2010 |
| WO | 2010101141 A1 | 9/2010 |
| WO | 2010143705 A1 | 12/2010 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2017065745 A1 | 4/2017 |
| WO | 2017117570 A1 | 7/2017 |
| WO | 2018003380 A1 | 1/2018 |
| WO | 2018035492 A1 | 2/2018 |
| WO | 2018178790 A1 | 10/2018 |
| WO | 2018208618 A1 | 11/2018 |
| WO | 2018221413 A1 | 12/2018 |
| WO | 2019055755 A1 | 3/2019 |
| WO | 2019067846 A1 | 4/2019 |
| WO | 2019090252 A1 | 5/2019 |
| WO | 2019147762 A1 | 8/2019 |
| WO | 2021003383 A1 | 1/2021 |

OTHER PUBLICATIONS

CN202080079843.9 Notification of the First Office Action dated Jul. 18, 2024.
EP21849510.9 Extended European Search Report of European Patent Office dated Jun. 19, 2024.
EP21849888.9 Extended European Search Report of European Patent Office dated Jul. 1, 2024.
KR10-2020-7024291 Notice of Preliminary Rejection mailed Jun. 13, 2024.
PCT/US2024/020519 International search report and written opinion of the international searching authority mailed Jun. 17, 2024.
Adachi, et al. "P-228L: Late-News Poster: Controllable Viewing-Angle Displays using a Hybrid Aligned Nematic Liquid Crystal Cell", ISSN, SID 2006 Digest, pp. 705-708.
Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
Cheng, et al., "Fast-Response Liquid Crystal Variable Optical Retarder and Multilevel Attenuator," Optical Engineering 52 (10), 107105 (Oct. 16, 2013). (Year: 2013).
Chiu, et al, "Advanced Hyoer-Viewing Angle Controllable LCD", 39-1 / M.-H. Chiu Invited Paper; AUO Technology Center, AU Optronics Corp., Hsinchu, Taiwan, SID 2021 Digest, ISSN 0097-996X/21/5202-0543, pp. 543-545.
CN201680061632.6 Notification of the First Office Action dated Sep. 14, 2021.
CN201780030715.3 Notification of the First Office Action dated Jan. 21, 2020.
CN201880042320.X Notification of the First Office Action dated May 25, 2021.
CN-201880042320.X Notification of the Third Office Action from the Chinese Patent Office dated Dec. 30, 2022.
CN201880073578.6 Notification of the First Office Action dated Aug. 27, 2021.
CN-201980020303.0—Notification of the First Office Action dated Dec. 16, 2021.
CN201980030279.9 Notification of the First Office Action dated Mar. 29, 2022.
CN201980056000.4 Notification of the First Office Action dated Nov. 1, 2023.
CN201980056022.0 Notification of the First Office Action dated Oct. 23, 2023.
CN-201980082757.0 Notification of the 1st Office Action of the Chinese Patent Office mailed Dec. 5, 2022.
CN202080020818.3 Notification of the First Office Action dated Oct. 23, 2023.
CN202080059812.7 Notification of the First Office Action dated Oct. 19, 2023.
CN202080089170.5 Notification of the First Office Action dated Apr. 7, 2024.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
EP-18857077.4 Extended European Search Report of European Patent Office dated Jun. 16, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.

(56) References Cited

OTHER PUBLICATIONS

EP19771688.9 Notification of the First Office Action dated Mar. 6, 2023.
EP-19825448.4 Extended European Search Report of European Patent Office dated Mar. 10, 2022.
EP-19881483.2 Extended European Search Report of European Patent Office dated Aug. 5, 2022.
EP-20754927.0 Extended European Search Report of European Patent Office dated Sep. 19, 2022.
EP-20835231.0 Extended European Search Report of European Patent Office dated May 15, 2023.
EP-20851155.0 Extended European Search Report of European Patent Office dated Aug. 2, 2023.
EP-20872625.7 Extended European Search Report of European Patent Office dated Sep. 20, 2023.
EP-20887527.8 Extended European Search Report of European Patent Office dated Nov. 20, 2023.
EP-20887756.3 Extended European Search Report of European Patent Office dated Jan. 2, 2024.
EP-20898295.9 Extended European Search Report of European Patent Office dated Jan. 22, 2024.
EP21795524.4 Extended European Search Report of European Patent Office dated Apr. 26, 2024.
EP21796016.0 Extended European Search Report of European Patent Office dated Apr. 29, 2024.
EP23218625.4 Extended European Search Report of European Patent Office dated Feb. 23, 2024.
Gass, et al. "Privacy LCD Technology for Cellular Phones", Sharp Laboratories of Europe Ltd, Mobile LCD Group, Feb. 2007, pp. 45-49.
Heber, "Switchable View Control using a Vertically Aligned Polarizer and Polarization Control", 31-2, siOPTICA GmbH, SID 2024 Digest, Jena, Germany, ISSN 0097-996X/24/5501, pp. 398-401.
IN202017035853 Hearing Notice dated Jan. 3, 2024.
Ishikawa, T., "New Design for a Highly Collimating Turning Film", SID 06 Digest, pp. 514-517.
JP2019-561773 Non-Final Notice of Reasons for Rejection dated Mar. 22, 2022.
JP2020-509511 Non-Final Notice of Reasons for Rejection dated Jul. 19, 2022.
JP2020-540724 Non-Final Notice of Reasons for Rejection dated Jan. 4, 2023.
JP-2020-540797 Non-Final Notice of Reasons for Rejection from the Japan Patent Office mailed Dec. 6, 2022.
JP2020-550747 Non-Final Notice of Reasons for Rejection dated Mar. 29, 2023.
JP2021-518864 Non-Final Notice of Reasons for Rejection dated Oct. 24, 2023.
JP2022-506340 Non-Final Notice of Reasons for Rejection dated Mar. 19, 2024.
JP2022-526302 Non-Final Notice of Reasons for Rejection dated Apr. 30, 2024.
Kalantar, et al. "Backlight Unit With Double Surface Light Emission," J. Soc. Inf. Display, vol. 12, Issue 4, pp. 379-387 (Dec. 2004).
PCT/US2024/025836 International search report and written opinion of the international searching authority mailed Jul. 23, 2024.
KR10-2020-7010753 Notice of Preliminary Rejection mailed Feb. 17, 2023.
KR10-2020-7024293 Notice of Preliminary Rejection mailed Dec. 7, 2023.
Nelkon et al., "Advanced Level Physics", Third edition with SI units, Heinemann Educational Books LTD, London, 1970.
PCT/US2016/058695 International search report and written opinion of the international searching authority mailed Feb. 28, 2017.
PCT/US2017/032734 International search report and written opinion of the international searching authority mailed Jul. 27, 2017.
PCT/US2018/031206 International search report and written opinion of the international searching authority mailed Jul. 20, 2018.
PCT/US2018/031218 International search report and written opinion of the international searching authority mailed Jul. 19, 2018.

PCT/US2018/051021 International search report and written opinion of the international searching authority mailed Nov. 21, 2018.
PCT/US2018/051027 International search report and written opinion of the international searching authority mailed Nov. 30, 2018.
PCT/US2018/053328 International search report and written opinion of the international searching authority mailed Nov. 30, 2018.
PCT/US2018/059249 International search report and written opinion of the international searching authority mailed Jan. 3, 2019.
PCT/US2018/059256 International search report and written opinion of the international searching authority mailed Jan. 3, 2019.
PCT/US2019/014889 International search report and written opinion of the international searching authority mailed May 24, 2019.
PCT/US2019/014902 International search report and written opinion of the international searching authority mailed Jun. 25, 2019.
PCT/US2019/023659 International search report and written opinion of the international searching authority mailed Jun. 10, 2019.
PCT/US2019/038409 International search report and written opinion of the international searching authority mailed Sep. 19, 2019.
PCT/US2019/038466 International search report and written opinion of the international searching authority mailed Nov. 5, 2019.
PCT/US2019/042027 International search report and written opinion of the international searching authority mailed Oct. 15, 2019.
PCT/US2019/054291 International search report and written opinion of the international searching authority mailed Jan. 6, 2020.
PCT/US2019/059990 International search report and written opinion of the international searching authority mailed Feb. 28, 2020.
PCT/US2019/066208 International search report and written opinion of the international searching authority mailed Feb. 27, 2020.
PCT/US2020/017537 International search report and written opinion of the international searching authority mailed Apr. 29, 2020.
PCT/US2020/040686 International search report and written opinion of the international searching authority mailed Nov. 20, 2020.
PCT/US2020/044574 International search report and written opinion of the international searching authority mailed Oct. 21, 2020.
PCT/US2020/053863 International search report and written opinion of the international searching authority mailed Mar. 12, 2021.
PCT/US2020/060155 International search report and written opinion of the international searching authority mailed Feb. 5, 2021.
PCT/US2020/060191 International search report and written opinion of the international searching authority mailed Feb. 8, 2021.
PCT/US2020/063638 International search report and written opinion of the international searching authority mailed Mar. 2, 2021.
PCT/US2020/064633 International search report and written opinion of the international searching authority mailed Mar. 15, 2021.
PCT/US2021/029937 International search report and written opinion of the international searching authority mailed Aug. 6, 2021.
PCT/US2021/029944 International search report and written opinion of the international searching authority mailed Aug. 3, 2021.
PCT/US2021/029947 International search report and written opinion of the international searching authority mailed Aug. 10, 2021.
PCT/US2021/029954 International search report and written opinion of the international searching authority mailed Aug. 10, 2021.
PCT/US2021/029958 International search report and written opinion of the international searching authority mailed Aug. 10, 2021.
PCT/US2021/043435 International search report and written opinion of the international searching authority mailed Nov. 1, 2021.
PCT/US2021/043444 International search report and written opinion of the international searching authority mailed Nov. 1, 2021.
PCT/US2022/045030 International search report and written opinion of the international searching authority mailed Jan. 3, 2023.
PCT/US2023/012240 International search report and written opinion of the international searching authority mailed Apr. 27, 2023.
PCT/US2023/012243 International search report and written opinion of the international searching authority mailed May 10, 2023.
PCT/US2023/017639 International search report and written opinion of the international searching authority mailed Jul. 6, 2023.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks for Large-Scale Image Recognition", ICLR 2015.
TW107132221 First Office Action dated Apr. 28, 2022.
TW108140291 First Office Action dated Nov. 9, 2023.

(56)       References Cited

OTHER PUBLICATIONS

Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
EP20835231.0 Notification of the First Office Action dated Nov. 27, 2024.
KR10-2022-7019753 Notice of Preliminary Rejection mailed Oct. 30, 2024.

* cited by examiner

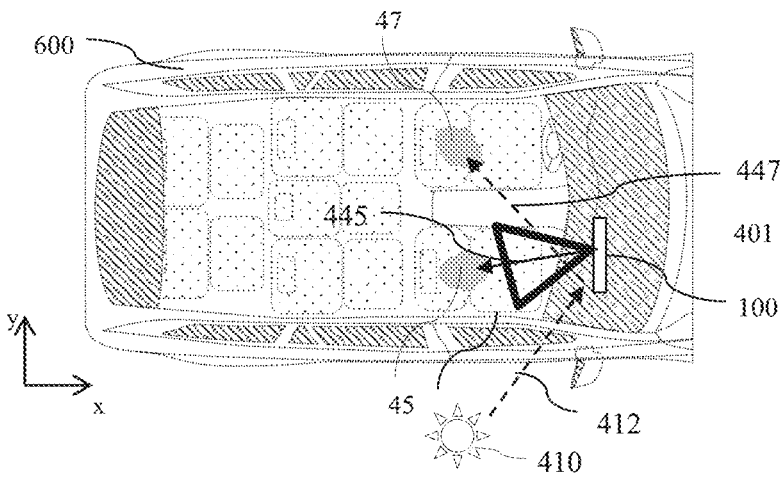
*FIG. 6*
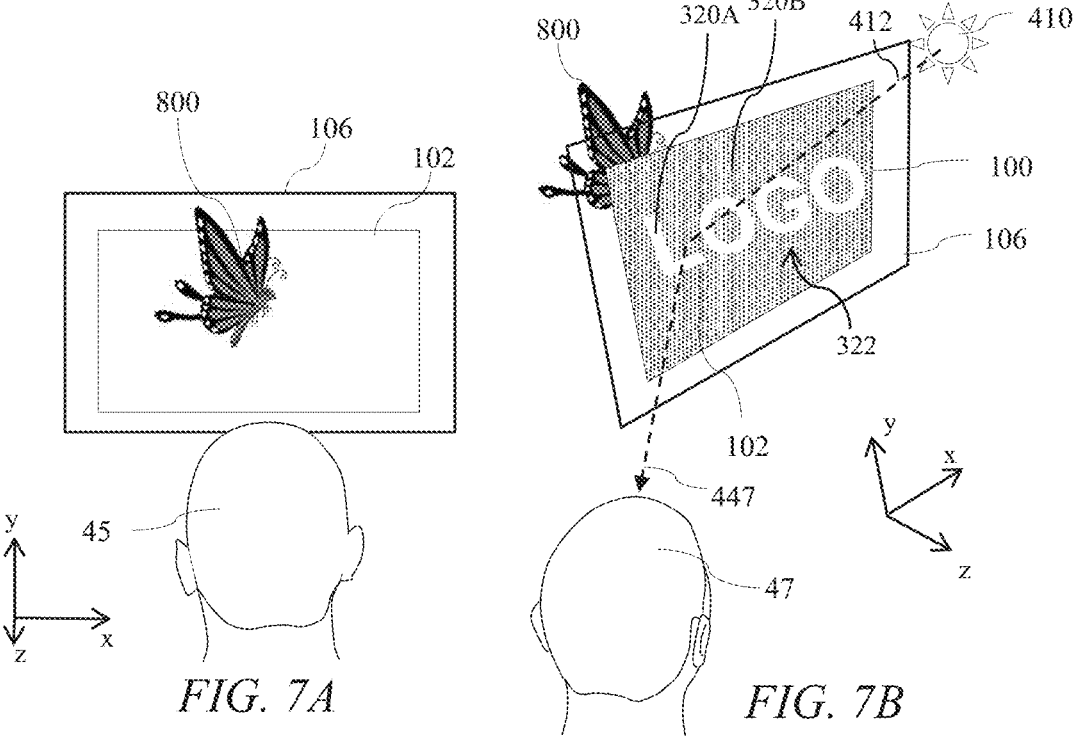
*FIG. 7A*                 *FIG. 7B*

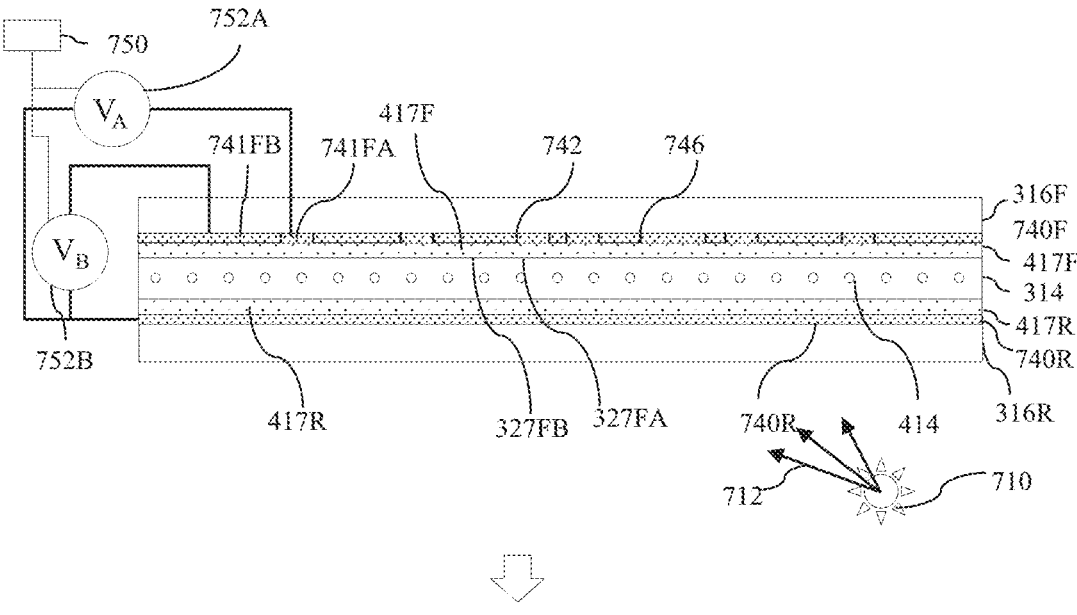
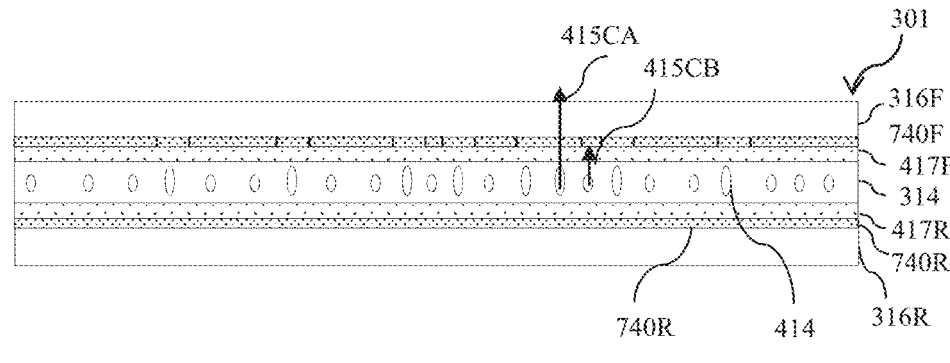
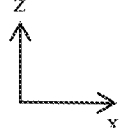
*FIG. 19B*

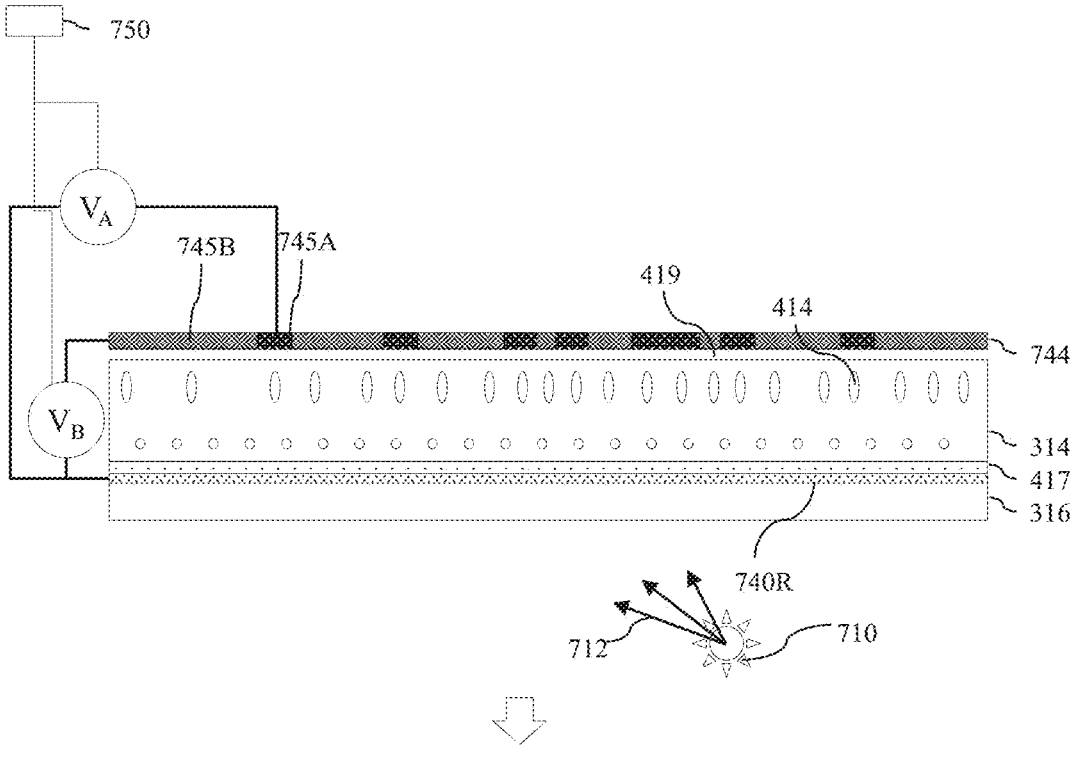
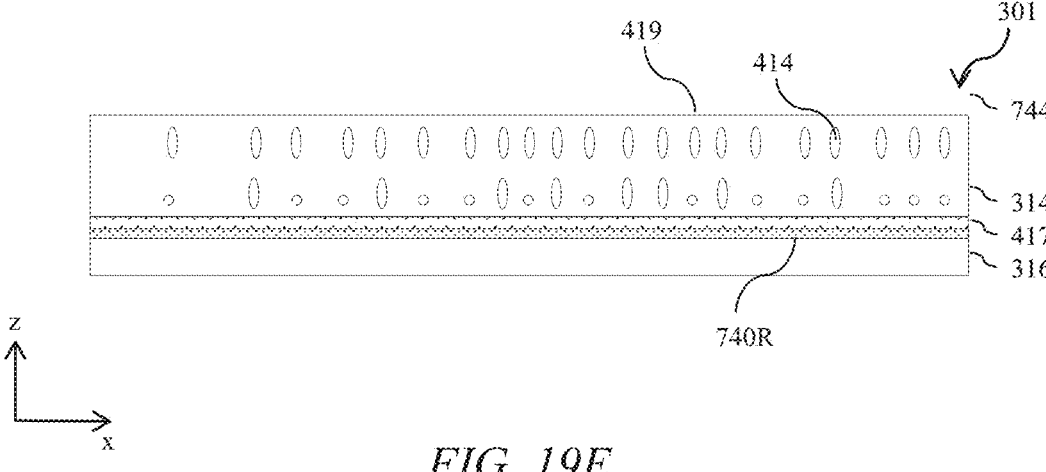
FIG. 19E

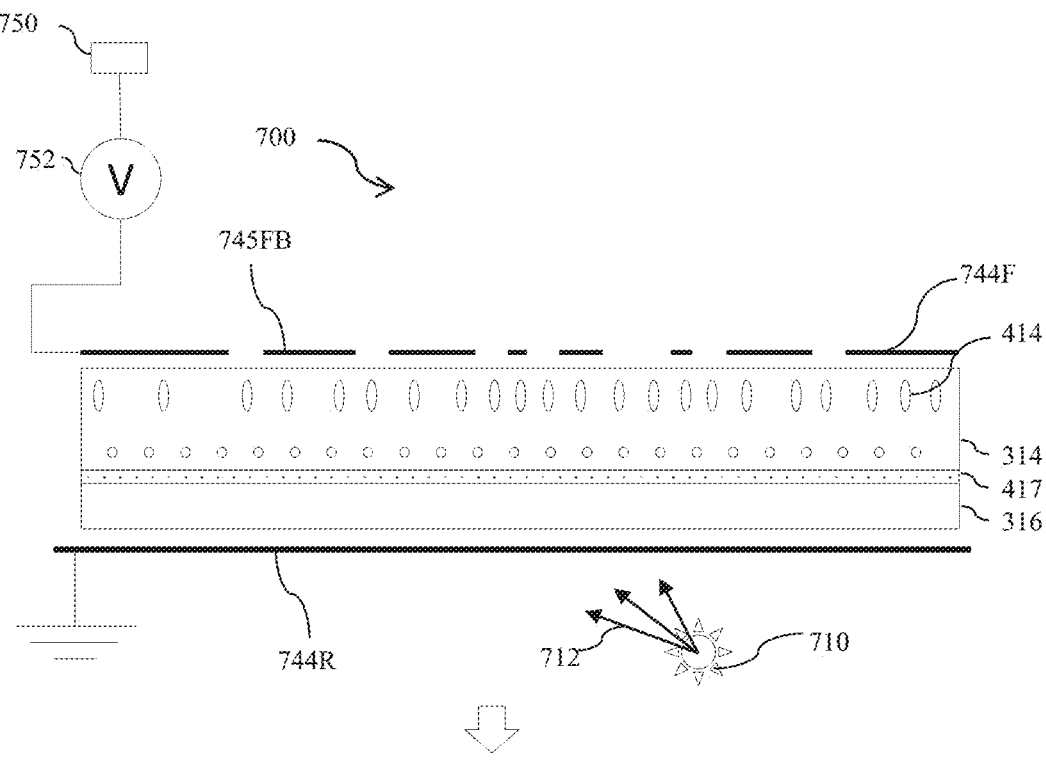
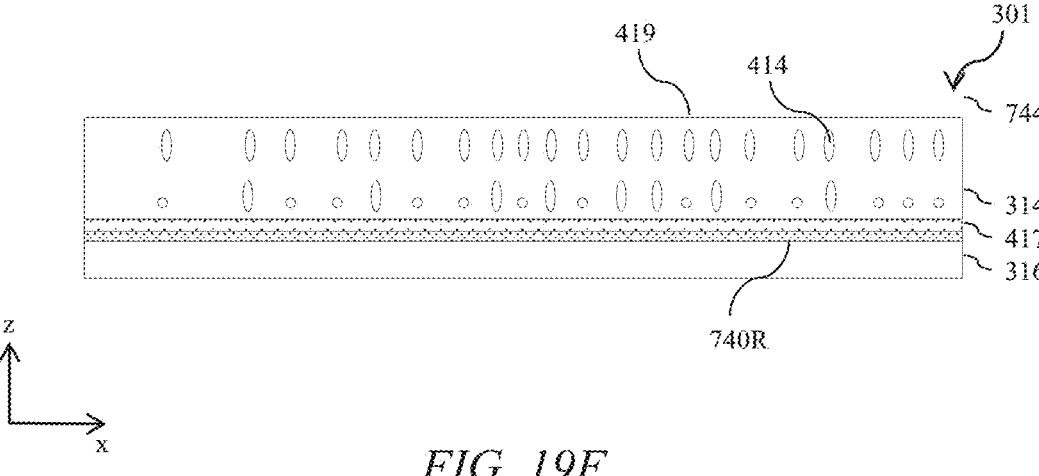
*FIG. 19F*

MARKS FOR ANGULAR OPTICAL FILTERS

TECHNICAL FIELD

This disclosure generally relates to illumination from light modulation devices, and more specifically relates to control of light for privacy display.

BACKGROUND

Privacy displays provide image visibility to a primary user that is typically in an on-axis position and reduced visibility of image content to a snooper, that is typically in an off-axis position. Privacy displays may be provided by control of the off-axis optical output. Off-axis privacy may be provided by means of contrast reduction, for example by adjusting the liquid crystal bias tilt in an In-Plane-Switching LCD. Reduced image visibility may be further provided by means of off-axis luminance reduction. Luminance reduction may be achieved by means of switchable backlights for a liquid crystal display (LCD) spatial light modulator. Off-axis luminance reduction may also be provided by switchable liquid crystal retarders and compensation retarders arranged to modulate the input and/or output directional luminance profile of a spatial light modulator. Reduced image visibility may be further provided by means of off-axis reflectivity increase. Reflectivity increase may be achieved by means of switchable liquid crystal retarders, compensation retarders that are arranged to control the polarisation of ambient light that falls onto a reflective polariser.

BRIEF SUMMARY

According to a first aspect of the present disclosure, there is provided a view angle control element for arrangement outside a first polariser that is a linear polariser, the view angle control element comprising: an additional polariser, the additional polariser being a linear polariser; and at least one polar control retarder for arrangement between the first polariser and the additional polariser, the at least one polar control retarder including a passive liquid crystal retarder comprising a layer of liquid crystal material, wherein the layer of liquid crystal material has at least one region in a shape of a mark for display to an observer arranged such that along a predetermined viewing axis, relative phase shifts are introduced to orthogonal polarisation components of light that are sufficiently small in the at least one region and the remainder of the layer of liquid crystal material that the mark is not visible; and along a non-viewing axis at a different angle from the viewing axis, relative phase shifts are introduced to orthogonal polarisation components of light that are different in the at least one region and the remainder of the layer of liquid crystal material such that the mark is visible. Advantageously a mark may be visible to a snooper while the displayed image is not visible, and for a display user the image may be visible while the mark is not visible. The view angle control element may be provided with low thickness and cost. The view angle control element may be provided as a separate stack for application by a user to an image viewing apparatus, or may be incorporated at the time of manufacture with an image viewing apparatus.

The layer of liquid crystal material may have profiles of splay of the director directions across the thickness direction of the layer of liquid crystal material that may be different in the at least one region and the remainder of the layer of liquid crystal material. A layer of liquid crystal material comprising the mark may be conveniently provided in manufacture.

The layer of liquid crystal material may have director directions at surfaces on opposite sides of the layer of liquid crystal material in the at least one region that may be one of (a) homogenous at both surfaces; (b) homogenous at one of the surfaces and homeotropic at the other of the surfaces; or (c) homeotropic at both surfaces; and the layer of liquid crystal material may have director directions at surfaces on opposite sides of the layer of liquid crystal material in the remainder of the layer of liquid crystal material may be one of (a) homogenous at both surfaces; (b) homogenous at one of the surfaces and homeotropic at the other of the surfaces; or (c) homeotropic at both surfaces, that is different from the at least one region. The alignment orientations may be arranged to reduce cost and thickness, and increase security factor in operation in a display device.

The layer of liquid crystal material may have director directions at surfaces on opposite sides of the layer of liquid crystal material that may be homogenous at both surfaces in the at least one region and the remainder of the layer of liquid crystal material. The retardance of the layer may be reduced, advantageously achieving increased security factor at angles near to the optical axis.

The director directions may have twist across the thickness direction of the layer of liquid crystal material. A view angle control element suited to preferential viewing from one side may be provided, for example for automotive applications.

The layer of liquid crystal material may have director directions at surfaces on opposite sides of the layer of liquid crystal material that may be homeotropic at both surfaces in the at least one region and the remainder of the layer of liquid crystal material. Increased security factor at angles near to the optical axis may be achieved.

The layer of liquid crystal material may have director directions at surfaces on opposite sides of the layer of liquid crystal material that may be homogenous at one of the surfaces in the at least one region and the remainder of the layer of liquid crystal material and may be homeotropic at the other of the surfaces in the at least one region and the remainder of the layer of liquid crystal material. The layer of liquid crystal material may have director directions at surfaces on opposite sides of the layer of liquid crystal material that may be different in the at least one region and the remainder of the layer of liquid crystal material. The contrast of the mark may advantageously be increased while achieving desirable security factor.

The director directions may have pretilt angles with components out of a plane of the layer of liquid crystal material that may be different in the at least one region and the remainder of the layer of liquid crystal material. The director directions may have pretilt angles with components in a plane of the layer of liquid crystal material that have different orientations in the at least one region and the remainder of the layer of liquid crystal material. The alignment layer may have different anchoring strengths in the at least one region and the remainder of the layer of liquid crystal material. A patterned alignment may be conveniently provided at low cost and complexity during manufacture.

The view angle control element may further comprise an alignment layer disposed adjacent to the layer of liquid crystal material on one of the sides of the layer of liquid crystal material, the alignment layer being arranged to provide an alignment in the layer of liquid crystal material.

A roll-to-roll manufacturing method may be conveniently achieved. The thickness of the view angle control element may be reduced.

The view angle control element may further comprise a further alignment layer disposed adjacent to the layer of liquid crystal material on the other side of the layer of liquid crystal material, the further alignment layer being arranged to provide an alignment in the layer of liquid crystal material. High retardance layers of liquid crystal material may be conveniently provided with desirable alignment characteristics.

The liquid crystal material may be a polymerised liquid crystal material. A thin and rugged layer of liquid crystal material may be provided with low manufacturing cost.

The view angle control element may further comprise an air gap adjacent to the layer of liquid crystal material on the other side of the layer of liquid crystal material. A single alignment layer may be provided, reducing cost and complexity. The air gap may not be present when used in a device, reducing cost and complexity.

The layer of liquid crystal material may have director directions at surfaces on opposite sides of the layer of liquid crystal material that may be the same in the at least one region and the remainder of the layer of liquid crystal material. Cost and complexity may be reduced.

The view angle control element may further comprise electrodes arranged to apply independent control voltages across the layer of liquid crystal material in the at least one region and in the remainder of the layer of liquid crystal material, the electrodes not being connected to a control circuit. Desirable states of alignment of the layer of liquid crystal material may be provided. The security factor may be increased for off-axis observers and the contrast of the mark optimised.

The electrodes may be connected to each other. During operation, no control system may be provided, reducing power consumption, cost and complexity of the display device.

The layer of liquid crystal material may have thicknesses that may be different in the at least one region and the remainder of the layer of liquid crystal material. An alignment surface may be conveniently provided during manufacture. The retardance of the layer of liquid crystal material may be conveniently modified to achieve desirable security factor and visibility of the mark.

The at least one polar control retarder further comprises at least one passive compensation retarder. The at least one passive compensation retarder comprises: a single passive compensation retarder having an optical axis perpendicular to the plane of the passive compensation retarder; a pair of passive compensation retarders on opposite sides of the passive liquid crystal retarder and having optical axes perpendicular to the plane of the passive compensation retarder; or a pair of passive compensation retarders on the same side of the passive liquid crystal retarder and having optical axes parallel to the plane of the passive compensation retarder that are crossed. The size of the polar region for which desirable security factor is achieved may be advantageously increased.

The at least one polar control retarder further comprises first and second quarter-wave plates, wherein the first quarter-wave plate is arranged on the opposite side of the at least one polar control retarder from the additional polariser and is arranged to convert a linearly-polarised polarisation state passed by the first polariser into a circularly-polarised polarisation state, and the second quarter-wave plate is arranged between the at least one polar control retarder and the additional polariser and is arranged to convert the circularly-polarised polarisation state into a linearly-polarised polarisation state that is passed by the additional polariser. The size of the polar region for which desirable security factor is achieved may be increased in both elevation and lateral directions.

The predetermined viewing axis may be normal to a plane of the view angle control element. Advantageously the mark may be visible to snoopers arranged away from the optical axis on two sides of the display.

The mark may be a symbol or logo or icon or text. Advantageously a brand marking, aesthetically pleasing design, warning symbol or other convenient mark may be visible to a snooper, while the image data presented may not be present.

In one or both of the at least one region and the remainder of the layer of liquid crystal material, the layer of liquid crystal material may have director directions at surfaces on at least one side of the layer of liquid crystal material that have pretilt angles with components in a plane of the layer of liquid crystal material having orientations that change monotonically along a predetermined axis across at least part of the display device. Advantageously the uniformity of security factor may be increased for an off-axis snooper and the uniformity of image visibility may be increased for the display user.

The view angle control element may further comprise a light control film, wherein the light control film comprises an input surface, an output surface facing the input surface, an array of transmissive regions extending between the input surface and the output surface, and absorptive regions between the transmissive regions and extending at least partway between the input surface and the output surface. The additional polariser may be a first additional polariser, the at least one polar control retarder may be at least one first polar control retarder, and the view angle control element further comprises: a further additional polariser, the further additional polariser being a linear polariser; and at least one further polar control retarder, wherein the further additional polariser and the at least one further polar control retarder may be arranged on the opposite side of the at least one first polar control retarder from the first additional polariser with the further additional polariser between the at least one first polar control retarder and the at least one further polar control retarder. Advantageously off-axis luminance may be further reduced, improving the security factor. The mark may remain visible.

The relative phase shifts introduced to orthogonal polarisation components of light along the non-viewing axis in both the at least one region and the remainder of the layer of liquid crystal material may be greater than the relative phase shifts introduced to orthogonal polarisation components of light along the viewing axis in the at least one region and the remainder of the layer of liquid crystal material. Advantageously increased security factor may be achieved outside the mark, providing increased security factor over a large area of the display device.

The view angle control element may be for use in a display device comprising a spatial light modulator arranged to output light and a display polariser arranged on a side of the spatial light modulator. The display polariser may be the first polariser, the view angle control element may be for arrangement on the same side of the spatial light modulator as the display polariser outside the display polariser. Advantageously a display device may provide a high security factor and mark visibility for an off-axis snooper and high image visibility and low mark visibility for the user.

The display polariser may be an output polariser arranged on an output side of the spatial light modulator, the view angle control element being for arrangement on the output side of the spatial light modulator outside the display polariser. The view angle control element may be conveniently provided on the output of the display, reducing cost and complexity of implementation.

The view angle control element may further comprise a reflective polariser arranged on the opposite side of the at least one polar control retarder from the additional polariser, the reflective polariser being a linear polariser. Advantageously the visibility of the mark to an off-axis snooper may be increased and the security factor increased. The mark may provide a difference in reflectivity achieving an improved aesthetic appearance.

According to a second aspect of the present disclosure, there is provided a display device comprising: a view angle control element according to the first aspect; a spatial light modulator arranged to output light; and a display polariser arranged on a side of the spatial light modulator, the display polariser being the first polariser. The display device may provide an image to an observer with high image fidelity and no mark, and may provide an image to a snooper with high image security and visibility of a mark.

The spatial light modulator may be a transmissive spatial light modulator and the display device further comprises a backlight arranged to supply light to the spatial light modulator. Advantageously the backlight may be arranged to provide reduced luminance in directions towards a snooper.

The spatial light modulator may be an emissive spatial light modulator, the display polariser may be an output polariser arranged on an output side of the spatial light modulator and the view angle control element may be arranged on the output side of the spatial light modulator outside the display polariser. A privacy display may be provided for OLED and micro-LED displays.

The relative phase shifts introduced to orthogonal polarisation components of light along the non-viewing axis may be sufficiently high that the operational image is not visible, when a security factor $S_n$ defined at the angle in question is, for at least one of the at least one region of the layer of liquid crystal material and the remainder of the layer of liquid crystal material, at least 1.0, where the security factor $S_n$ is given by the equation: $S_n=\log_{10}[1+\rho_n\cdot\alpha/(\pi\cdot P_n)]$ wherein $\rho_n$ is the reflectivity of the display device at the angle in question; $P_n$ is the ratio of the luminance of the display device at the angle in question to the maximum luminance of the display device; x is a solid angle in units of steradians; and a is a factor having a value of 4.0 steradians. The display device may be arranged to provide known desirable levels of image security along the non-viewing direction.

The view angle control element further comprises the first polariser. The first polariser may be a reflective polariser. Advantageously thickness and complexity may be reduced.

According to a third aspect of the present disclosure, there is provided a transparent sheet having a view angle control element according to the first aspect fixed thereto. The image being viewed may be from a real object. The transparent sheet may be an architectural or retail transparent window pane for example to provide desirable privacy while providing visibility of the window pane plane.

According to a fourth aspect of the present disclosure, there is provided a further view angle control element for arrangement outside a further first polariser that is a linear polariser, the further view angle control element comprising: a further additional polariser, the further additional polariser being a linear polariser; and a further polar control retarder for arrangement between the further first polariser and the further additional polariser, the further polar control retarder including a further passive liquid crystal retarder comprising a further layer of liquid crystal material. Advantageously security factor may be increased in the non-viewing direction and image visibility maintained in the viewing direction.

The further layer of liquid crystal material has director directions at surfaces disposed adjacent to the further layer of liquid crystal material and on opposite sides thereof that are homogenous at one of the surfaces and homeotropic at the other of the surfaces; and no passive compensation retarder. The layer of liquid crystal material may have a retardance for light of a wavelength of 550 nm in a range from 1000 nm to 6000 nm, preferably in a range from 2000 nm to 5000 nm and most preferably in a range from 3000 nm to 4000 nm. The further first polariser and the further additional polariser may have electric vector transmission directions that are parallel. A low thickness, low cost and complexity layer that is conveniently manufactured may be provided that achieves reduced transmission in the non-viewing direction. Advantageously security factor is increased. Variations of colour with viewing angle may be reduced.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 6 is a schematic diagram illustrating a top view of an automotive vehicle comprising a privacy passenger infotainment privacy display;

FIG. 7A is a schematic diagram illustrating a perspective front view of a transparent film for viewing a real object placed behind the transparent film;

FIG. 7B is a schematic diagram illustrating a perspective side view of a transparent film for viewing a real object placed behind the transparent film;

FIG. 19A, FIG. 19B, FIG. 19C, FIG. 19D, FIG. 19E, and FIG. 19F are schematic diagrams illustrating side views of methods to manufacture a liquid crystal retarder comprising a mark wherein a voltage is applied across at least part of the layer of liquid crystal material during manufacture and wherein the electrodes are not connected to a control circuit of the view angle control element, and as described in TABLE 7;

DETAILED DESCRIPTION

Figure 1A:
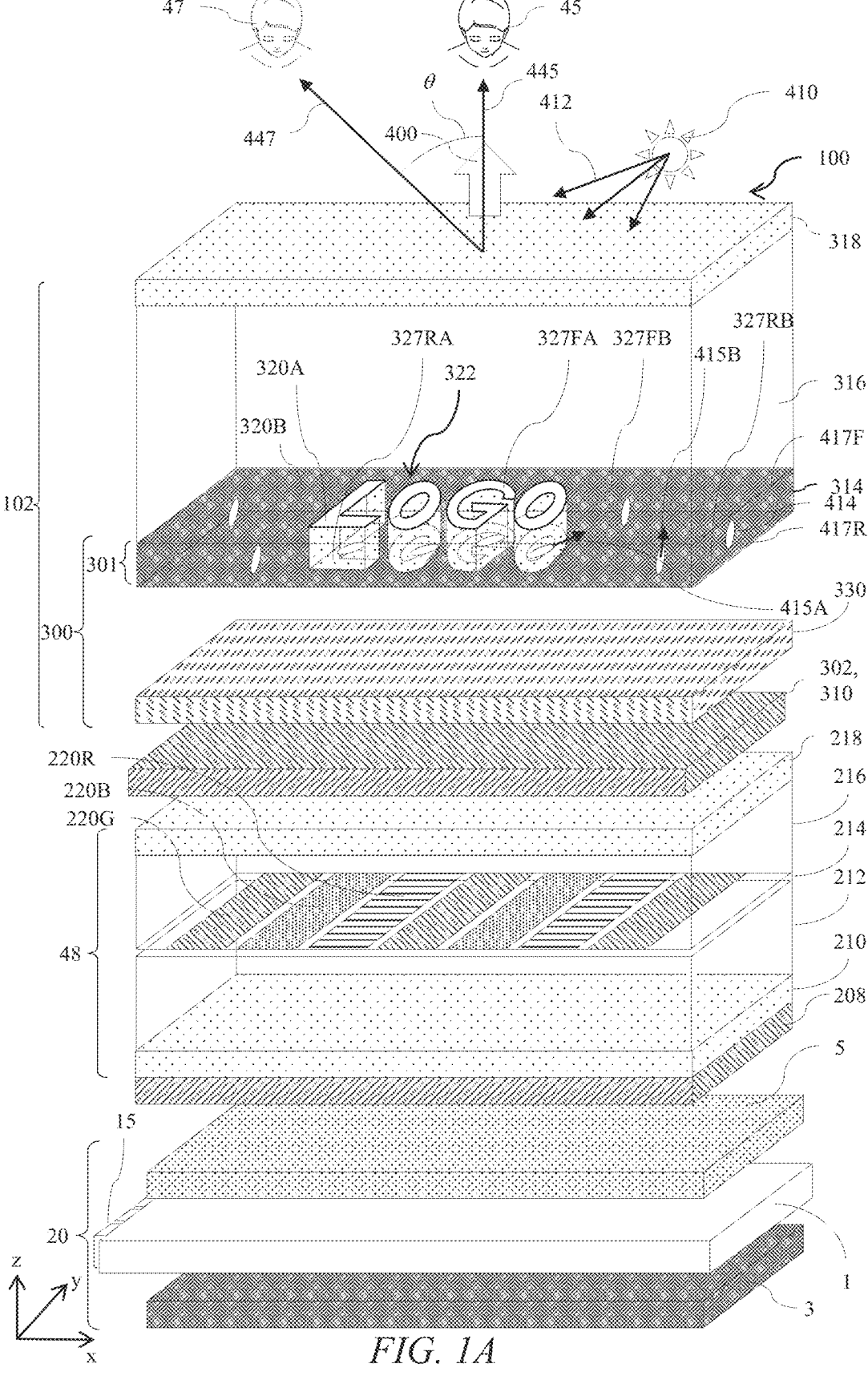
FIG. 1A is a schematic diagram illustrating a side perspective view of a privacy display comprising a transmissive spatial light modulator illuminated by a backlight, a reflective polariser, a polar control retarder comprising a uniform passive compensation retarder and a passive liquid crystal retarder comprising a mark, and an additional polariser.

Terms related to optical retarders for the purposes of the present disclosure will now be described.

In a layer comprising a uniaxial birefringent material, there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials, the slow axis direction is the extraordinary axis of the birefringent material. For negative dielectric anisotropy uniaxial birefringent materials, the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components: which is related to the birefringence $\Delta n$ and the thickness d of the retarder by $$\Gamma = 2 \cdot \pi \cdot \Delta n \cdot d / \lambda_0 \qquad \text{eqn. 1}$$

In eqn. 1, $\Delta n$ is defined as the difference between the extraordinary and the ordinary index of refraction, i.e.

$$\Delta n = n_e - n_o \qquad \text{eqn. 2}$$

For a half-wave retarder, the relationship between d, $\Delta n$, and $\lambda_0$ is chosen so that the phase shift between polarization components is $\Gamma = \pi$. For a quarter-wave retarder, the relationship between d, $\Delta n$, and $\lambda_0$ is chosen so that the phase shift between polarization components is $\Gamma = \pi/2$.

The term half-wave retarder herein typically refers to light propagating normal to the retarder and normal to the spatial light modulator.

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP. In the current description, the SOP may be termed the polarisation state.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP. The term "electric vector transmission direction" refers to a non-directional axis of the polariser parallel to which the electric vector of incident light is transmitted, even though the transmitted "electric vector" always has an instantaneous direction. The term "direction" is commonly used to describe this axis.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek.

Reflective linear polarisers may further comprise cholesteric reflective materials and a quarter-wave plate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to a positively birefringent A-plate, i.e. an A-plate with a positive $\Delta n$.

In the present disclosure a 'C-plate' refers to an optical retarder utilizing a layer of birefringent material with its optical axis perpendicular to the plane of the layer. A 'positive C-plate' refers to a positively birefringent C-plate, i.e. a C-plate with a positive $\Delta n$. A 'negative C-plate' refers to a negatively birefringent C-plate, i.e. a C-plate with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to a positively birefringent O-plate, i.e. an O-plate with a positive $\Delta n$.

Achromatic retarders may be provided wherein the material of the retarder is provided with a retardance $\Delta n \cdot d$ that varies with wavelength $\lambda$ as $$\Delta n \cdot d / \lambda = \kappa \qquad \text{eqn. 3}$$

where $\kappa$ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Common liquid crystals are rod-like molecules which may also be termed "calamitic", it is convenient to refer at the average direction of the "long axis" of the liquid crystal molecules by a unit vector known as the director. Practically, the long axis may be understood to be that about which the liquid crystal molecule has the smallest moment of inertia. A layer of liquid crystal material that has a director direction that changes tilt through the layer is called splayed and the profile of tilt is called the profile of splay.

Homogeneous alignment refers to the alignment of rod-like liquid molecules at the surface of a liquid crystal layer wherein the molecules align substantially parallel to an alignment surface, typically a substrate, or more generally with a director tilt angles from the plane of the alignment surface that is less than 45 degrees. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in domains of cells or in alignment of curable liquid crystal layers before a curing step.

In the present disclosure, homeotropic alignment refers to the alignment at the surface of a liquid crystal layer in which rod-like liquid crystalline molecules align substantially perpendicularly to an alignment surface, typically a substrate or more generally with a tilt angle from the plane of the alignment surface that is at least 45 degrees. In discotic liquid crystals, homeotropic alignment is defined as the state in which an axis of the columnar structure, which is formed by disc-like liquid crystalline molecules, typically aligns substantially perpendicularly to a surface or more generally with a tilt angle from the plane of the alignment surface that is at least 45 degrees. In homeotropic alignment, pretilt is the tilt angle of the molecules that are close to the alignment layer and measured from the plane of the alignment surface, and is typically close to 90 degrees and for example may be 88 degrees.

In a twisted liquid crystal layer, a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in spatial light modulators typically has a twist of 90 degrees.

Liquid crystal molecules with positive dielectric anisotropy may be switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy may be switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic-like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser, for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$V = (Y + R)/(Y - K) \qquad \text{eqn. 4}$$

where V is the visual security level (VSL), Y is the luminance of the white state of the display at a snooper viewing angle, K is the luminance of the black state of the display at the snooper viewing angle and R is the luminance of reflected light from the display.

Panel contrast ratio is given as:

$$C = Y/K \qquad \text{eqn. 5}$$

so the visual security level may be further given as:

$$V = \left(P \cdot Y_{max} + I \cdot \rho/\pi\right)/\left(P \cdot \left(Y_{max} - Y_{max}/C\right)\right) \qquad \text{eqn. 6}$$

where: $Y_{max}$ is the maximum luminance of the display; P is the off-axis relative luminance typically defined as the ratio of luminance at the snooper angle to the maximum luminance $Y_{max}$; C is the image contrast ratio; $\rho$ is the surface reflectivity; $\pi$ is a solid angle factor (with units steradians) and/is the illuminance. The units of $Y_{max}$ are the units of I divided by solid angle in units of steradian.

The luminance of a display varies with angle and so the maximum luminance of the display Y max occurs at a particular angle that depends on the configuration of the display.

In many displays, the maximum luminance $Y_{max}$ occurs head-on, i.e. normal to the display. Any display device disclosed herein may be arranged to have a maximum luminance $Y_{max}$ that occurs head-on, in which case references to the maximum luminance of the display device $Y_{max}$ may be replaced by references to the luminance normal to the display device.

Alternatively, any display described herein may be arranged to have a maximum luminance $Y_{max}$ that occurs at a polar angle to the normal to the display device that is greater than 0 degrees. By way of example, the maximum luminance $Y_{max}$ may occur at a non-zero polar angle and at an azimuth angle that has for example zero lateral angle so that the maximum luminance is for an on-axis user that is looking down onto the display device. The polar angle may for example be 10 degrees and the azimuthal angle may be the northerly direction (90 degrees anti-clockwise from easterly direction). The viewer may therefore desirably see a high luminance at typical non-normal viewing angles.

The off-axis relative luminance, P is sometimes referred to as the privacy level. However, such privacy level P describes relative luminance of a display at a given polar angle compared to head-on luminance, and in fact is not a measure of privacy appearance.

The illuminance, I is the luminous flux per unit area that is incident on the display and reflected from the display towards the observer location. For Lambertian illuminance, and for displays with a Lambertian front diffuser, illuminance I is invariant with polar and azimuthal angles. For arrangements with a display with non-Lambertian front diffusion arranged in an environment with directional (non-Lambertian) ambient light, illuminance I varies with polar and azimuthal angle of observation.

Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$V = 1 + I \cdot \rho / (\pi \cdot P \cdot Y_{max}) \qquad \text{eqn. 7}$$

In the present embodiments, in addition to the exemplary definition of eqn. 4, other measurements of visual security level, V may be provided, for example to include the effect on image visibility to a snooper of snooper location, image contrast, image colour and white point and subtended image feature size. Thus the visual security level may be a measure of the degree of privacy of the display but may not be restricted to the parameter V.

The perceptual image security may be determined from the logarithmic response of the eye, such that a Security Factor, S is given by $$S = \log_{10}(V) \qquad \text{eqn. 8}$$

$$S = \log_{10}(1 + \alpha \cdot \rho / (\pi \cdot P)) \qquad \text{eqn. 9}$$

where $\alpha$ is the ratio of illuminance I to maximum luminance $Y_{max}$.

Desirable limits for S were determined in the following manner. In a first step a privacy display device was provided. Measurements of the variation of privacy level, $P(\theta)$ of the display device with polar viewing angle and variation of reflectivity $\rho(\theta)$ of the display device with polar viewing angle were made using photopic measurement equipment. A light source such as a substantially uniform luminance lightbox was arranged to provide illumination from an illuminated region that was arranged to illuminate the privacy display device along an incident direction for reflection to a viewer position at a polar angle of greater than 0 degrees to the normal to the display device. The variation $I(\theta)$ of illuminance of a substantially Lambertian emitting lightbox with polar viewing angle was determined by and measuring the variation of recorded reflective luminance with polar viewing angle taking into account the variation of reflectivity $\rho(\theta)$. The measurements of $P(\theta)$, $\rho(\theta)$ and $I(\theta)$ were used to determine the variation of Security Factor $S(\theta)$ with polar viewing angle along the zero elevation axis.

In a second step, a series of high contrast images were provided on the privacy display including (i) small text images with maximum font height 3 mm, (ii) large text images with maximum font height 30 mm and (iii) moving images.

In a third step, each observer (with eyesight correction for viewing at 1000 mm where appropriate) viewed each of the images from a distance of 1000 mm, and adjusted their polar angle of viewing at zero elevation until image invisibility was achieved for one eye from a position near on the display at or close to the centre-line of the display. The polar location of the observer's eye was recorded. From the relationship $S(\theta)$, the security factor at said polar location was determined. The measurement was repeated for the different images, for various display luminance $Y_{max}$, different lightbox illuminance $I(\theta=\theta)$, for different background lighting conditions and for different observers.

From the above measurements $S<1.0$ provides low or no visual security, and $S \geq 1$ makes the image not visible. In the range $1.0 \leq S < 1.5$, even though the image is not visible for practical purposes, some features of the image may still be perceived dependent on the contrast, spatial frequency and temporal frequency of image content, whereas in the range $1.5 \leq S < 1.8$, the image is not visible for most images and most observers and in the range $S \geq 1.8$ the image is not visible, independent of image content for all observers.

In practical display devices, this means that it is desirable to provide a value of S for an off-axis viewer who is a snooper that meets the relationship $S \geq S_{min}$, where: $S_{min}$ has a value of 1.0 or more to achieve the effect that in practical terms the displayed image is not visible to the off-axis viewer.

At an observation angle $\theta$ in question, the security factor $S_n$ for a region of the display labelled by the index n is given from eqn. 8 and eqn. 9 by:

$$S_n(\theta) = \log_{10}\left[1 + \rho_n(\theta) \cdot \alpha(\theta) / (\pi \cdot P_n(\theta))\right] \qquad \text{eqn. 10}$$

where: $\alpha$ is the ratio of illuminance $I(\theta)$ onto the display that is reflected from the display to the angle in question and with units of lux (lumen·m$^{-2}$), to maximum luminance $Y_{max}$ with units of nits (lumen·m$^{-2}$·sr$^{-1}$) where the units of $\alpha$ are steradians, $\pi$ is a solid angle in units of steradians, $\rho_n(\theta)$ is the reflectivity of the display device along the observation direction in the respective $n^{th}$ region, and $P_n(\theta)$ is the ratio of the luminance of the display device along the observation direction in the respective $n^{th}$ region.

In human factors measurement, it has been found that desirable privacy displays of the present embodiments described hereinbelow typically operate with security factor $S_n \geq 1.0$ at the observation angle when the value of the ratio $\alpha$ of illuminance/to maximum luminance $Y_{max}$ is 4.0. For example the illuminance $I(\theta=-45°)$ that illuminates the display and is directed towards the snooper at the observation direction $(\theta=+45°)$ after reflection from the display may be 1000 lux and the maximum display illuminance $Y_{max}$ that is provided for the user may be 250 nits. This provides an image that is not visible for a wide range of practical displays.

More preferably, the display may have improved characteristics of reflectivity $\rho_n(\theta=45°)$ and privacy $P_n(\theta=45°)$ by operating with security factor $S_n \geq 1.0$ at the observation angle when the ratio $\alpha$ is 2.0. Such an arrangement desirably improves the relative perceived brightness and contrast of the display to the primary user near to the direction of $Y_{max}$ while achieving desirable security factor, $S_n \geq 1.0$. Most preferably, the display may have improved characteristics of reflectivity $\rho_n(\theta=45°)$ and privacy $P_n(\theta=45°)$ by operating with security factor $S_n \geq 1.0$ at the observation angle when the ratio $\alpha$ is 1.0. Such an arrangement achieves desirably high perceived brightness and contrast of the display to the primary user near to the direction of $Y_{max}$ in comparison to the brightness of illuminated regions around the display, while achieving desirable security factor, $S_n \geq 1.0$ for an off-axis observer 47 at the observation direction.

The above discussion focusses on reducing visibility of the displayed image to an off-axis viewer who is a snooper, but similar considerations apply to visibility of the displayed image to the intended user of the display device who is typically on-axis. In this case, decrease of the level of the visual security level (VSL) V corresponds to an increase in the visibility of the image to the viewer. During observation S<0.2 may provide acceptable visibility (perceived contrast ratio) of the displayed image and more desirably S<0.1. In practical display devices, this means that it is desirable to provide a value of S for an on-axis viewer who is the intended user of the display device that meets the relationship $S \leq S_{max}$, where $S_{max}$ has a value of 0.2.

In the present discussion the colour variation $\Delta\varepsilon$ of an output colour $(u_w' + \Delta u', v_w' + \Delta v')$ from a desirable white point $(u_w', v_w')$ may be determined by the CIELUV colour difference metric, assuming a typical display spectral illuminant and is given by:

$$\Delta\varepsilon = (\Delta u'^2 + \Delta v'^2)^{1/2} \qquad \text{eqn. 11}$$

The structure and operation of various directional display devices will now be described. In this description, common elements have common reference numerals. It is noted that the disclosure relating to any element applies to each device in which the same or corresponding element is provided. Accordingly, for brevity such disclosure is not repeated.

FIG. 1A is a schematic diagram illustrating a side perspective view of a privacy display device 100 arranged to operate when illuminated by an ambient light source 410 and comprising a transmissive spatial light modulator 48 illuminated by a backlight 20, and a reflective polariser 302, a polar control retarder 300 comprising a uniform passive compensation retarder 330 and a passive liquid crystal retarder 301 comprising a mark 322, and an additional polariser 318.

The embodiment of FIG. 1A comprises a view angle control element 102 for arrangement outside a first polariser 310 that is a linear polariser, and in the embodiment of FIG. 1A is a reflective polariser 302.

The view angle control element 102 comprises an additional polariser 318, the additional polariser 318 being a linear polariser; and at least one polar control retarder 300 for arrangement between the reflective polariser 302 and the additional polariser 318.

The at least one polar control retarder 300 includes a passive liquid crystal retarder 301 comprising a layer 314 of liquid crystal material 414, wherein the layer 314 of liquid crystal material 414 has at least one region 320A in a shape of a mark 322 for display to an observer 47 but not for display to observer 45. The mark 322 may be a symbol or logo or icon or text, in the present description the text "LOGO" is used to represent the mark 322 and is comprised of four regions 320A, while the remainder 320B comprises the background to the text "LOGO".

In the present disclosure, the term passive liquid crystal retarder 301 refers to a layer of material that, during operation of the view angle control element 102, is not switchable. The passive liquid crystal retarder 301 of FIG. 1A is not driven by an electric field during operation of the display device 100. As will be described in the embodiments hereinbelow, an electric field may be applied in the thickness direction across the liquid crystal retarder 301 during fabrication, but is removed after fabrication, for example after curing the layer 314 of liquid crystal material 414.

As will be described further hereinbelow, for example considering FIG. 4C and FIGS. 31A-D, the view angle control element 102 is arranged such that along a predetermined viewing axis 445, relative phase shifts are introduced to orthogonal polarisation components of light that are sufficiently small in the at least one region 320A and the remainder 320B of the layer 314 of liquid crystal material 414 that the mark 322 is not visible.

Further, along a non-viewing axis 447 at a different angle $\theta$ from the viewing axis 445, relative phase shifts are introduced to orthogonal polarisation components of light that are different in the at least one region 320A and the remainder 320B of the layer 314 of liquid crystal material 414 such that the mark 322 is visible. In other words, along a predetermined viewing axis 445, phase shifts are introduced to orthogonal polarisation components of light in the at least one region 320A and in the remainder 320B of the layer 314 of liquid crystal material 414, the difference between which is sufficiently small that the mark 322 is not visible in the predetermined viewing axis 445 but is visible in the non-viewing axis 447.

The spatial light modulator 48 comprises a first polariser 310 that is an output polariser 218 arranged on the output side of the spatial light modulator 48, the output polariser 218 being a linear polariser; a view angle control element 102 comprising: an additional polariser 318 arranged on the output side of the output polariser 218, the additional polariser 318 being a linear polariser; and at least one polar control retarder 300 arranged between the output polariser 218 and the additional polariser 318, the at least one polar control retarder 300 including a liquid crystal retarder 301 comprising a layer 314 of liquid crystal material 414, and first and second transmissive interfaces 317F, 317R on opposite sides of the layer 314 of liquid crystal material 414.

In the embodiment of FIG. 1A and FIGS. 4A-C hereinbelow, the predetermined viewing axis 445 is normal to a plane of the at least one polar control retarder 300, and more generally, normal to a plane of the view angle control element 102. In other embodiments, the liquid crystal directors 415 may be provided with alignment directions such that the predetermined viewing axis 445 is not on-axis. Such arrangements may be suitable for example in automotive vehicles wherein the nominal viewing position of a passenger 45 may be offset from the normal to the display device 100.

The spatial light modulator 48 is a transmissive spatial light modulator 48 and the display device 100 further comprises a backlight 20 arranged to supply light to the spatial light modulator 48.

The structure of the display device 100 will now be described in further detail.

The display device 100 comprises a backlight 20 arranged to output light 400 and a transmissive spatial light modulator 48 arranged to receive output light from the backlight 20.

The backlight apparatus 20 comprises a rear reflector 3 and a waveguide arrangement comprising waveguide 1, light sources 15, and light control components 5 that may comprise optical elements such as light turning films or brightness enhancement films, as well as diffusers and arranged to receive light exiting from the waveguide 1 and direct through the spatial light modulator 48.

In an alternative embodiment, the light sources 15 may comprise a mini-LED array. The waveguide 1 may be omitted and colour conversion films and light scattering films may be provided to illuminate the spatial light modulator 48. Advantageously increased dynamic range and brightness may be achieved.

In the embodiment of FIG. 1A, the spatial light modulator 48 may comprise a liquid crystal display device comprising substrates 212, 216, and liquid crystal layer 214 having red, green and blue pixels 220, 222, 224. The spatial light modulator 48 has an input display polariser 210 and an output display polariser 218 on opposite sides thereof. The output display polariser 218 is arranged to provide high extinction ratio for light from the pixels 220, 222, 224 of the spatial light modulator 48. Typical polarisers 210, 218 may be absorbing polarisers such as dichroic polarisers such as an iodine polariser on stretched PVA.

Optionally a reflective polariser 208 may be provided between the backlight 20 and the input polariser 210 to improve the efficiency of output light from the backlight 20. The reflective polariser 208 is different to the reflective polariser 302 described hereinbelow. Reflective polarisers 208, 302 may be provided by materials such as DBEF™ or APF™ from 3M Corporation.

In FIG. 1A, the view angle control element 102 is for use in a display device 100 comprising a spatial light modulator 48 arranged to output light and a display polariser 218 arranged on the output side of the spatial light modulator 48, the display polariser 218 being the first polariser 310, the view angle control element 102 being for arrangement on the output side of the spatial light modulator 48 and outside the display polariser 210, 218. The view angle control element 102 further comprises a reflective polariser 302 arranged on the opposite side of the at least one polar control retarder 300 from the additional polariser 318, the reflective polariser 302 being a linear polariser.

A view angle control element for an emissive spatial light modulator 48 will now be described.

Figure 1B:
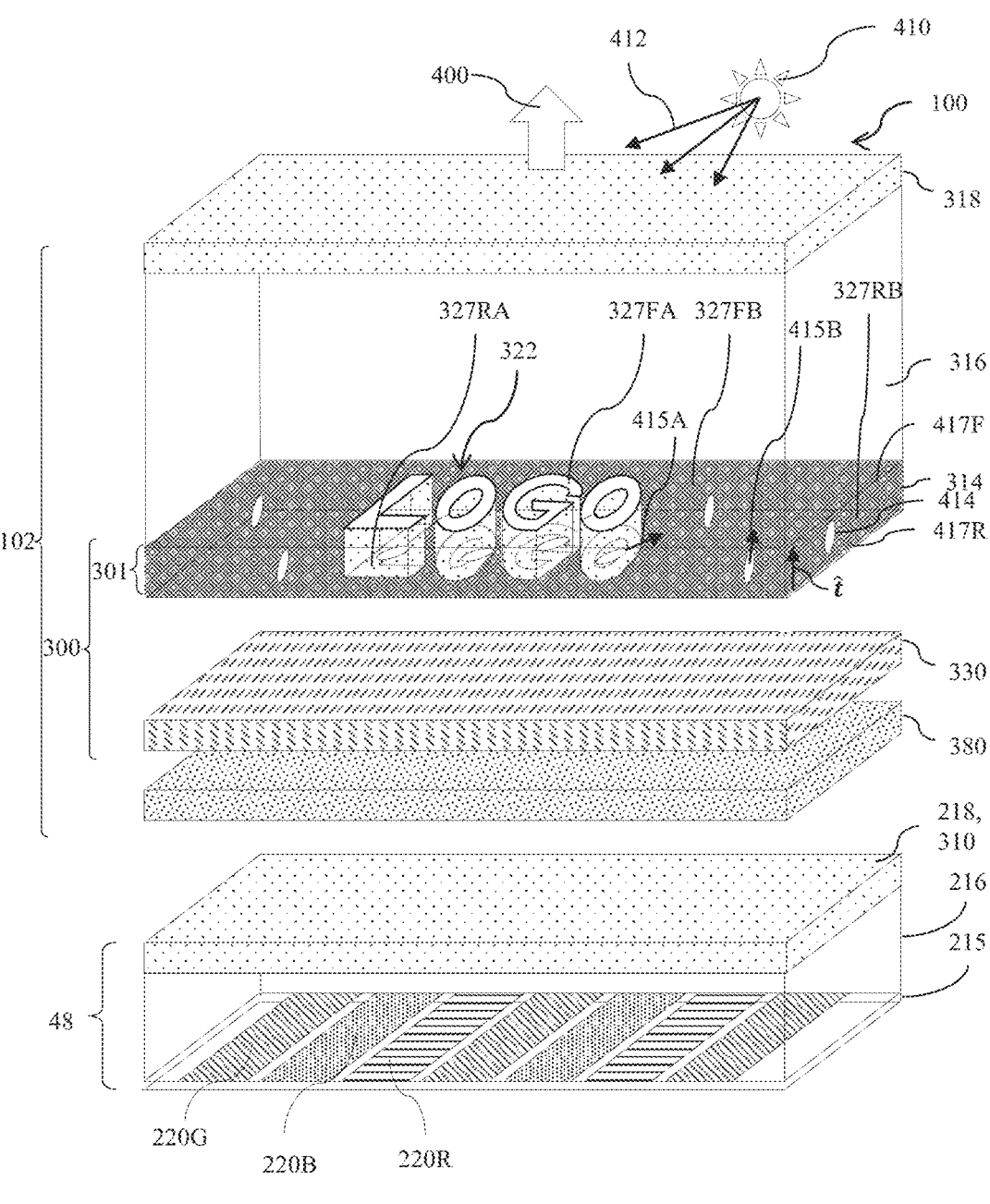
FIG. 1B is a schematic diagram illustrating a side perspective view of a privacy display device comprising an emissive spatial light modulator and a polar control retarder comprising a uniform passive compensation retarder and a passive liquid crystal retarder comprising a mark, and an additional polariser.

FIG. 1B is a schematic diagram illustrating a front perspective view of a privacy display device 100 arranged to operate when illuminated by an ambient light source 410 and comprising an emissive spatial light modulator 48, a polar control retarder 300 comprising a uniform passive compensation retarder 330 a liquid crystal retarder 301 comprising a mark 322. Features of the embodiment of FIG. 1B not discussed in further detail may be assumed to correspond to the features with equivalent reference numerals as discussed above, including any potential variations in the features.

The alternative embodiment of FIG. 1B differs from the arrangement of FIG. 1A in several respects. In a first aspect spatial light modulator 48 is an emissive spatial light modulator 48 such as a microLED or OLED spatial light modulator 48, has no input polariser 210 and has a light element emitting layer 215. The display polariser 218 is an output polariser arranged on an output side of the spatial light modulator 48 and the view angle control element 102 is arranged on the output side of the spatial light modulator 48 outside the display polariser 218.

In comparison to the embodiment of FIG. 1A, the alternative embodiment of FIG. 1B illustrates that the reflective polariser 302 may be omitted. Light 412 from the ambient light source 410 is reflected by the front surface of the additional polariser 318; however the display reflectivity p is determined by Fresnel reflections and modulated by surface roughness in the case a front surface diffusion is provided. Advantageously the stack complexity and cost is reduced.

Display device 100 reflectivity may be reduced to provide a blacker appearance display in the off-mode of operation. Advantageously an improved aesthetic appearance may be achieved. Alternatively, a reflective polariser 302 may be provided in a similar manner to FIG. 1A.

In the alternative embodiment of FIG. 1B, a colour filter 380 is provided in the view angle control element 102 with an illustrative location between the reflective polariser 302 and the additional polariser 318, although other stacking arrangements may be provided. Such colour filter 380 may for example be provided as part of the polariser 318, substrate 316 or passive compensation retarder 330. In operation reflected light rays may have a colour that is modified by the double pass through the colour filter 380 to provide a colour that matches the aesthetics of the environment or to match a brand colour for example. The colour of light output from the spatial light modulator 48 that has a single pass through the colour filter 380 may be modified to provide an appropriate white point. Such colour filter 380 may be provided for other embodiments described elsewhere herein such as FIG. 1A or FIG. 1C for example.

Arrangements with the view angle control element 102 arranged between the backlight 20 and spatial light modulator 48 will now be described.

Figure 1C:
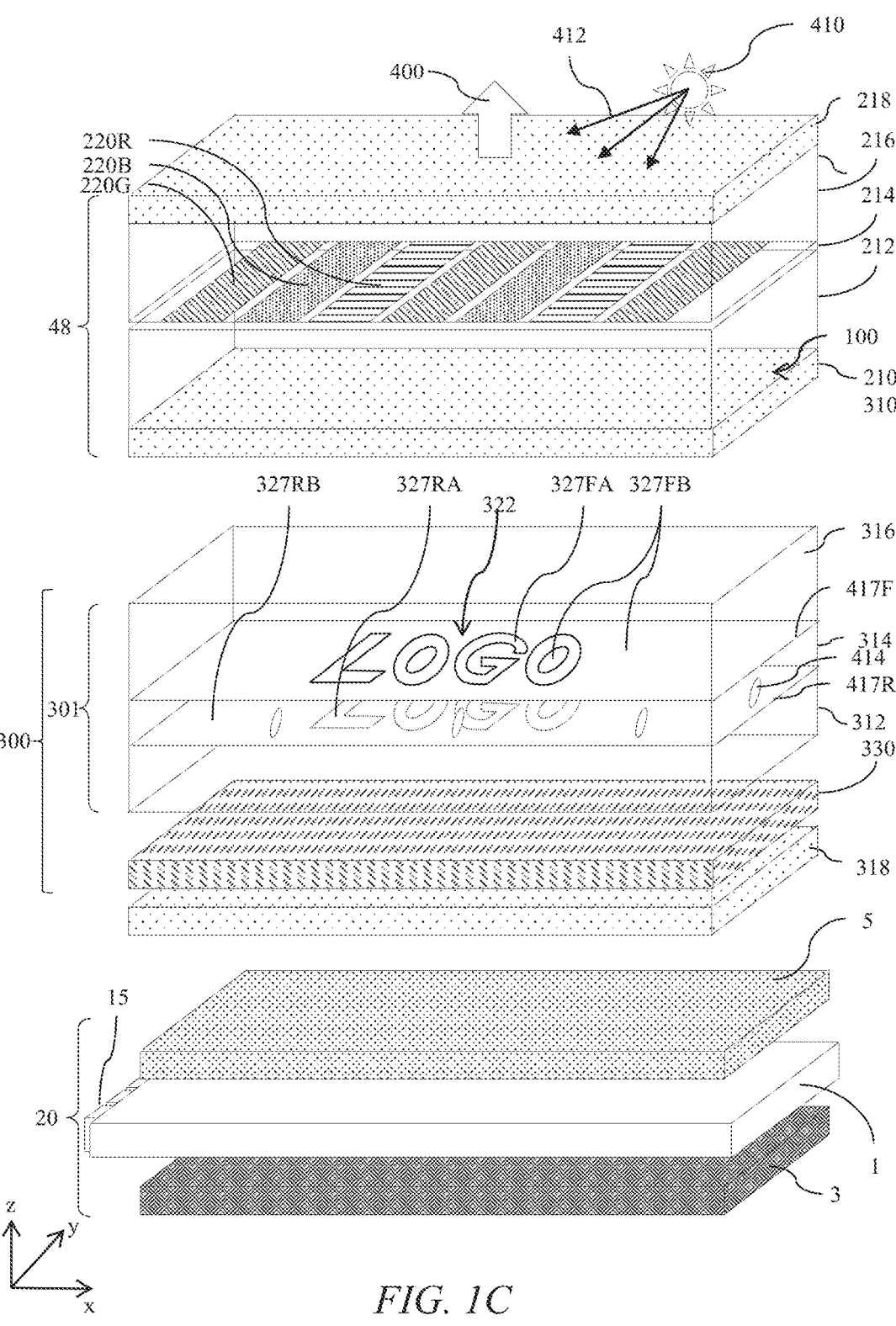
FIG. 1C is a schematic diagram illustrating a side perspective view of a privacy display comprising a transmissive spatial light modulator illuminated by a backlight and a polar control retarder comprising a passive liquid crystal retarder comprising a mark arranged between the backlight and the spatial light modulator.

FIG. 1C is a schematic diagram illustrating a side perspective view of a privacy display device 100 comprising a transmissive spatial light modulator 48 illuminated by a backlight 20, an absorptive output display polariser 218 and a polar control retarder 300 comprising a liquid crystal retarder 301 comprising a mark 322. Features of the embodiment of FIG. 1C not discussed in further detail may be assumed to correspond to the features with equivalent reference numerals as discussed above, including any potential variations in the features.

In comparison to FIG. 1A, in the alternative embodiment of FIG. 1C, the view angle control element 102 is for use in a display device 100 comprising a spatial light modulator 48 arranged to output light and a display polariser 210 arranged on the input side of the spatial light modulator 48, the display polariser 210 being the first polariser 310, the view angle control element 102 being for arrangement on the input side of the spatial light modulator 48 as the display polariser 210 and outside the display polariser 210 from the spatial light modulator 48.

Arrangement of optical axis directions will now be described for the view angle control elements 102 of FIG. 1A.

Figures 1D, 1E:
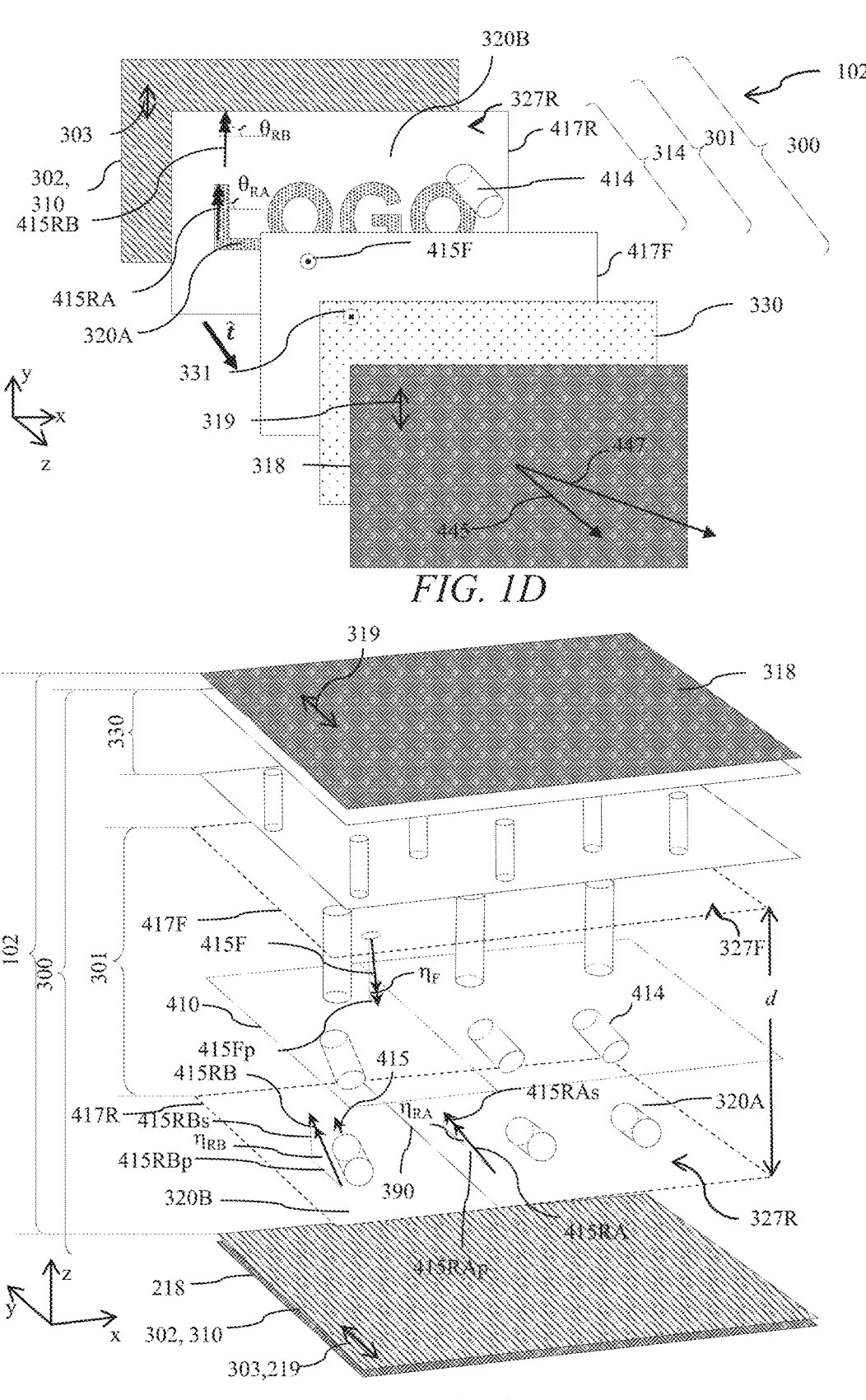
FIG. 1D is a schematic diagram illustrating a front perspective view of optical axis directions for the stack of a view angle control element comprising a reflective polariser, polar control retarder and additional polariser wherein the electric vector transmission directions of the reflective polariser and additional polariser are parallel.
FIG. 1E is a schematic diagram illustrating a side perspective view of birefringent molecule alignments for a view angle control element comprising a reflective polariser, polar control retarder and additional polariser and illustrating alignment directions in the at least one region and remainder regions of the mark.

FIG. 1D is a schematic diagram illustrating front perspective view of optical axis directions for the stack of a view angle control element 102 comprising a reflective polariser 302, polar control retarder 300 comprising a passive liquid crystal retarder 301 and passive compensation retarder that is a negative C-plate; and additional polariser 318 wherein the electric vector transmission directions 303, 319 of the reflective polariser 302 and additional polariser 318 are parallel; and FIG. 1E is a schematic diagram illustrating a side perspective view of birefringent molecule alignments for the view angle control element 102 of FIG. 1D near a boundary 390 between the regions 320A, 320B. Features of the embodiment of FIGS. 1D-E not discussed in further detail may be assumed to correspond to the features with equivalent reference numerals as discussed above, including any potential variations in the features.

FIG. 1D illustrates an embodiment wherein a first alignment layer 417R is provided with homogeneous alignment that is different in the regions 320A, 320B and a second alignment layer 417B is provided with homeotropic alignment that is uniform across the regions 320A, 320B.

In the region 320A, at the first surface 327R of the layer 314 of liquid crystal material 414 next to the alignment layer 417RA, the first alignment layer 417R has a pretilt direction with component in the region 320A with angle $\theta_{RA}$ in the plane of the layer 327R such that the director 415 of the liquid crystal material 414 on the surface 327R has a director direction 415RA. In the remainder 320B region, at the first surface 327R of the layer 314 of liquid crystal material 414 next to the alignment layer 417RB, the first alignment layer 417R has a pretilt direction with component in the region 320B with angle $\theta_{RB}$ in the plane of the layer 327R such that the director 415 of the liquid crystal material 414 on the surface 327R has a director direction 415RB. In the embodiment of FIGS. 1D-E, the angles $\theta_{RA}$. $\theta_{RB}$ are the same.

In both regions 320A, 320B, at the second surface 327F of the layer 314 of liquid crystal material 414 next to the second alignment layer 417B, the second alignment layer 417B has a pretilt direction in both the regions 320A, 320B that is homeotropic and out of the plane of the layer 327F such that the director 415 of the liquid crystal material 414 on the surface 327F has a director direction 415B.

The director 415RA, 415RB directions have pretilt angles $\eta_A$, $\eta_B$ with components 415RAs, 415RBs out of a plane of the layer 314 of liquid crystal material 414 that are different in the at least one region 320A and the remainder 320B of the layer 314 of liquid crystal material 414.

Considering FIG. 1E, the alignment layer 417A, 417B has different anchoring strengths in the at least one region 320A and the remainder 320B of the layer 314 of liquid crystal material 414. In the region 320A the alignment layer 417R provides a pretilt angle $\eta_{RA}$ such that the pretilt has an in-plane component 415RAp of director 415 direction 415RA at the surface 327R of the layer 314 of liquid crystal material 414. In the remainder 320B region the alignment layer 417R provides a different pretilt angle $\eta_{RB}$ such that the pretilt has an in-plane component 415RBp of director 415 direction 415RB at the surface 327R of the layer 314 of liquid crystal material 414.

The alignment layer 417B provides a uniform pretilt angle $\eta_B$ such that the pretilt direction 415B has an in-plane component 415Bp of director 415 direction 415B at the surface 327F of the layer 314 of liquid crystal material 414 that is the same for the at least one region 320A and the remainder 320B region.

An illustrative arrangement of polar control retarder 300 is provided in TABLE 1 comprising a liquid crystal layer 314. As illustrated in FIGS. 30A-B hereinbelow, the arrangement of FIGS. 1D-E may be provided by curing the liquid crystal material 414 in the presence of an applied voltage.

alternative arrangements of view angle control elements 102 can be provided in the display device 100 of FIG. 1A.

Figure 1F:
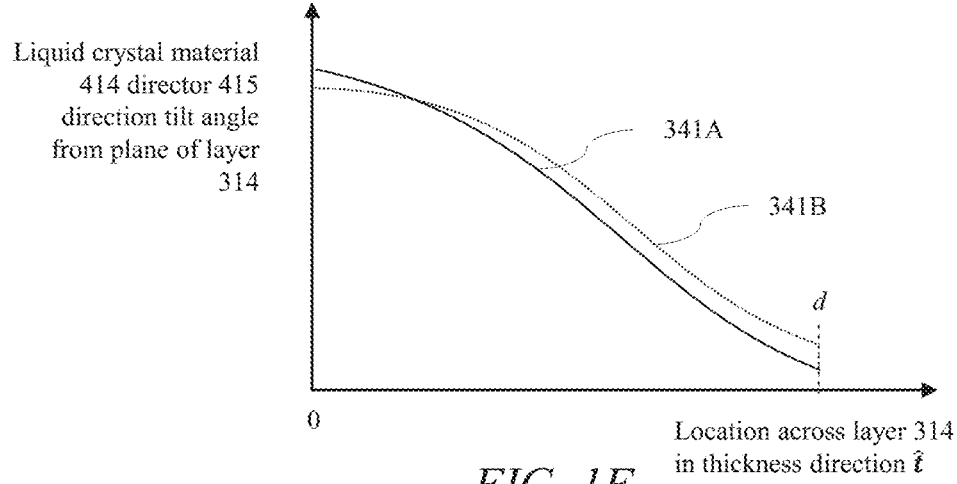
FIG. 1F is a schematic graph illustrating variation of liquid crystal material director direction tilt angle from plane of layer against location across layer in thickness direction $\hat{i}$ for illustrative first and second profiles of splay in the at least one region and the remainder of the layer of liquid crystal material.

FIG. 1F is a schematic graph illustrating variation of liquid crystal material 414 director 415 direction tilt angle from plane of layer 314 against location across layer 314 in thickness direction t for illustrative first and second profiles 341A, 341B of splay in the at least one region 320A and the remainder 320B respectively of the layer 314 of liquid crystal material 414. Features of the embodiments of FIGS. 1E-F not discussed in further detail may be assumed to correspond to the features with equivalent reference numerals as discussed above, including any potential variations in the features.

FIGS. 1E-F illustrate that through the layer 314 of liquid crystal material 414, the tilts of the director 415 of the liquid crystal molecules vary in a manner that is different in the first region 320A and remainder 320B of the layer 314. The layer 314 of liquid crystal material 414 has profiles 341A, 341B of splay of the director 415 directions across the thickness direction $\hat{t}$ of the layer 314 of liquid crystal material 414 that are different in the at least one region 320A and the remainder 320B of the layer 314 of liquid crystal material 414.

The propagation of polarised light in the arrangement of FIG. 1A will now be described.

Figure 2A:
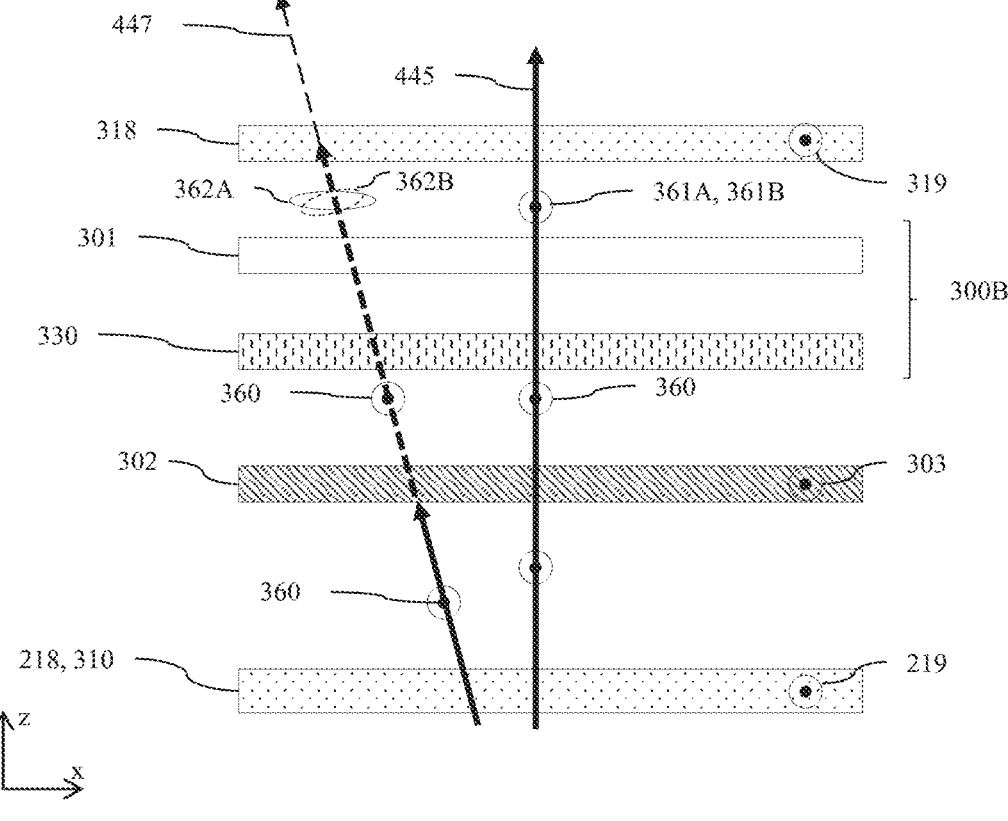
FIG. 2A is a schematic diagram illustrating in side view the operation of the arrangement of FIG. 1A for transmitted light from the spatial light modulator.

FIG. 2A is a schematic diagram illustrating in side view the operation of the arrangement of FIG. 1A for transmitted light from the spatial light modulator 48. Features of the embodiment of FIG. 2A not discussed in further detail may be assumed to correspond to the features with equivalent reference numerals as discussed above, including any potential variations in the features.

The structure and operation of the polar control retarder 300, additional polariser 318 and reflective polariser 302 is described in U.S. Pat. No. 10,976,578, which is herein incorporated by reference in its entirety.

In the embodiment of FIG. 2A, light ray 445 is transmitted by the display polariser 218 with a linear polarisation state 360 that undergoes no phase shift of orthogonal polarisation components of light and is unmodified by the polar control retarder 300 and polarisers 218, 302 and 318 for both regions 320A, 320B so that output polarisation state 361A, 361B is a linear state that is transmitted by additional polariser 318 with high transmission efficiency. Such light is transmitted with high luminance. Head-on light ray 445 has a polarisation state 360 that is substantially unmodified by polar control retarders 300A, 300B.

By comparison, off-axis light ray 447 has an output polarisation state 362 from the polar control retarder 300 that is most generally elliptical and further, for the at least one region 320A, the polarisation state 362A is different from the polarisation state 362B in the non-viewing axis

TABLE 1

| Item | Alignment type | LC layer 314 retardance | Passive compensation retarder 330 type & retardance | In-plane angle $\theta$ | Out-of-plane angle $\eta$ | Voltage during manufacture |
|---|---|---|---|---|---|---|
| 417RA | Homogeneous | 1000 nm | | $\theta_{RA} = 90°$ | $\eta_{RA} = 2°$ | 1.4 V |
| 417RB | Homogeneous | | | $\theta_{RB} = 90°$ | $\eta_{RB} = 30°$ | |
| 417F | Homeotropic | | | $\theta_F = 270°$ | $\eta_F = 88°$ | |
| 330 | | | Negative C-plate −880 nm | | 90° | |

Other embodiments described hereinbelow provide different arrangements of liquid crystal retarder 301, passive compensation retarder 330 and polarisers 302, 318. Such 447. Ray 447 is thus transmitted at off-axis polar locations with reduced luminance and with luminance that is different between the regions 320A, 320B.

The operation of the display device 100 for reflected light will now be described.

Figures 2B, 3A:
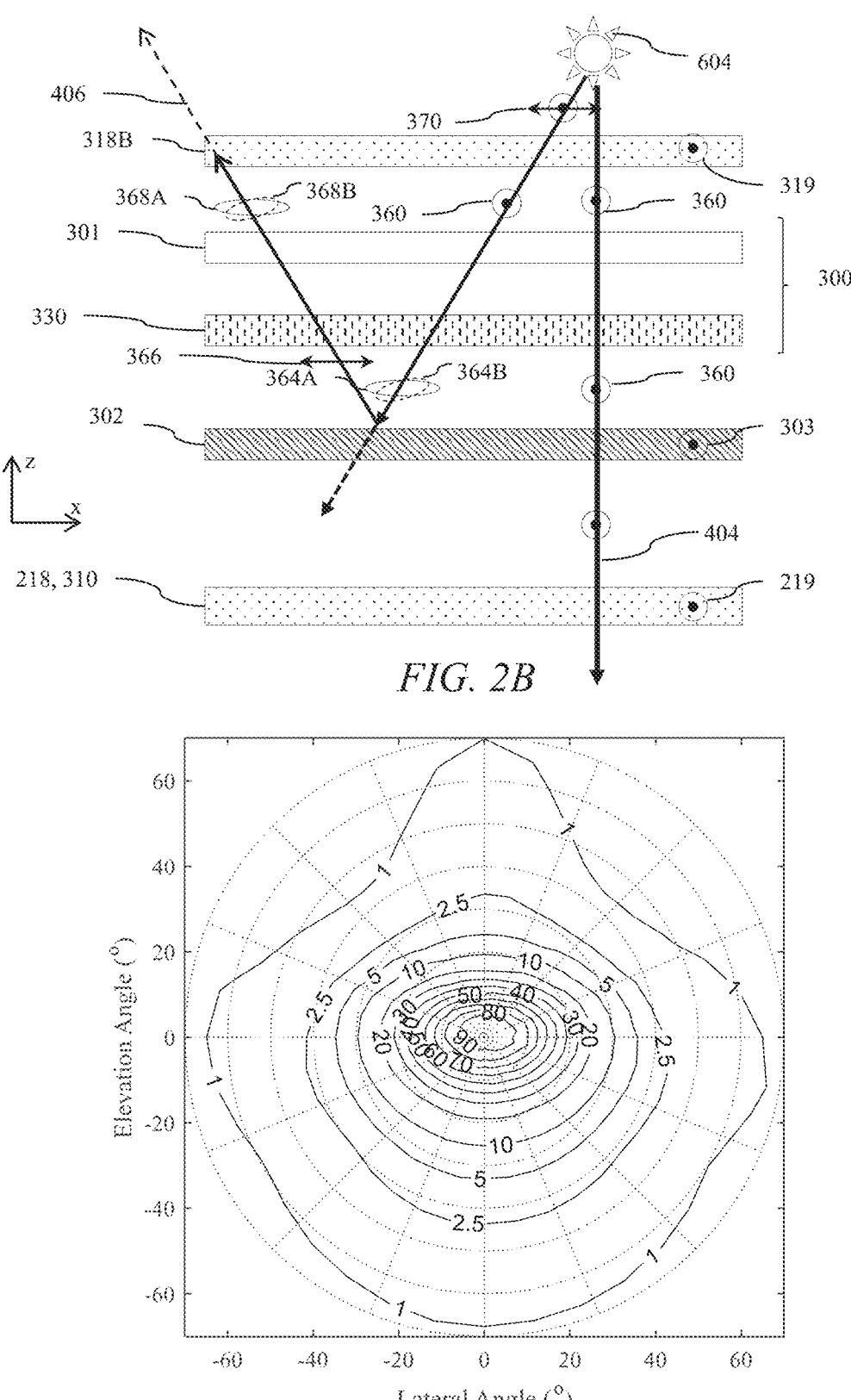
FIG. 2B is a schematic diagram illustrating in side view the operation of the arrangement of FIG. 1A for reflection of ambient light.
FIG. 3A is a schematic graph illustrating the polar variation of backlight luminous intensity for an illustrative backlight of FIG. 1A.

FIG. 2B is a schematic diagram illustrating in side view the operation of the arrangement of FIG. 1A for reflection of ambient light. Features of the embodiment of FIG. 2B not discussed in further detail may be assumed to correspond to the features with equivalent reference numerals as discussed above, including any potential variations in the features.

Head-on incident ambient light ray 404 with polarisation state 360 is transmitted without substantial reflection from the reflective polariser 302.

By comparison light ray 406 undergoes a phase shift for orthogonal components of light at the polar control retarder 300 such that states 364A, 364B for the regions 320A, 320B respectively illuminate the reflective polariser 302. The resolved polarisation state 366 that is orthogonal to the electric vector transmission direction 303 of the reflective polariser 302 is reflected and is passed through the polar retarder 300 such that polarisation states 368A, 368B for the regions 320A, 320B respectively are incident on to the additional polariser 318. The components of the states 368A, 368B that are parallel to the electric vector transmission direction of the polariser 318 are thus transmitted. To an off-axis observer 47, the display appears to have increased reflectivity, with different reflectivity for region 320A, and the remainder 320B region. Said increased reflectivity advantageously achieves increased security factor, S as will be described further hereinbelow.

The operation of the privacy display of FIG. 1A will now be described with reference to the illustrative embodiment of TABLE 1.

FIG. 3A is a schematic graph illustrating the polar variation of backlight 20 luminous intensity for an illustrative backlight 20 of FIG. 1A. In the present disclosure, the term "polar angle" refers to the direction of viewing of the display by an observer 45, 47. In the following description, the polar angle is described using a coordinate convention having an elevation coordinate angle and a lateral coordinate angle. In an alternative coordinate convention, the polar angle may have a polar coordinate angle (which is different to the polar angle referred to herein) which is the angle of inclination from the normal direction to a plane, and the azimuthal coordinate angle which is the rotation angle in the said plane from a reference direction in said plane. In the present embodiments, the nominal polar angle for an on-axis observer 45 is marked by polar angle 445 and the nominal polar angle for an on-axis observer 47 with no elevation angle is marked by polar angle 447.

Figures 3B, 3C, 3D, 3E, 3F, 3G:
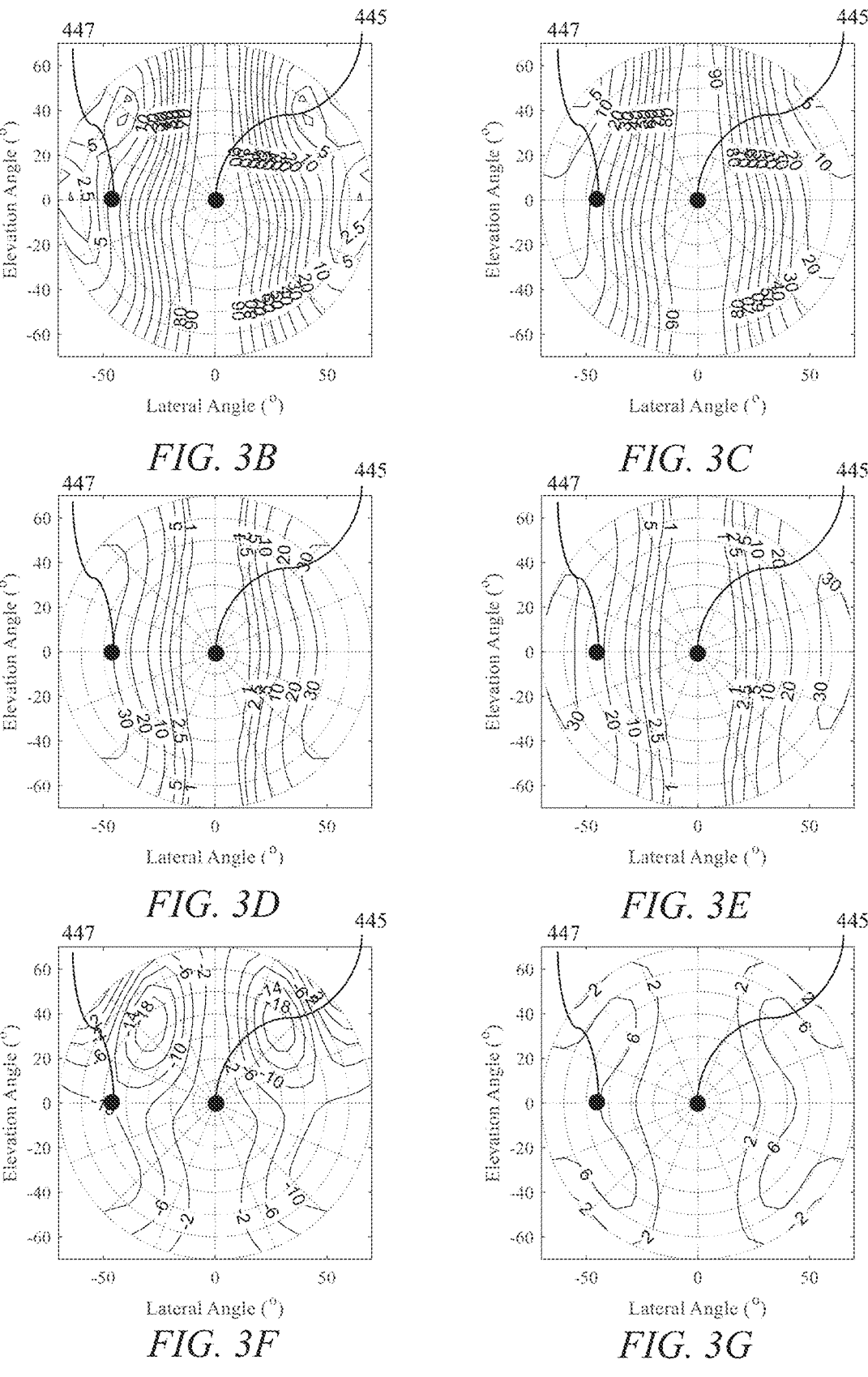
FIG. 3B is a schematic graph illustrating the polar variation of transmission for a view angle control element of TABLE 1 and of FIG. 1A in the at least one region of the layer of liquid crystal material.
FIG. 3C is a schematic graph illustrating the polar variation of transmission for a view angle control element of TABLE 1 and of FIG. 1A in the remainder of the layer of liquid crystal material.
FIG. 3D is a schematic graph illustrating the polar variation of reflectivity for a view angle control element of TABLE 1 and of FIG. 1A in the at least one region of the layer of liquid crystal material.
FIG. 3E is a schematic graph illustrating the polar variation of reflectivity for a view angle control element of TABLE 1 and of FIG. 1A in the remainder of the layer of liquid crystal material.
FIG. 3F is a schematic graph illustrating the polar variation of difference of luminance for a view angle control element of TABLE 1 and of FIG. 1A between the at least one region and the remainder of the layer of liquid crystal material.
FIG. 3G is a schematic graph illustrating the polar variation of difference of reflectivity for a view angle control element of TABLE 1 and of FIG. 1A between the at least one region and the remainder of the layer of liquid crystal material.

FIG. 3B is a schematic graph illustrating the polar variation of transmission for a view angle control element 102 of TABLE 1 and of FIG. 1A in the at least one region 320A of the layer 314 of liquid crystal material 414; FIG. 3C is a schematic graph illustrating the polar variation of transmission for a view angle control element 102 of TABLE 1 and of FIG. 1A in the remainder 320B of the layer 314 of liquid crystal material 414; FIG. 3D is a schematic graph illustrating the polar variation of reflectivity for a view angle control element 102 of TABLE 1 and of FIG. 1A in the at least one region 320A of the layer 314 of liquid crystal material 414; and FIG. 3E is a schematic graph illustrating the polar variation of reflectivity for a view angle control element 102 of TABLE 1 and of FIG. 1A in the remainder 320B of the layer 314 of liquid crystal material 414.

FIGS. 3B-E each illustrate that for the predetermined viewing axis 445 then the transmission is maximised, which may be normal to the display device 100 or in another direction different to the normal direction. Considering FIG.

1D and FIG. 2A, in the predetermined viewing axis 445, no phase shift is provided to orthogonal polarisation components of light from the first polariser 310, 302 with polarisation component direction 303 and so the same polarisation state is passed through the layer 314 of liquid crystal material 414 and passive compensation retarder 330 to be transmitted through the additional polariser 318 with maximum transmission and minimum reflectivity from reflective polariser 302.

By way of comparison, in the non-viewing axis 447 for the polarisation state with component 303 propagating through the polar control retarder 300 then a phase shift for orthogonal components of light occurs to output most generally an elliptical polarisation state 362A, 362B and the additional polariser 318 passes only a proportion of the light, reducing transmission and increasing reflectivity accordingly.

FIGS. 3B-E illustrate that the relative phase shifts introduced to orthogonal polarisation components of light along the non-viewing axis 447 in both the at least one region 320A and the remainder 320B of the layer 314 of liquid crystal material 414 are greater than the relative phase shifts introduced to orthogonal polarisation components of light along the viewing axis 445 in the at least one region 320A and the remainder 320B of the layer 314 of liquid crystal material 414.

FIG. 3F is a schematic graph illustrating the polar variation of difference of luminance for a view angle control element 102 of TABLE 1 and of FIG. 1A between the at least one region 320A and the remainder 320B of the layer 314 of liquid crystal material 414; and FIG. 3G is a schematic graph illustrating the polar variation of difference of reflectivity for a view angle control element 102 of TABLE 1 and of FIG. 1A between the at least one region 320A and the remainder 320B of the layer 314 of liquid crystal material 414.

In the predetermined viewing axis 445 then the relative phase shift for the regions 320A, 320B is the same and there is no difference in the transmission or reflectivity of the view angle control element 102. By comparison in the non-viewing axis 447 then the relative phase shift for the regions 320A, 320B is different and there is a difference in the transmission and reflectivity of the view angle control element 102.

Such differences in transmission and reflectivity for the regions 320A, 320B may provide difference in security factor. Variation of security factor with polar angle for different arrangements will now be described.

The view angle control element 102 of the present embodiments may be alternatively termed an optical angular filter comprising the mark 322. The view angle control element 102 provides optical filtering of transmission such that the output luminance from the filter varies with polar direction and has angular transmission properties that are different across the filter to provide the mark 322.

Figures 4A, 4B, 4C:
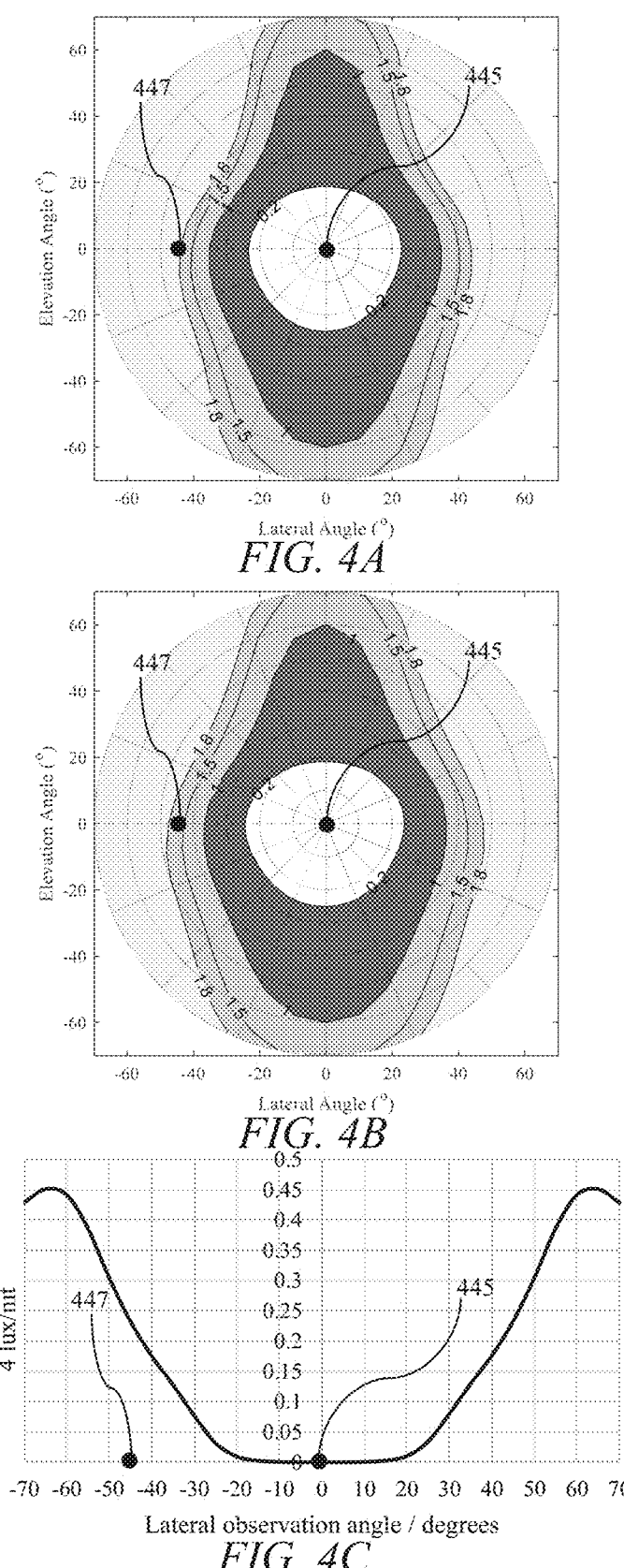
FIG. 4A is a schematic graph illustrating the polar variation of security factor for the display of FIG. 1A, backlight of FIG. 3A and polar control retarder of TABLE 1 for a lux-per-nit ratio α of 4.0 in the at least one region.
FIG. 4B is a schematic graph illustrating the polar variation of security factor for the display of FIG. 1A, backlight of FIG. 3A and TABLE 1 for a lux-per-nit ratio α of 4.0 in the remainder of the layer of liquid crystal material.
FIG. 4C is a schematic graph illustrating the polar variation of difference of security factor for the display of FIG. 1A, backlight of FIG. 3A and TABLE 1 for a lux-per-nit ratio α of 4.0 between the at least one region and in the remainder of the layer of liquid crystal material.

FIG. 4A is a schematic graph illustrating the polar variation of security factor for the display of FIG. 1A, backlight 20 of FIG. 3A and polar control retarder 300 of TABLE 1 for a lux-per-nit ratio α of 4.0 in the at least one region 320A; FIG. 4B is a schematic graph illustrating the polar variation of security factor for the display of FIG. 1A, backlight 20 and polar control retarder 300 of FIG. 3A and TABLE 1 for a lux-per-nit ratio α of 4.0 in the remainder 320B of the layer 314 of liquid crystal material 414; and FIG. 4C is a schematic graph illustrating the polar variation of difference of security factor for the display of FIG. 1A, backlight 20 of FIG. 3A and polar control retarders 300 of TABLE 1 for a lux-per-nit ratio α of 4.0 between the at least one region 320A and in the remainder 320B of the layer 314 of liquid crystal material 414. Features of the embodiment of FIGS. 4A-C not discussed in further detail may be assumed to correspond to the features with equivalent reference numerals as discussed above, including any potential variations in the features.

In FIGS. 4A-B, contours of iso-security factor are illustrated that indicate the size of the polar regions for which various levels of image security, S are achieved as established by human factors measurement described hereinabove.

For an observer 45 along the predetermined viewing axis 445, the security factor SA provided by the at least one region 320A is substantially the same as the security factor SB provided by the remainder 320B regions because the relative phase shifts between the regions 320A, 320B are sufficiently small, that is the polarisation states 361A, 361B of FIG. 2A are sufficiently similar. Similarly considering FIG. 2B, the display reflectivity is substantially the same. The mark 322 is not visible to the observer 45.

For an observer 47 along the non-viewing axis 447, the security factor SA provided by the at least one region 320A is different to the security factor SB provided by the remainder 320B regions because the relative phase shifts between the regions 320A, 320B are different, that is the polarisation states 362A, 362B of FIG. 2A are different and the transmission through the additional polariser 318 is different. Similarly considering FIG. 2B, the display reflectivity is different. Thus the mark 322 is visible to the observer 47.

Considering FIGS. 4A-B, the security factor S along the predetermined viewing axis 445 is less than 0.2 for both the regions 320A, 320B and thus the displayed image appears visible in both regions 320A, 320B and no mark 322 is visible. The security factors SA, SB along the non-viewing axis 447 are each greater than 1.0 for each of the regions 320A, 320B and thus the display appears private in both regions 320A, 320B while the mark 322 is visible because of the difference in security factors SA, SB. The relative phase shifts introduced to orthogonal polarisation components of light along the non-viewing axis 447 (providing the polarisation states 362A, 362B in FIG. 2A and the polarisation states 368A, 368B in FIG. 2B) are sufficiently high that the operational image is not visible, when a security factor $S_n$ defined at the angle in question is, for each of the regions 320A, 320B at least 1.0, where the security factor $S_n$ is given by the equation:

$$S_n = \log_{10}\left[1 + \rho_n \cdot \alpha/(\pi \cdot P_n)\right] \qquad \text{eqn. 12}$$

wherein $\rho_n$ is the reflectivity of the display device 100 at the angle in question; $P_n$ is the ratio of the luminance of the display device 100 at the angle in question to the maximum luminance of the display device 100; $\pi$ is a solid angle in units of steradians; and $\alpha$ is a factor having a value of 4.0 steradians.

Considering FIG. 4C, along the predetermined viewing axis 445 there is substantially no difference in security factor, S, for example the difference in security factor is less than 0.01 within 20 degrees of the axis 445 laterally. Along the non-viewing axis 447 the difference in security factor S is greater than 0.2, and the security factors for regions 320A, 320B are both greater than 1.0. Thus relative phase shifts are introduced to orthogonal polarisation components of light that are different in the at least one region 320A and the remainder 320B of the layer of liquid crystal material such that the mark 322 is visible.

The appearance of the display device 100 of FIG. 1A in a laptop computer 110 will now be described.

Figure 5A:
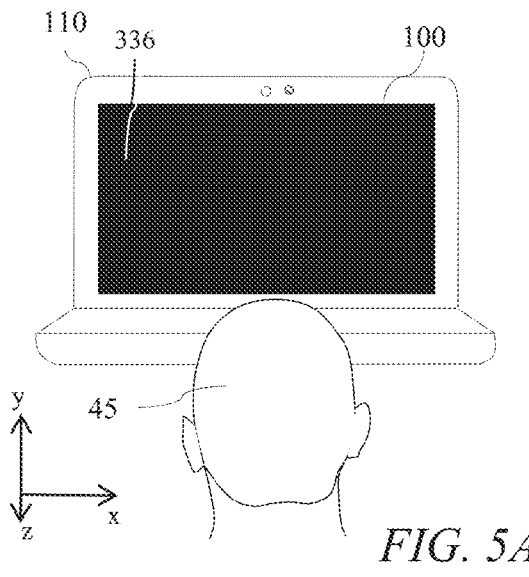
FIG. 5A is a schematic diagram illustrating a front perspective view of a laptop illuminated by an ambient light source comprising a view angle control element such as in FIG. 1A comprising a liquid crystal retarder comprising a mark wherein no light is output from the spatial light modulator.
Figure 5B:
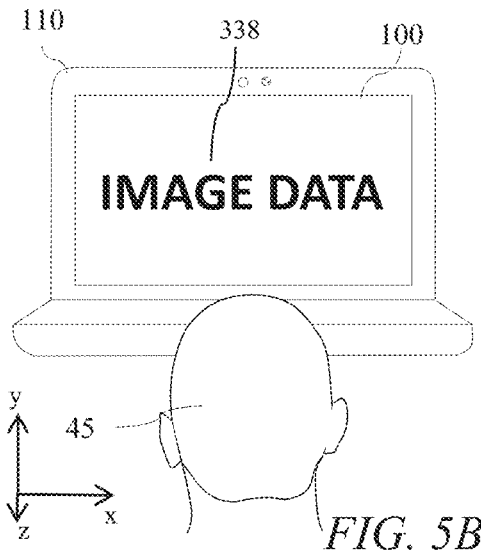
FIG. 5B is a schematic diagram illustrating a front perspective view of a laptop illuminated by an ambient light source comprising a view angle control element such as in FIG. 1A comprising a liquid crystal retarder comprising a mark wherein an image is output from the spatial light modulator.
Figure 5C:
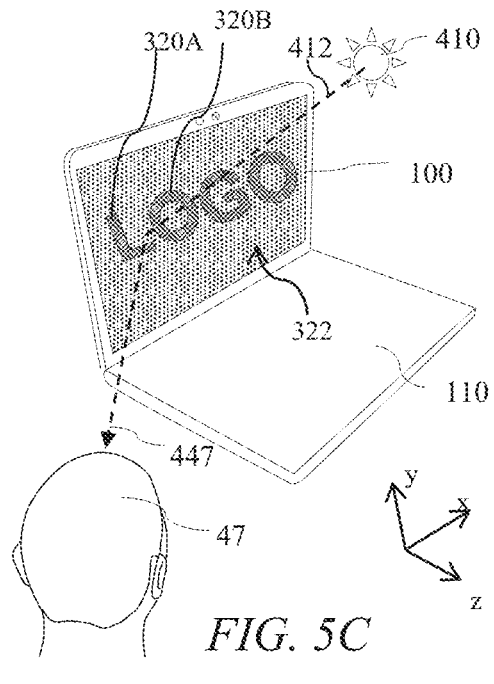
FIG. 5C is a schematic diagram illustrating a look-down off-axis perspective view of a laptop illuminated by an ambient light source comprising a privacy display device comprising a view angle control element such as in FIG. 1A comprising a liquid crystal retarder comprising a mark.

FIG. 5A is a schematic diagram illustrating a front perspective view of a laptop computer 110 illuminated by an ambient light source 410 comprising a privacy display device 100 comprising a liquid crystal retarder 301 with mark 322 wherein no light 400 is output from the spatial light modulator 48; FIG. 5B is a schematic diagram illustrating a front perspective view of a laptop computer 110 illuminated by an ambient light source 410 comprising a privacy display device 100 comprising a liquid crystal retarder 301 with mark 322 wherein an image is output from the spatial light modulator 48; and FIG. 5C is a schematic diagram illustrating a look-down off-axis perspective view of a laptop 110 illuminated by an ambient light source 410 comprising a privacy display device 100 comprising a view angle control element 102 such as in FIG. 1A comprising a liquid crystal retarder 301 comprising a mark 322. Features of the embodiment of FIGS. 5A-C not discussed in further detail may be assumed to correspond to the features with equivalent reference numerals as discussed above, including any potential variations in the features.

In the alternative embodiments of FIGS. 5A-B, the observer 45 sees no mark and either sees a dark image 336 or sees the image data 338 respectively. Advantageously no mark is seen so the operation of the display for the observer 45 is not modified in comparison to the spatial light modulator 48 without the view angle control element 102.

By way of comparison FIG. 5C shows that whether or not an image 338 is provided on the spatial light modulator 48, a security factor, S that is at least 1.0 is provided to the non-viewing direction 447. In the mode of operation of FIG. 5A with no image, a mark 322 may be seen when the spatial light modulator 48 is not switched on arising from difference in reflectivity between the regions 320A, 320B. The display device 100 may advantageously achieve the mark 322 visibility in direction 447 with advantageously no power consumption of the display device 100. Such an arrangement may be provided in a sleep mode of operation. Such an arrangement may also be provided in a sales mode of operation, when the mark 322 is provided to achieve branding or other aesthetic appeal to prospective purchasers. Safety information may alternatively be provided for example.

In the mode of operation of FIG. 5B with a displayed image, the observer 45 may see an image without the observer 47 seeing the image as illustrated in FIG. 5C. The mark 322 may be seen when the spatial light modulator 48 is switched on arising from difference in reflectivity and small difference in transmission from the image between the regions 320A. 320B. Advantageously private operation may be achieved with visibility of the mark 322.

In the present disclosure, a wide angle may be a polar angle of 45° from a normal to the display device at a predetermined azimuth angle around the normal to the display device 100; and the narrow angle may be in a range of polar angles of from 0° to 20° from a normal to the spatial light modulator at the predetermined azimuth angle. No or small visibility of the mark 322 may be achieved at narrow angles and clear mark 322 visibility may be achieved at wide angles.

By way of comparison with the present embodiments, some types of prior art privacy display provide a security factor that is insufficient for making the image not visible at wide angles in the privacy mode of operation at desirable levels of illuminance and maximum display luminance. To compensate for insufficient security factor S, prior art camouflage displays provide a disruptive structure which add an image disruption pattern to the image seen by an off-axis snooper. While some implementations may involve patterning of a liquid crystal retarder 301 to form the disruptive pattern, the purpose is different from the techniques described herein, with the result that the shape of the pattern and the operation is different. Typically, in a narrow-angle operational display mode, parts of the operational image seen by an off-axis observer are visible through regions of the display forming the disruptive pattern, but the shape of the disruptive pattern is chosen so that when the parts of the image are seen through it, then the content of the operational image is disrupted and so in principle the overall operational image is not difficult to perceive. The purpose and function of camouflage displays is thus different to the purpose of the mark modes of the present embodiments, and in the narrow-angle operational display mode a camouflage display is operated to allow the image to be visible through the disruptive pattern, which is not the case in the narrow-angle operational display mode described herein.

Figure 5D:
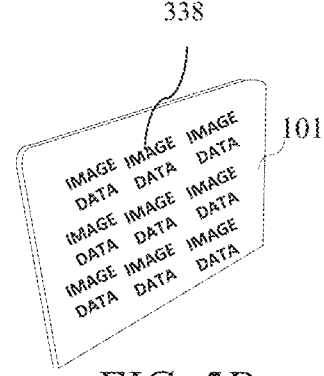
FIG. 5D is a schematic diagram illustrating a look-down off-axis perspective view of a non-privacy display device providing image data.
Figure 5E:
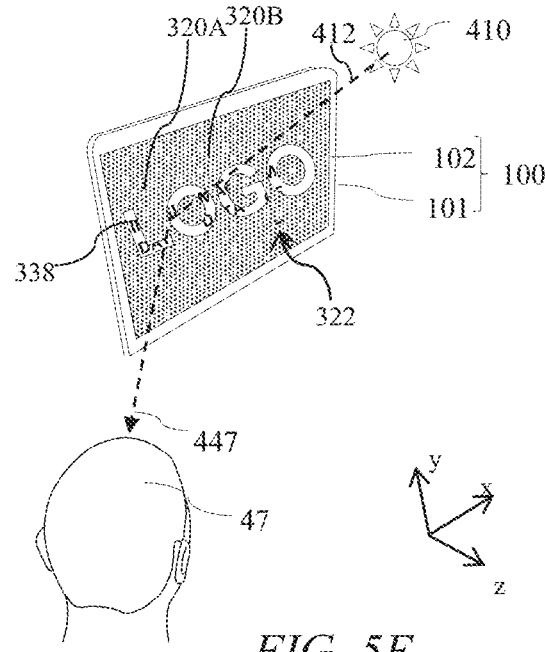
FIG. 5E is a schematic diagram illustrating a look-down off-axis perspective view of the privacy display device of FIG. 5D further comprising a view angle control element wherein the mark is arranged to provide visibility of underlying image information and the remainder of the layer of liquid crystal material is arranged to provide high image security.

FIG. 5D is a schematic diagram illustrating a look-down off-axis perspective view of a non-privacy display device 101 providing image data 338; and FIG. 5E is a schematic diagram illustrating a look-down off-axis perspective view of the display device 101 of FIG. 5D further comprising a view angle control element 102 wherein the mark 322 is arranged to provide visibility of underlying image data 338 and the remainder of the layer 314 of liquid crystal material 414 of the view angle control element 102 is arranged to provide image security to the observer 47. Features of the embodiments of FIGS. 5D-E not discussed in further detail may be assumed to correspond to the features with equivalent reference numerals as discussed above, including any potential variations in the features.

The privacy display 100 may be provided by attaching the view angle control element 102 to the display 101 either in manufacture or by a display user when privacy operation is desirable.

In the alternative embodiment of FIG. 5E only one of the at least one region 320A and the remainder 320B region is provided with high image security along axis 447. In operation, the observer 45 sees the image information clearly across the display device 100, while the observer 47 sees some of the image data 338 through the mark 322 region 320A. Advantageously the contrast ratio of the mark 322 may be increased while the image data 338 may be arranged to minimise the information supplied to the observer 47 that may be considered private.

The display device 100 of the present embodiments may be provided in at least monitors, laptops, graphical terminals (such as point of sale terminals), mobile phones and other display devices including automotive display. An arrangement of the display device 100 in an automotive vehicle 600 will now be described.

FIG. 6 is a schematic diagram illustrating a top view of an automotive vehicle 600 comprising a privacy passenger infotainment privacy display 100. Features of the embodiment of FIG. 6 not discussed in further detail may be assumed to correspond to the features with equivalent reference numerals as discussed above, including any potential variations in the features.

In comparison to the laptop 110, the privacy display device 100 for example for use as a passenger infotainment display device 100 may be arranged to minimise distraction to the observer 47 that is a driver and to provide high image visibility to the observer 45 that is a passenger or co-driver. In the alternative embodiment of FIG. 6, the direction 445 may not be normal to the display device 100 to suit the cabin geometry of the vehicle 600.

The passenger observer 45 may advantageously view infotainment images. The visibility of user image 338 on the display device 100 at angles for which the driver observer 47 can lean towards the optical axis 199 of the display device 100 is advantageously reduced, and driver distraction reduced, advantageously increasing safety of operation of the display device 100.

Further, the mark 322 may be provided with low power consumption so that the driver observer 47 sees mark 322 at least: when no passenger observer 45 is viewing the display device 100; in a vehicle showroom; when the vehicle is configured in courtesy mode; or when the ambient illumination conditions and driver observer 47 location are unsuitable for desirable limits of security factor S to achieve low driver distraction, in which case a non-distracting image 338 may be presented on the display device 100 for viewing by the passenger observer 45.

In prior art non-private displays it is from time to time considered desirable to provide very low display reflectivity to achieve no driver distraction, for example a "piano-black" appearance can be considered aesthetically pleasing. Privacy displays typically rely on display reflectivity to achieve desirable security factors for low driver distraction and so privacy displays do not typically have a piano black appearance. Advantageously, the mark 322 appearance may achieve an enhanced aesthetic appearance for displays that use reflectivity to enhance display privacy performance, that is displays that do not have a piano-black appearance when no image is provided. For example, the driver observer 47 may perceive a display vehicle brand mark 322 on the display surface while the passenger observer 45 does not see the logo. The brand logo mark region may have a higher reflectivity than the background region, or may have a lower reflectivity, depending on aesthetic preference that may be selected by the manufacturer or display user.

Further the appearance of the mark 320A in mark display mode may be arranged to be similar to that of the vehicle aesthetic environment such as the dashboard appearance. Further the colour of reflectivity of the display may be modified by insertion of colour filter 380, for example as illustrated in the alternative embodiment of FIG. 1B. Alternatively the colour of reflectivity may be modified by selecting polarisers with a desirable transmission spectrum.

Arrangements for non-electronic display will now be described.

FIG. 7A is a schematic diagram illustrating a perspective front view of a transparent film 106 for viewing a real object 800 placed behind the transparent film 106; and FIG. 7B is a schematic diagram illustrating a perspective side view of a transparent film 106 for viewing a real object 800 placed behind the transparent film 106. Features of the embodiment of FIGS. 7A-B not discussed in further detail may be assumed to correspond to the features with equivalent reference numerals as discussed above, including any potential variations in the features.

Figure 8A:
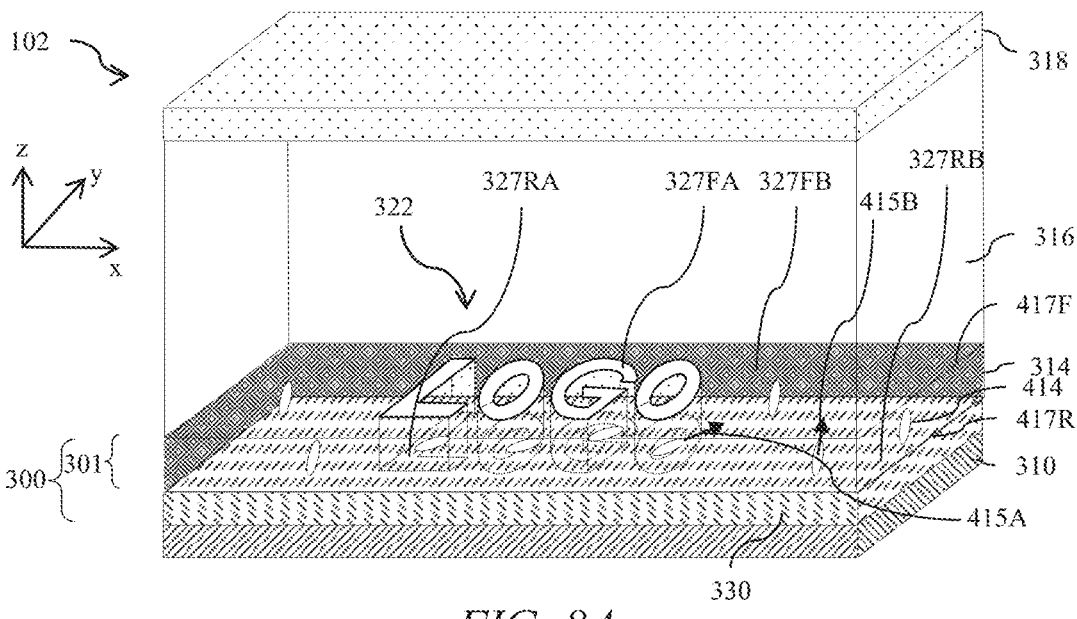
FIG. 8A is a schematic diagram illustrating a front perspective view of a view angle control element comprising a reflective polariser, a passive compensation retarder, a liquid crystal retarder comprising a mark, a support substrate and an additional polariser.

A transparent sheet 106 that may provide a rigid support substrate has a view angle control element 102 fixed thereto wherein the view angle control element 102 comprises a first polariser 310, an additional polariser 318 and a liquid crystal retarder 301 comprising a mark such as illustrated in FIG. 8A hereinbelow. The transparent sheet 106 may be a glass or Perspex sheet for example. In other embodiments, the view angle control element 102 may be provided without a rigid support substrate or may be omitted.

In operation, the view angle control element 102 is arranged between the observers 45, 47 and a background object 800. Observer 45 sees the object 800 through the view angle control element 102 while observer 47 sees the mark 322. Advertising, architectural and other object 800 observation applications may be provided advantageously with privacy functionality while achieving display of the mark 322 to non-viewing observers 47.

Alternatives for component stackings for view angle control elements 102 will now be described.

Figure 8B:
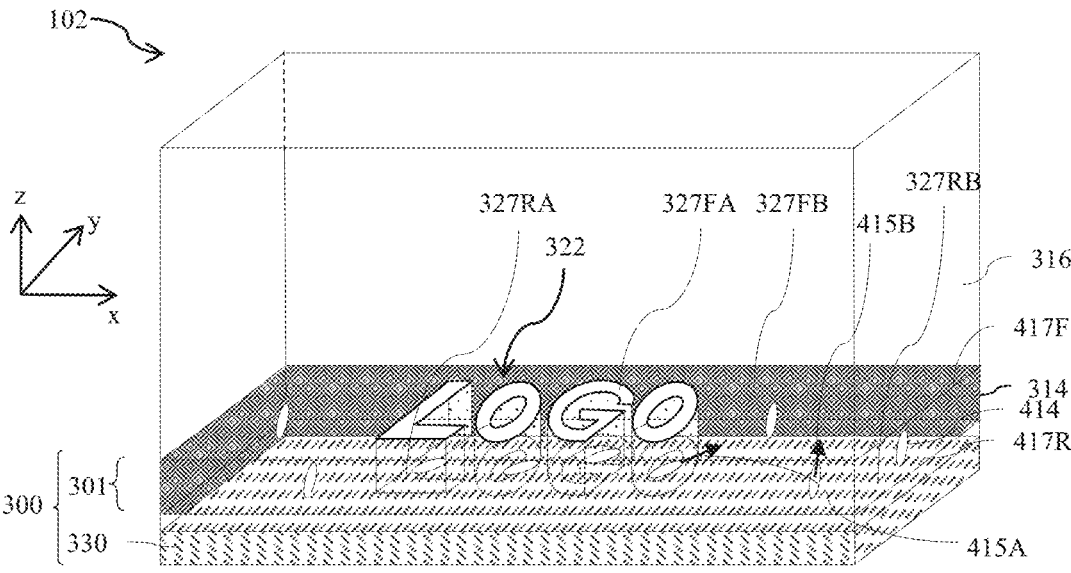
FIG. 8B is a schematic diagram illustrating a front perspective view of a view angle control element comprising a passive compensation retarder, a liquid crystal retarder comprising a mark, and a support substrate.
Figure 8C:
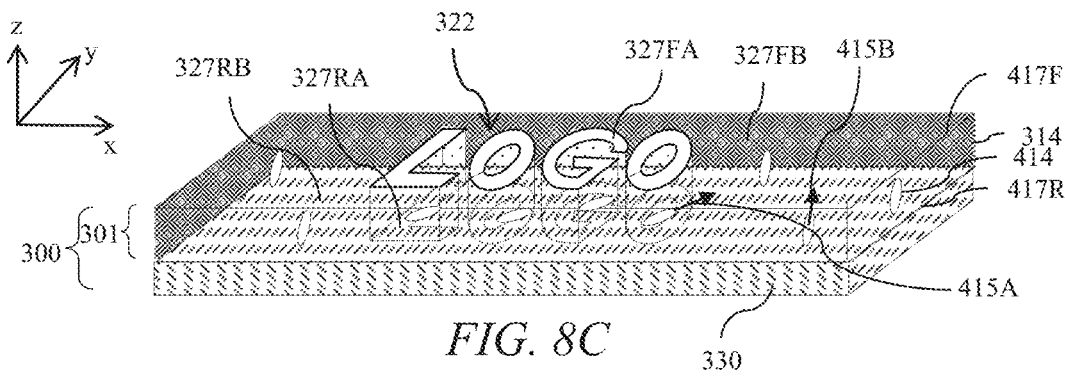
FIG. 8C is a schematic diagram illustrating a front perspective view of a view angle control element comprising a passive compensation retarder and a liquid crystal retarder comprising a mark.

FIG. 8A is a schematic diagram illustrating a front perspective view of a view angle control element 102 comprising a first polariser 310, a passive compensation retarder 330, liquid crystal retarder 301 comprising a mark 322, a support substrate and an additional polariser 318; FIG. 8B is a schematic diagram illustrating a front perspective view of a view angle control element 102 comprising a passive compensation retarder 330 and a liquid crystal retarder 301 comprising a mark 322; and FIG. 8C is a schematic diagram illustrating a front perspective view of a view angle control element 102 comprising a liquid crystal retarder 301 comprising a mark 322. Features of the embodiments of FIGS. 8A-C not discussed in further detail may be assumed to correspond to the features with equivalent reference numerals as discussed above, including any potential variations in the features.

The embodiment of FIG. 1A illustrates a view angle control element 102 wherein the first polariser 310 comprises a reflective polariser. The embodiment of FIG. 1B illustrates a view angle control element 102 wherein the first polariser 310 comprises the output display polariser 218 and the embodiment of FIG. 1C illustrates a view angle control element 102 wherein the first polariser 310 comprises the input display polariser 210.

In the alternative embodiment of FIG. 8A, the view angle control element 102 further comprises the first polariser 310 wherein the first polariser 310 may comprise an absorbing polariser or may comprise a reflective polariser 302, for example as illustrated in FIG. 1A. Advantageously the view angle control element 102 may be applied by fitting either in manufacture of a privacy display or after manufacture to a display device 100, or to a transparent substrate 106 such as illustrated in FIG. 7A-B hereinabove.

In the alternative embodiment of FIG. 8B, the view angle control element 102 may comprise neither of polarisers 310, 318. Polariser selection may be provided during manufacture to provide selection of performance, cost, reflectivity and mode of operation for a particular build of privacy display device 100.

In the alternative embodiment of FIG. 8C, the view angle control element 102 may comprise no support substrate 316. Passive compensation retarder 330 may provide support of the layer 314 of liquid crystal material 414. Advantageously thickness may be reduced.

Figure 8D:
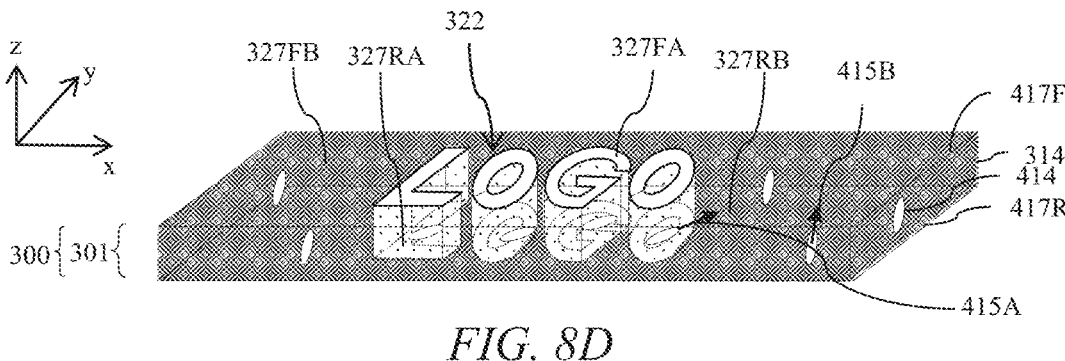
FIG. 8D is a schematic diagram illustrating a front perspective view of a view angle control element comprising a liquid crystal retarder comprising a mark.

In the alternative embodiment of FIG. 8D, the view angle control element 102 may comprise only the layer 314 of liquid crystal material 414. Advantageously thickness may be reduced. Passive compensation retarder 330 selection may be provided during manufacture to provide selection of performance, cost and mode of operation for a particular build of privacy display device 100.

Figure 8E:
FIG. 8E is a schematic diagram illustrating a side view of a view angle control element comprising various layers of optical components.

FIG. 8E is a schematic diagram illustrating a side view of a view angle control element 102 comprising various layers of optical components as illustrated in TABLE 2. Features of the embodiment of FIG. 8E not discussed in further detail may be assumed to correspond to the features with equivalent reference numerals as discussed above, including any potential variations in the features.

TABLE 2

| Layer | Item |
|---|---|
| 305F | Empty/Additional Polariser 318 |
| 305D | Empty/Quarter-wave plate 326B |
| 305B | Empty/Passive compensation retarder 330 and/or Substrate 316 |
| 305A | Liquid crystal retarder 301 |
| 305C | Passive compensation retarder 330 and/or Substrate 316/Empty |
| 305E | Empty/Quarter-wave plate 326B |
| 305G | Empty/First polariser 310 |

Alternative arrangement of liquid crystal directors 415 in regions 320A, 320B will now be described.

Figures 9A, 9B, 9C:
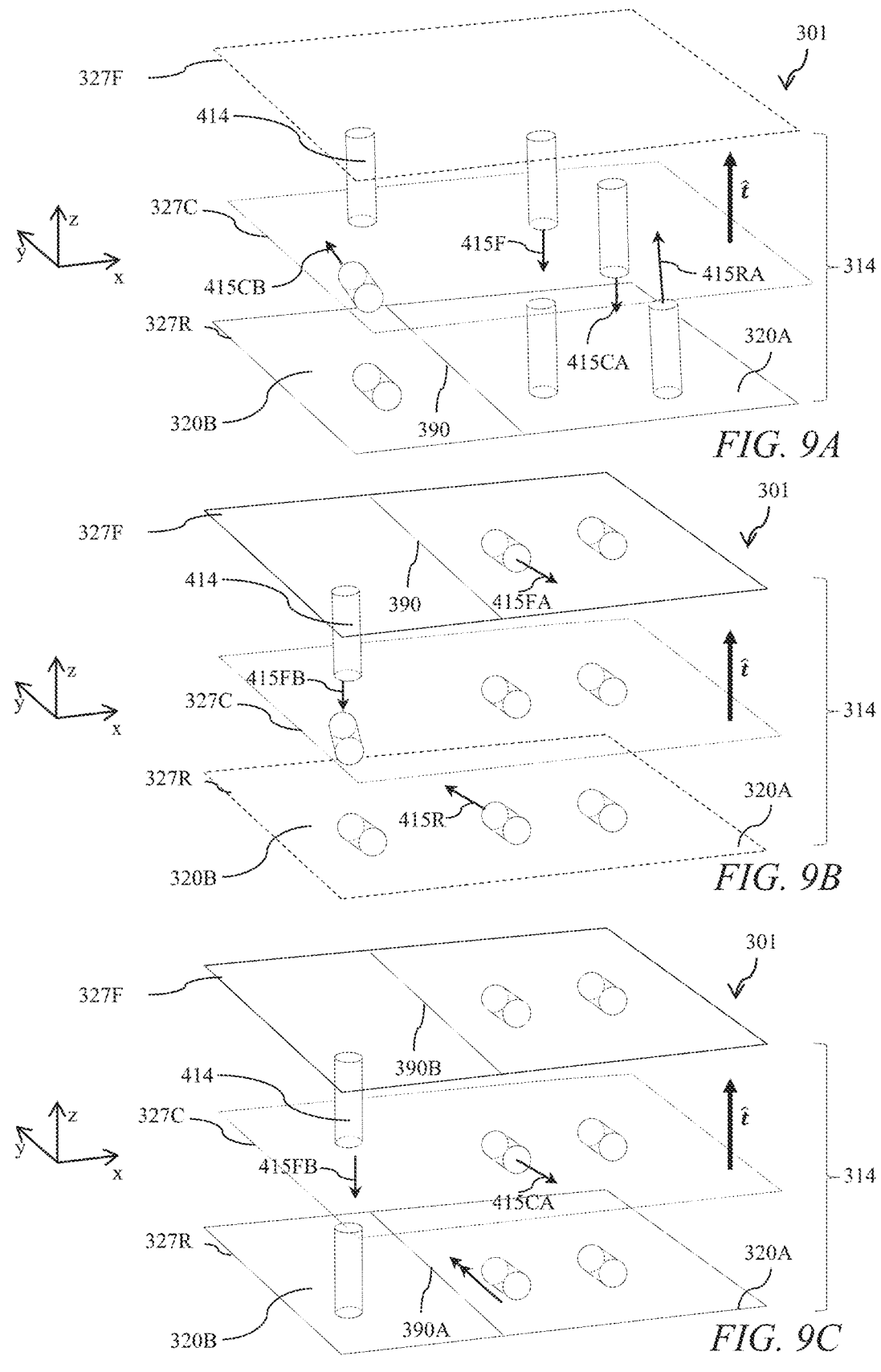
FIG. 9A is a schematic diagram illustrating a front perspective view of birefringent molecule alignments for a liquid crystal retarder wherein the electric vector transmission directions of the first polariser and the additional polariser are as illustrated in FIG. 1D and illustrating patterned homogeneous and homeotropic alignments at the first liquid crystal interface and homeotropic alignment of the liquid crystal material at the second liquid crystal interface.
FIG. 9B is a schematic diagram illustrating a front perspective view of birefringent molecule alignments for a liquid crystal retarder wherein the electric vector transmission directions of the first polariser and the additional polariser are as illustrated in FIG. 1D and illustrating patterned homogeneous and homeotropic alignments at the second liquid crystal interface and homogeneous alignment of the liquid crystal material at the first liquid crystal interface.
FIG. 9C is a schematic diagram illustrating a front perspective view of birefringent molecule alignments for a liquid crystal retarder for arrangement wherein the electric vector transmission directions of the first polariser and the additional polariser are as illustrated in FIG. 1D and illustrating patterned homogeneous and homeotropic alignments at the first and second liquid crystal interfaces.

FIG. 9A is a schematic diagram illustrating a front perspective view of birefringent molecule alignments for a liquid crystal retarder 301 wherein the electric vector transmission directions of the first polariser 310 and the additional polariser 318 are as illustrated in FIG. 1E and illustrating patterned homogeneous and homeotropic alignments at the first liquid crystal interface 420A and homeotropic alignment of the liquid crystal material 414 at the second liquid crystal interface 420B; FIG. 9B is a schematic diagram illustrating a front perspective view of birefringent molecule alignments for a liquid crystal retarder 301 wherein the electric vector transmission directions 311, 319 of the first polariser 310 and the additional polariser 318 are as illustrated in FIG. 1E and illustrating patterned homogeneous and homeotropic alignments at the second liquid crystal interface 420B and homogeneous alignment of the liquid crystal material 414 at the first liquid crystal interface 420A; and FIG. 9C is a schematic diagram illustrating a front perspective view of birefringent molecule alignments for a liquid crystal retarder 301 for arrangement wherein the electric vector transmission directions of the first polariser 310 and the additional polariser 318 are as illustrated in FIG. 1E and illustrating patterned homogeneous and homeotropic alignments at the first and second liquid crystal interfaces 420A, 420B. Features of the embodiments of FIGS. 9A-C not discussed in further detail may be assumed to correspond to the features with equivalent reference numerals as discussed above, including any potential variations in the features.

In the alternative non-exhaustive embodiments of FIGS. 9A-C and TABLE 3, in comparison to FIG. 1E the alignment layers 417R, 417F are omitted and the surfaces 327A, 327B of the layer 314 of liquid crystal material 414 are shown. As described hereinbelow, alignment layers may be omitted during manufacture or may be removed after manufacture of the liquid crystal retarder 301.

TABLE 3

| FIG. | Region 320A | | Region 320B | |
|---|---|---|---|---|
| | Surface 327R | Surface 327F | Surface 327R | Surface 327F |
| 10A | Homeotropic | Homeotropic | Homogeneous | Homeotropic |
| 10B | Homogeneous | Homogeneous | Homogeneous | Homeotropic |
| 10C | Homogeneous | Homogeneous | Homeotropic | Homeotropic |

In the alternative embodiments of FIGS. 9A-B, the splay within the layer 314 provides for mid-layer plane 327C to have directors 415CA, 415CB that are different in the regions 320A, 320B of the liquid crystal retarder 301, achieving the same phase difference for orthogonal polarisation states along the predetermined axis 445 but different phase difference for orthogonal polarisation states along the non-viewing axis 447.

In the alternative embodiments of FIG. 9C, the two regions 320A, 320B also provide the same phase difference for orthogonal polarisation states along the predetermined axis 445 but different phase difference for orthogonal polarisation states along the non-viewing axis 447.

Figures 10A, 10B, 10C, 10D:
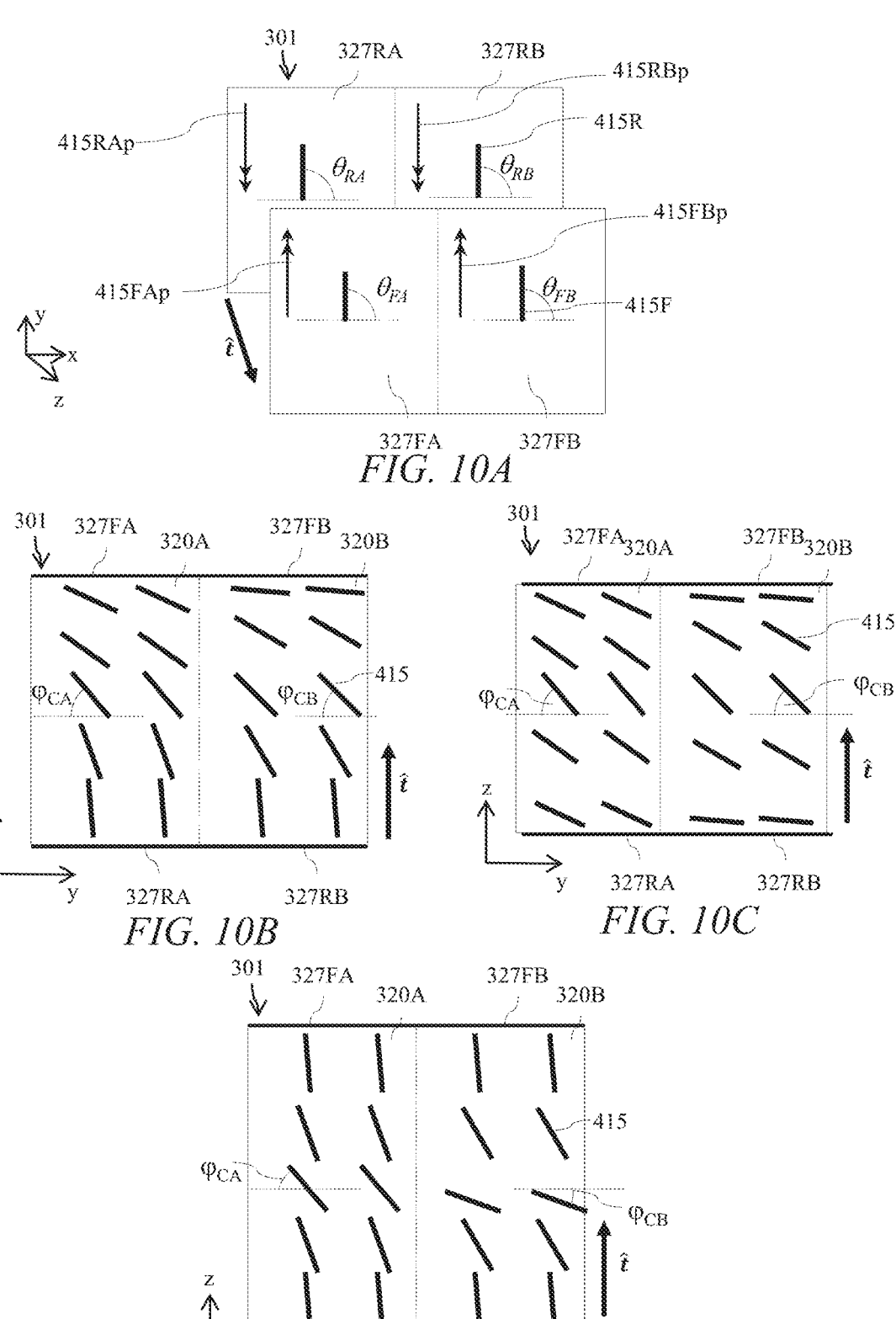
FIG. 10A is a schematic diagram illustrating a front perspective view of alignment of directors for a liquid crystal retarder comprising a mark wherein the alignment components of director in the plane of the layer are parallel.
FIG. 10B, FIG. 10C, FIG. 10D, FIG. 10E, FIG. 10F, FIG. 10G, and FIG. 10H are schematic diagrams illustrating side views of alignment of a liquid crystal retarder comprising a mark across a cross-sectional profile.

FIG. 10A is a schematic diagram illustrating a front perspective view of alignment of directors 415 for a liquid crystal retarder 301 comprising a mark 322; and FIGS. 10B-H are schematic diagrams illustrating side views of alignment of directors 415 of a liquid crystal retarder 301 comprising a mark 322 across a cross-sectional profile. Features of the embodiments of FIGS. 10A-H not discussed in further detail may be assumed to correspond to the features with equivalent reference numerals as discussed above, including any potential variations in the features.

In the alternative embodiments of FIGS. 10A-H, the directors 415R, 415F at rear and front surfaces 327R, 327F are each arranged to have components 415RAp, 415FAp, 415RBp, 415RAp in the plane of the surface 327R, 327F that are anti-parallel as illustrated in FIG. 10A. The angle $\theta_{RA}$ is the same as the angle $\theta_{FA}$ and the angle $\theta_{RB}$ is the same as the angle $\theta_{FB}$.

In the alternative embodiments of FIGS. 10B-H, the mid-layer tilts QCA, PCB of liquid crystal material 414 directors 415 are illustrated to be different in the regions 320A, 320B as described elsewhere herein.

The layer 314 of liquid crystal material 414 has director 415 directions at surfaces 327F, 327R on opposite sides of the layer 314 of liquid crystal material 414 in the at least one region 320A that are one of (a) homogenous at both surfaces 327F, 327R; (b) homogenous at one of the surfaces 327F, 327R and homeotropic at the other of the surfaces 327F, 327R; or (c) homeotropic at both surfaces 327F, 327R; and the layer 314 of liquid crystal material 414 has director 415 directions at surfaces 327F, 327R on opposite sides of the layer 314 of liquid crystal material 414 in the remainder 320B of the layer 314 of liquid crystal material 414 are one of (a) homogenous at both surfaces 327F, 327R; (b) homogenous at one of the surfaces 327F, 327R and homeotropic at the other of the surfaces 327F, 327R; or (c) homeotropic at both surfaces 327F, 327R, that is different from the at least one region 320A. FIGS. 10A-H and TABLE 4 illustrate non-exhaustive alternative embodiments for various alignments at the surfaces 327R, 327F of the layer 314 of liquid crystal material 414.

TABLE 4

| | Region 320A | | Region 320B | |
|---|---|---|---|---|
| FIG. | Surface 327RA | Surface 327FA | Surface 327RB | Surface 327FB |
| 11B | Homeotropic | Homogeneous | Homeotropic | Homogeneous |
| 11G | Homogeneous | Homogeneous | Homogeneous | Homogeneous |
| 11E | Homeotropic | Homeotropic | Homeotropic | Homeotropic |
| 11C | Homeotropic | Homogeneous | Homogeneous | Homeotropic |
| 11D | Homeotropic | Homogeneous | Homeotropic | Homeotropic |
| 11F | Homeotropic | Homogeneous | Homogeneous | Homogeneous |
| 11H | Homogeneous | Homogeneous | Homeotropic | Homeotropic |

In the alternative embodiment of FIG. 1E and FIG. 10B, the layer 314 of liquid crystal material 414 has director 415 directions at surfaces 327F, 327R on opposite sides of the layer 314 of liquid crystal material 414 that are homogenous at one of the surfaces 327F, 327R in the at least one region 320A and the remainder 320B of the layer 314 of liquid crystal material 414 and are homeotropic at the other of the surfaces 327F, 327R in the at least one region 320A and the remainder 320B of the layer 314 of liquid crystal material 414. In manufacture, such an arrangement may be achieved with a liquid crystal material provided with one of surfaces 327A, 327B provided on a homogeneous alignment layer and the other surface provided with homeotropic alignment layer due to the presence of a gas such as nitrogen or air and the other of the surfaces 327A, 327B. Advantageously complexity of manufacture may be reduced.

In the alternative embodiments of FIG. 10C, the layer 314 of liquid crystal material 414 has director 415 directions at surfaces 327F, 327R on opposite sides of the layer 314 of liquid crystal material 414 that are homogenous at both surfaces 327F, 327R in the at least one region 320A and the remainder 320B of the layer 314 of liquid crystal material 414. Homogeneous alignment layers may conveniently provide alignment to commonly available curable liquid crystal materials.

In the alternative embodiment of FIG. 10D, the layer 314 of liquid crystal material 414 has director 415 directions at surfaces 327F, 327R on opposite sides of the layer 314 of liquid crystal material 414 that are homeotropic at both surfaces 327F, 327R in the at least one region 320A and the remainder 320B of the layer 314 of liquid crystal material 414. The luminance profile of the polar variation of retardance may be achieved with improved roll-off and uniformity of transmission when the layer 314 is provided in a view angle control element 102.

In the alternative embodiments of FIGS. 9A-C, and FIGS. 10E-H, the layer 314 of liquid crystal material 414 has director 415 directions at surfaces 327F, 327R on opposite sides of the layer 314 of liquid crystal material 414 that are different in the at least one region 320A and the remainder 320B of the layer 314 of liquid crystal material 414. Control of the appearance of the mark 322 may be achieved by selection of the roll-off and luminance polar variations of the regions 320A, 320B. The visibility of the mark 322 may be improved by adjusting the difference in the luminance profiles.

Figures 11A, 11B, 11C, 11D, 11E:
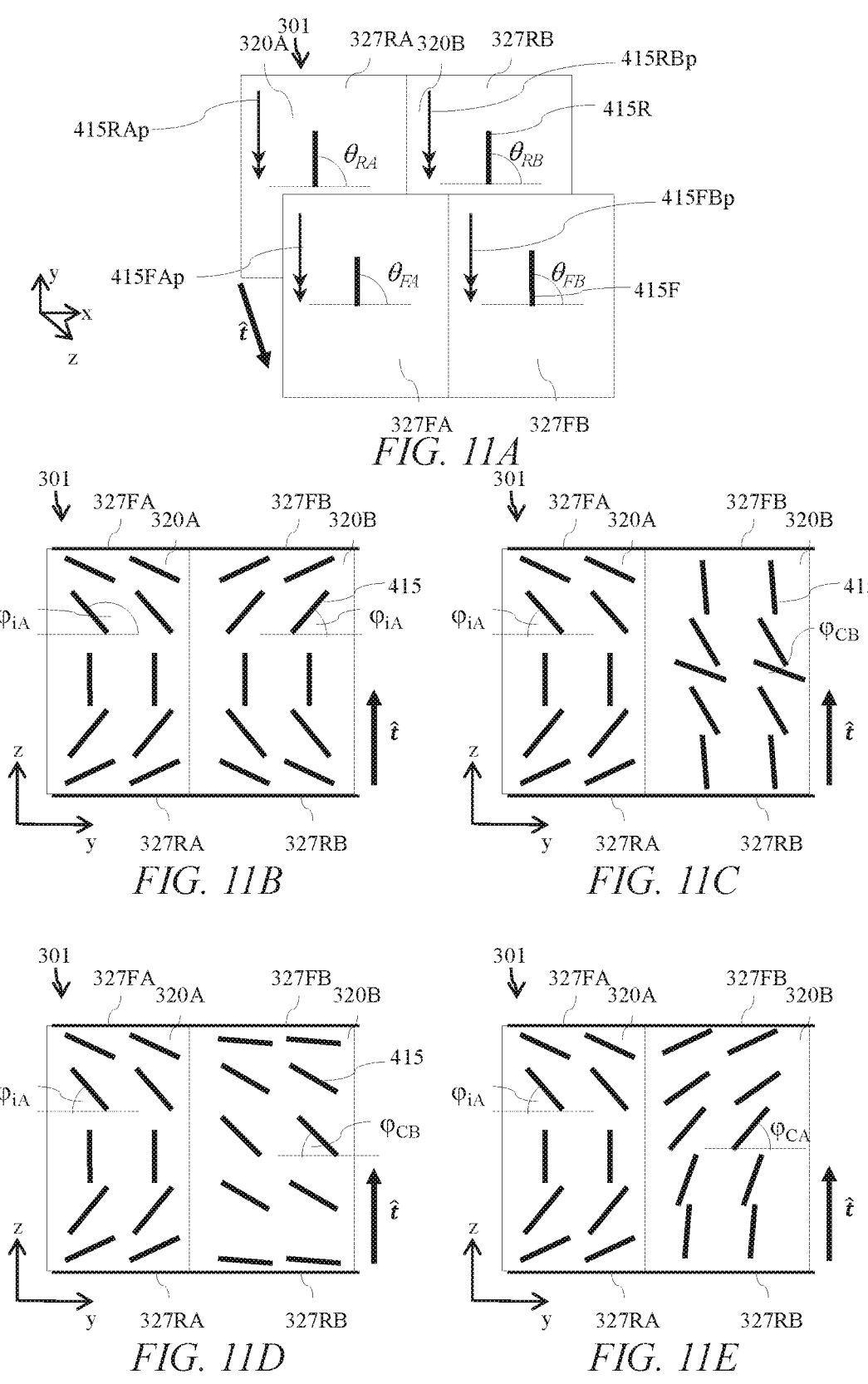
FIG. 11A is a schematic diagram illustrating a front perspective view of alignment of directors for a liquid crystal retarder comprising a mark wherein at least some of the alignment components of director in the plane of the layer are parallel.
FIG. 11B, FIG. 11C, FIG. 11D, and FIG. 11E are schematic diagrams illustrating side views of alignment of a liquid crystal retarder comprising a mark across a cross-sectional profile wherein at least some of the alignment components of director in the plane of the layer are parallel.

FIG. 11A is a schematic diagram illustrating a front perspective view of alignment of directors for a liquid crystal retarder comprising a mark wherein at least some of the alignment components of director in the plane of the layer are parallel; and FIGS. 11B-E are schematic diagrams illustrating side views of alignment of a liquid crystal retarder comprising a mark across a cross-sectional profile wherein at least some of the alignment components of director in the plane of the layer are parallel.

In the alternative embodiments of FIGS. 11A-E and TABLE 5, at least some of the directors 415R, 415F at rear and front surfaces 327R, 327F are arranged to have components 415RAp, 415FAp and components 415RBp, 415RAp in the plane of the surface 327R, 327F are parallel as illustrated in FIG. 11A. The angle $\theta_{RA}$ is the same as the angle $\theta_{FA}$ and the angle $\theta_{RB}$ is the same as the angle $\theta_{FB}$. The pretilt direction may be arranged to provide both directors 415RAp, 415FAp with the same direction that may be for example 'up' (positive y direction) or 'down' (negative y direction).

In the alternative embodiment of FIG. 11B, the tilts in an intermediate plane through the thickness $\hat{t}$ of the layer 314 $\varphi_{iA}$, $\varphi_{iB}$ of liquid crystal material 414 directors 415 are illustrated to be different in the regions 320A, 320B, providing a difference in transmission and reflection for the non-viewing axis 447.

In the alternative embodiments of FIGS. 11C-E, the region 320A comprises parallel alignment of components 415RAp, 415FAp and the region 320B may comprise anti-parallel alignment of components 415RBp, 415FBp.

TABLE 5

| | Region 320A | | | Region 320B | | |
|---|---|---|---|---|---|---|
| FIG. | Surface 327RA | Surface 327FA | Alignment 415RAp – 415FAp | Surface 327RB | Surface 327FB | Alignment 415RBp – 415FBp |
| 12B | Homogeneous | Homogeneous | Parallel 'down' | Homogeneous | Homogeneous | Parallel 'up' |
| 12C | Homogeneous | Homogeneous | Parallel 'down' | Homeotropic | Homeotropic | Anti-parallel |
| 12D | Homogeneous | Homogeneous | Parallel 'down' | Homogeneous | Homogeneous | Anti-parallel |
| 12E | Homogeneous | Homogeneous | Parallel 'down' | Homeotropic | Homogeneous | Anti-parallel |

In the alternative embodiments of FIG. 11B and FIG. 11D for example, the layer 314 of liquid crystal material 414 has director 415 directions at surfaces 327F, 327R on opposite sides of the layer 314 of liquid crystal material 414 that are homogenous at both surfaces 327F, 327R in the at least one material 414 in the thickness direction $\hat{t}$ that is as illustrated in FIGS. 10B-H and FIGS. 11B-E, with corresponding director 415 components 415RAp, 415FAp and director 415 components 415RBp, 415RAp in the plane of the surface 327R, 327F arranged with the corresponding twist $\phi_A$, $\phi_B$.

TABLE 6

| | Region 320A | | | Region 320B | | |
|---|---|---|---|---|---|---|
| FIG. | Surface 327RA director 415 angle $\theta_{RA}$ | Surface 327FA director 415 angle $\theta_{FA}$ | Twist $\phi_A$ | Surface 327RB director 415 angle $\theta_{RB}$ | Surface 327FB director 415 angle $\theta_{FB}$ | Twist $\phi_B$ |
| 13A | 85° | 85° | 0° | 95° | 95° | 0° |
| 13B | 85° | 90° | +5° | 95° | 90° | −5° |
| 13C | 40° | 130° | +90° | 50° | 140° | +90° |
| 13D | 40° | 135° | +95° | 50° | 135° | +85° | region 320A and the remainder 320B of the layer 314 of liquid crystal material 414.

Figures 10E, 10F, 10G, 10H:
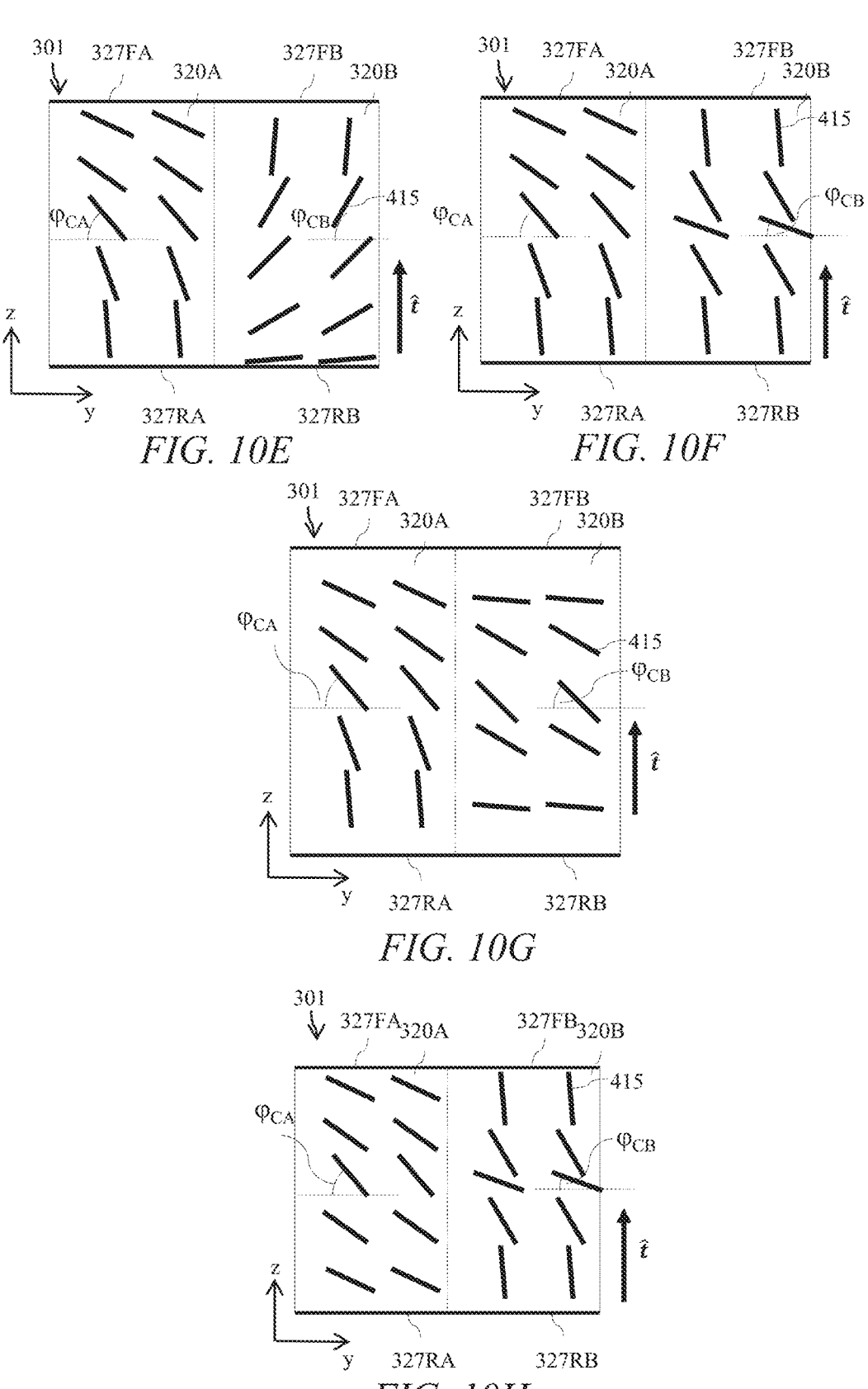

By way of comparison with FIG. 10B, FIG. 10G and FIG. 10H, the luminance profile of the region 320A may be different in the embodiments of FIGS. 11B-E, to achieve improved contrast of the mark 322 and its variation with viewing angle.

Alternative embodiments comprising different in-plane orientations of director 415 within the layer 314 of liquid crystal material 414 will now be described.

FIGS. 12A-D are schematic diagrams illustrating front perspective views of alignment of a director 415 for a liquid crystal retarder 301 comprising a mark 322. Features of the embodiments of FIGS. 12A-D not discussed in further detail may be assumed to correspond to the features with equivalent reference numerals as discussed above, including any potential variations in the features.

In comparison to the embodiment of FIG. 10A, in the embodiments of FIGS. 12A-D and TABLE 6 there is a twist of the director 415 direction between the first and second surfaces 327A, 327B that is different for the at least one first region 320A and the remainder 320B region.

Figure 12A:
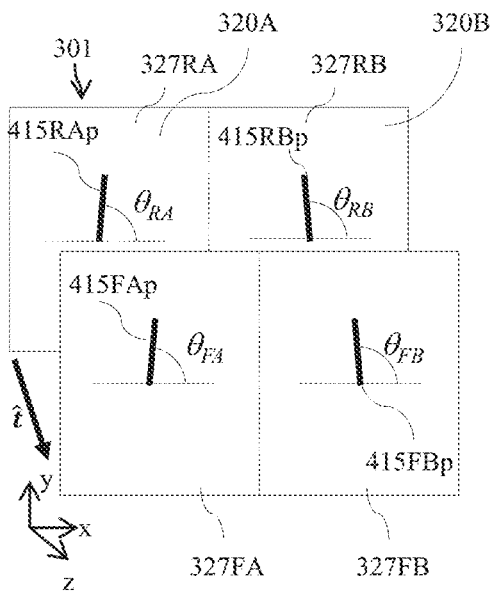
FIG. 12A, FIG. 12B, FIG. 12C, and FIG. 12D are schematic diagrams illustrating front perspective views of alignment of a liquid crystal retarder comprising a mark.
Figure 12B:
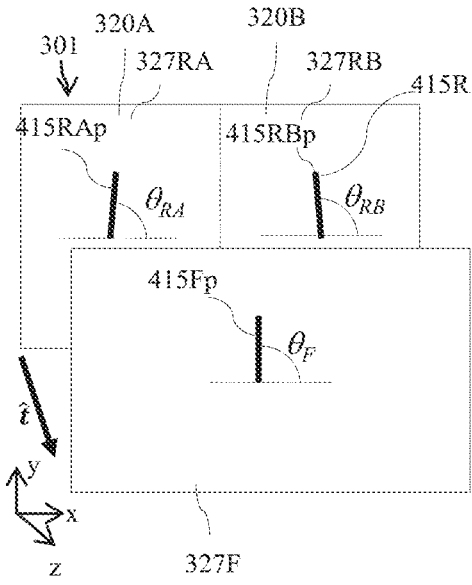

By way of comparison with FIG. 10A and FIG. 11A, the embodiments of FIGS. 12A-D may have alignment properties across the thickness of the layer 314 of liquid crystal In the embodiments of FIGS. 12A-B, the direction 445 of maximum transmission of a view angle control element 102 may be different to the normal direction to the view angle control element 102 and displaced in opposite directions. In operation, the appearance of the mark 322 may be different for the left side viewing direction 447L to that for the right side viewing direction 447R. Such arrangements may compensate for the different angular directions of the eyes of the observer 45 to advantageously improve the perceived on-axis viewing performance and reduce mark 322 visibility around the direction 445.

Figure 12C:
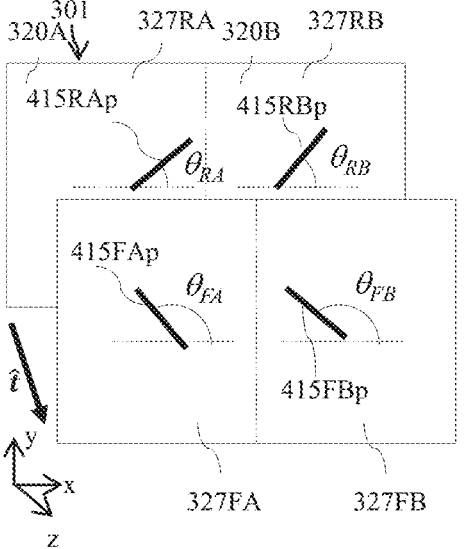

In the alternative embodiments of FIG. 12A and FIG. 12C, the director 415RA, 415RB, 415FA, 415FB directions have pretilt angles $\eta_{RA}$, $\eta_{RB}$, $\eta_{FA}$, NEB with components 415RAp, 415RBp, 415FAp, 415FBp, in a plane of the layer 314 of liquid crystal material 414 that have different orientations in the at least one region 320A and the remainder 320B of the layer 314 of liquid crystal material 414. The director 415RA, 415RB, 415FA, 415FB directions have pretilt angles $\eta_{RA}$, $\eta_{RB}$, $\eta_{FA}$, $\eta_{EB}$ with components 415RAp, 415RBp, 415FAp, 415FBp in a plane of the layer 314 of liquid crystal material 414 that have different orientations $\theta_{RA}$, $\theta_{RB}$, $\theta_{FA}$, $\theta_{FB}$ in the at least one region 320A and the remainder 320B of the layer 314 of liquid crystal material 414. In the alternative embodiments of FIGS. 12B-D, the director 415 directions have twist $\phi$ across the thickness direction $\hat{t}$ of the layer 314 of liquid crystal material 414.

Figure 12D:
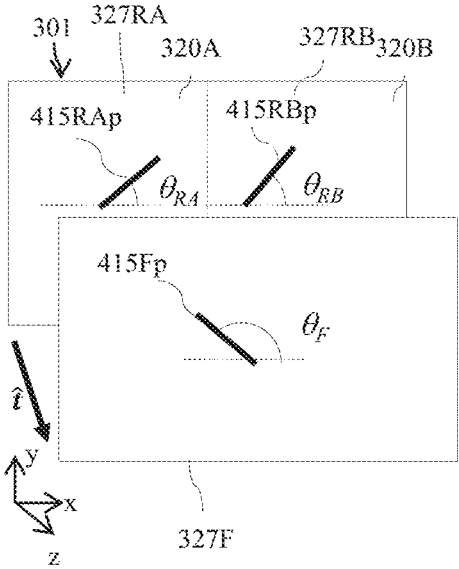

In the alternative embodiments of FIGS. 12C-D, advantageously desirable different profiles of transmission for region 320A and remainder 320B region may be provided without the passive compensation retarder 330 of FIG. 1A. Advantageously cost and complexity may be reduced. Such profiles may provide a direction 445 that is off-axis, and may be suitable for use in an automotive vehicle such as illustrated in FIG. 6 so that the driver 47 may see a private display with no driver distraction, and may also see a visible mark 322.

By way of comparison, in the alternative embodiments of FIG. 12B and FIG. 12D the director 415FA, 415FB, directions have pretilt angles nr with the same component 415Fp and the same orientation OF. Advantageously the complexity and cost of fabrication of the layer 314 of liquid crystal material 414 may be reduced.

It may be desirable to provide improved uniformity of security factor, S.

Figure 13A:
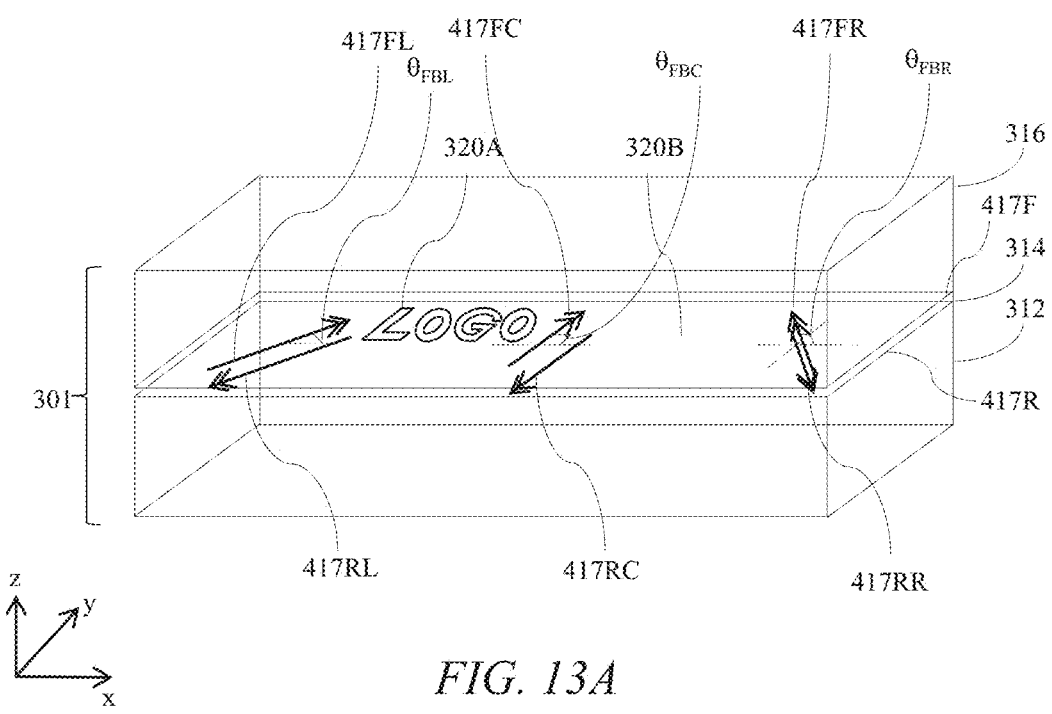
FIG. 13A is a schematic diagram illustrating a side perspective view of alternative alignment layers for an anti-parallel aligned liquid crystal retarder comprising a mark wherein the in-plane component of the alignment layer varies across the lateral direction.
Figure 13B:
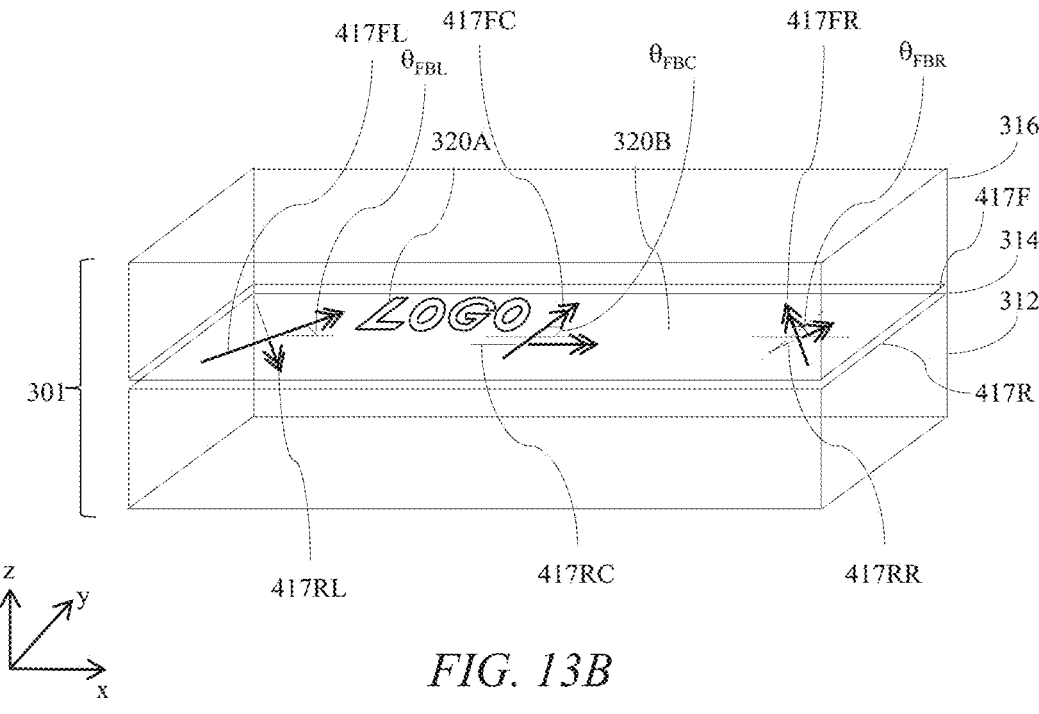
FIG. 13B is a schematic diagram illustrating a side perspective view of alternative alignment layers for a twisted liquid crystal retarder comprising a mark wherein the in-plane component of the alignment layer varies across the lateral direction.

FIG. 13A is a schematic diagram illustrating a side perspective view of alternative alignment layers 417R. 417F for a liquid crystal retarder 301 comprising a mark 322 wherein the in-plane component 415RAp. 415RBp of the alignment layer 417R, 417F varies across the lateral direction; and FIG. 13B is a schematic diagram illustrating a side perspective view of alternative alignment layers for a twisted liquid crystal retarder 301 comprising a mark 322 wherein the in-plane component of the alignment layer varies across the lateral direction. Features of the embodiments of FIGS. 13A-B not discussed in further detail may be assumed to correspond to the features with equivalent reference numerals as discussed above, including any potential variations in the features.

In the alternative embodiments of FIGS. 13A-B, in one or both of the at least one region 320A and the remainder 320B of the layer 314 of liquid crystal material 414, the layer 314 of liquid crystal material 414 has director 415 directions at surfaces 327F, 327R on at least one side of the layer 314 of liquid crystal material 414 that have pretilt angles $\eta_{RA}$, $\eta_{RB}$, $\eta_{FA}$, $\eta_{EB}$ with components 415RAP, 415RBp, 415FAp. 415FBp in a plane of the layer 314 of liquid crystal material 414 having orientations $\theta_{RA}$, $\theta_{RB}$, $\theta_{FA}$, $\theta_{FB}$ that change monotonically along a predetermined axis across at least part of the display device 100, wherein in the alternative embodiments of FIGS. 13A-B, the predetermined axis is the x-direction. Thus considering the front surface 327F of the layer 314 of liquid crystal material 414, the angles $\theta_{FBL}$, $\theta_{FBC}$, $\theta_{FBR}$ are different across the x-direction for left, centre and right locations across the x-direction.

The operation of such monotonically varying directions $\theta_{FBL}$, $\theta_{FBC}$, $\theta_{FBR}$ are described in U.S. Pat. No. 11,079,646, which is herein incorporated by reference in its entirety.

In operation, the embodiments of FIGS. 13A-B may advantageously improve the uniformity of the security factor in at least one of the regions 320A, 320B. Improved visibility of mark 322 may be achieved.

The structure of various layers 314 of liquid crystal material 414 will now be described.

Figure 14A:
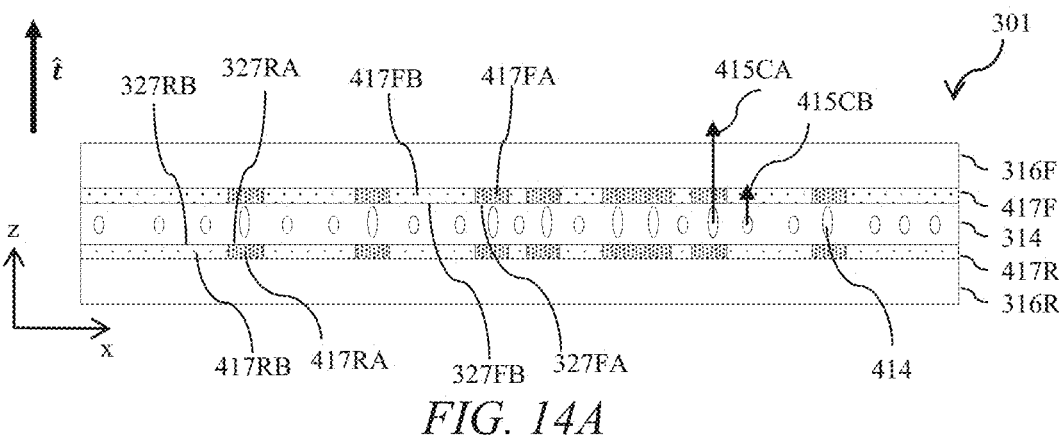
FIG. 14A is a schematic diagram illustrating a side view across a cross-sectional profile of alignment of a liquid crystal retarder comprising a mark and comprising two outer support substrates and two alignment layers.

FIG. 14A is a schematic diagram illustrating a side view across a cross-sectional profile of alignment of a liquid crystal retarder 301 comprising a mark 322 and comprising two outer support substrates 316R, 316F and two alignment layers 417A, 417B. Features of the embodiment of FIG. 14A not discussed in further detail may be assumed to correspond to the features with equivalent reference numerals as discussed above, including any potential variations in the features.

In the alternative embodiment of FIG. 14A, and as illustrated in FIG. 1E the liquid crystal polar control retarder 301 comprises alignment layers 417R. 417F disposed adjacent to the layer 314 of liquid crystal material 414 on the opposite sides 327R. 327F of the layer 314 of liquid crystal material 414, each alignment layer 417R. 417F being arranged to provide an alignment in the layer 314 of liquid crystal material 414. Alignment layers 417R. 417F are thus disposed adjacent to the layer 314 of liquid crystal material 414 on both of the sides 327R, 327F of the layer 314 of liquid crystal material 414, the alignment layer 417 being arranged to provide an alignment in the layer 314 of liquid crystal material 414 such that director orientations 415CA, 415CB in a mid-plane of the layer 314 are different. Such an arrangement may provide desirable control of the alignment properties of the liquid crystal material 414 at both surfaces 327R, 327F.

Figure 14B:
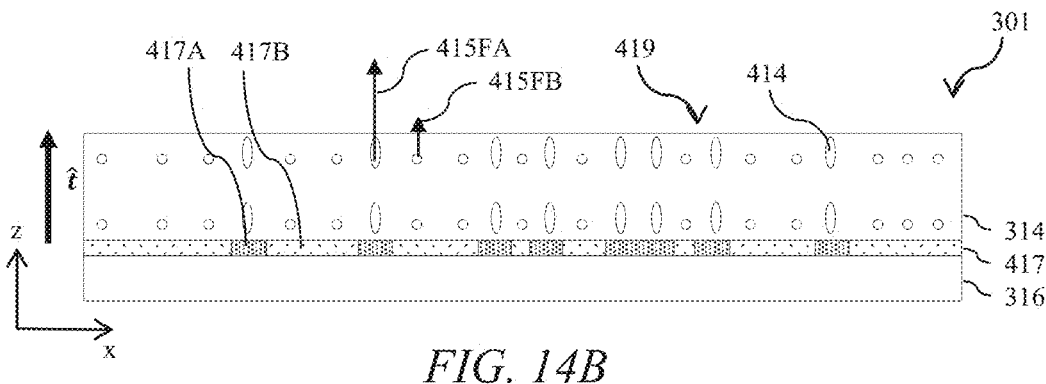
FIG. 14B is a schematic diagram illustrating a side view across a cross-sectional profile of an alternative alignment of a liquid crystal retarder comprising a mark and comprising one outer support substrate and one alignment layer and an air gap adjacent to the layer of liquid crystal material wherein the director alignment on the surface at the air gap is the same as the director alignment on the surface at the alignment layer.
Figure 14C:
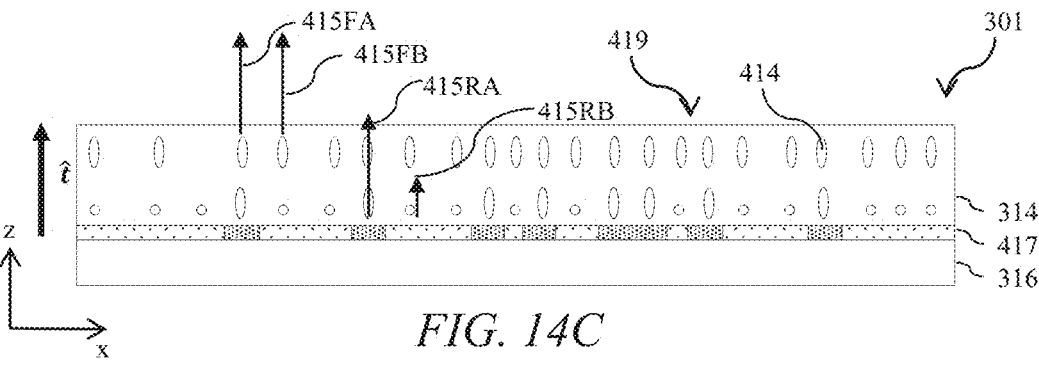
FIG. 14C is a schematic diagram illustrating a side view across a cross-sectional profile of an alternative alignment of a liquid crystal retarder comprising a mark wherein the director alignment on the surface at the air gap is different to the director alignment on the surface at the alignment layer.

FIG. 14B is a schematic diagram illustrating a side view across a cross-sectional profile of an alternative alignment of a liquid crystal retarder 301 comprising a mark 322 and comprising one outer support substrate 316 and one alignment layer 417 and an air gap 419 adjacent to the layer 314 of liquid crystal material 414 wherein the director 415 alignment on the surface at the air gap 419 is the same as the director 415 alignment on the surface 327R at the alignment layer 415; and FIG. 14C is a schematic diagram illustrating a side view across a cross-sectional profile of an alternative alignment of a liquid crystal retarder 301 comprising a mark 322 wherein the director 415 alignment on the surface at the air gap 419 is different to the director 415 alignment on the surface 327R at the alignment layer 417. Features of the embodiments of FIGS. 14B-C not discussed in further detail may be assumed to correspond to the features with equivalent reference numerals as discussed above, including any potential variations in the features.

The alternative embodiments of FIGS. 14B-C comprise an air gap 419 adjacent to the layer 314 of liquid crystal material 414 on the other side of the layer 314 of liquid crystal material 414 to the alignment layer 417. The single alignment layer 417 is disposed adjacent to the layer 314 of liquid crystal material 414 on one of the sides 327R of the layer 314 of liquid crystal material 414, the alignment layer 417 being arranged to provide an alignment in the layer 314 of liquid crystal material 414. Further an air gap 419 is provided adjacent to the layer 314 of liquid crystal material 414 on the other side of the layer 314 of liquid crystal material 414. Such an arrangement may be provided by curing of the layer 314 of liquid crystal material 414 wherein the liquid crystal material 414 is a polymerised liquid crystal material 414 such as a reactive mesogen material. During curing the air gap 419 may comprise a material such as nitrogen gas to prevent inhibition of curing. After manufacture, the air gap 419 may be removed by addition of other layers such as adhesive layers for attachment to other optical surfaces. Advantageously cost, thickness and complexity may be reduced.

In the embodiment of FIG. 14B, the director 415RA, 415RB directions provide a bias or alignment of the director 415FA, 415FB directions whereas in the embodiment of FIG. 14C, the director 415FA, 415FB directions are determined by the directors 415RA, 415RB and the curing conditions at the air gap 419 location (that may be replaced by for example nitrogen gas at the time of curing) and so may for example be uniformly homeotropic. In other embodiments, not shown, intermediate alignment states of the layer 314 of liquid crystal material 414 may be provided.

The selection of at least the liquid crystal mode, surface anchoring strength, alignment directions, curing conditions (including curing temperature and illumination flux, time and wavelength for curing illumination) and liquid crystal material 414 may be adjusted to achieve desirable security factor and visibility of mark 322 for the view angle control element 102.

It may be desirable to provide control of the thickness d of the layer 314 of liquid crystal material 414 between the regions 320A, 320B.

Figures 15A, 15B, 15C, 16A:
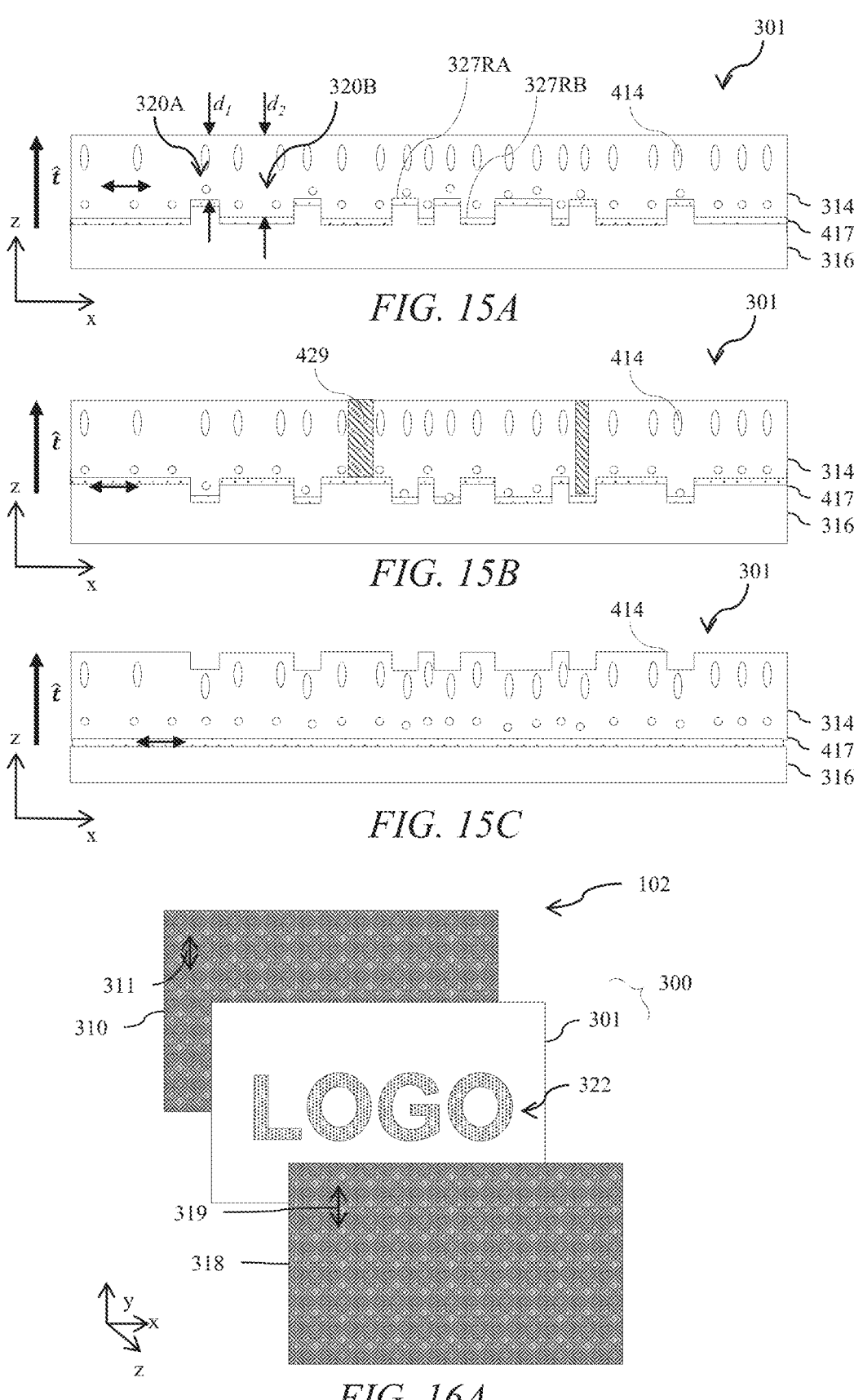
FIG. 15A is a schematic diagram illustrating a side view of an alternative alignment of a liquid crystal retarder comprising a mark across a cross-sectional profile wherein the director alignment on the surface at the air gap is different to the director alignment on the surface at the alignment layer and wherein the layer of liquid crystal material has thicknesses that are different in the at least one region and the remainder of the layer of liquid crystal material and where the difference in thickness is provided by a patterned surface of the layer of liquid crystal material at the alignment layer and/or support substrate.
FIG. 15B is a schematic diagram illustrating a side view of an alternative alignment of a liquid crystal retarder comprising a mark across a cross-sectional profile with a thickness variation that is inverted in comparison to FIG. 15A and further comprising spacer elements.
FIG. 15C is a schematic diagram illustrating a side view of an alternative alignment of a liquid crystal retarder comprising a mark across a cross-sectional profile wherein the director alignment on the surface at the air gap is different to the director alignment on the surface at the alignment layer and wherein the layer of liquid crystal material has thicknesses that are different in the at least one region and the remainder of the layer of liquid crystal material and where the difference in thickness is provided by a patterned surface of the layer of liquid crystal material at the air gap.
FIG. 16A is a schematic diagram illustrating a front perspective view of optical axis directions for a stack comprising a first polariser, liquid crystal retarder and additional polariser.

FIG. 15A is a schematic diagram illustrating a side view of an alternative alignment of a liquid crystal retarder 301 comprising a mark 322 across a cross-sectional profile wherein the director 415 alignment on the surface 327R at the air gap is different to the director 415 alignment on the surface 327R at the alignment layer and wherein the layer 314 of liquid crystal material 414 has thicknesses da, de that are different in the at least one region 320A and the remainder 320B of the layer 314 of liquid crystal material 414 and where the difference in thickness Δd is provided by a structured surface 327R of the layer 314 of liquid crystal material 414 at the alignment layer and/or support substrate; FIG. 15B is a schematic diagram illustrating a side view of an alternative alignment of a liquid crystal retarder 301 comprising a mark 322 across a cross-sectional profile with a thickness d variation that is inverted in comparison to FIG. 15A and further comprising spacer elements 429; and FIG. 15C is a schematic diagram illustrating a side view of an alternative alignment of a liquid crystal retarder 301 comprising a mark 322 across a cross-sectional profile wherein the director 415 alignment on the surface 327R at the air gap is different to the director 415 alignment on the surface 327R at the alignment layer and wherein the layer 314 of liquid crystal material 414 has thicknesses da, de that are different in the at least one region 320A and the remainder 320B of the layer 314 of liquid crystal material 414 and where the difference in thickness d is provided by a patterned surface 327R of the layer 314 of liquid crystal material 414 at the air gap 419. Features of the embodiments of FIGS. 15A-C not discussed in further detail may be assumed to correspond to the features with equivalent reference numerals as discussed above, including any potential variations in the features.

In comparison to the embodiments of FIGS. 14B-C, in the alternative embodiments of FIGS. 15A-C, the layer 314 of liquid crystal material 414 has thicknesses di, de that are different in the at least one region 320A and the remainder 320B of the layer 314 of liquid crystal material 414. A common alignment of directors 415RA, 415RB may be provided by alignment layer 417 in the region 320A and remainder 320B of the layer 314 of liquid crystal material 414. Such an arrangement may achieve reduced cost of processing of the alignment layer 417.

In the alternative embodiment of FIG. 15B, spacers 429 are illustrated to achieve improved uniformity of the respective thicknesses da, de across the layer 314 of liquid crystal material 414. Advantageously improved uniformity of security factor, S may be achieved.

In the alternative embodiment of FIG. 15C, the difference in spacing may be provided at the surface 327B, for example by a mould comprising an alignment layer during curing.

Arrangements of passive retarders 330 will now be described.

Figure 16B:
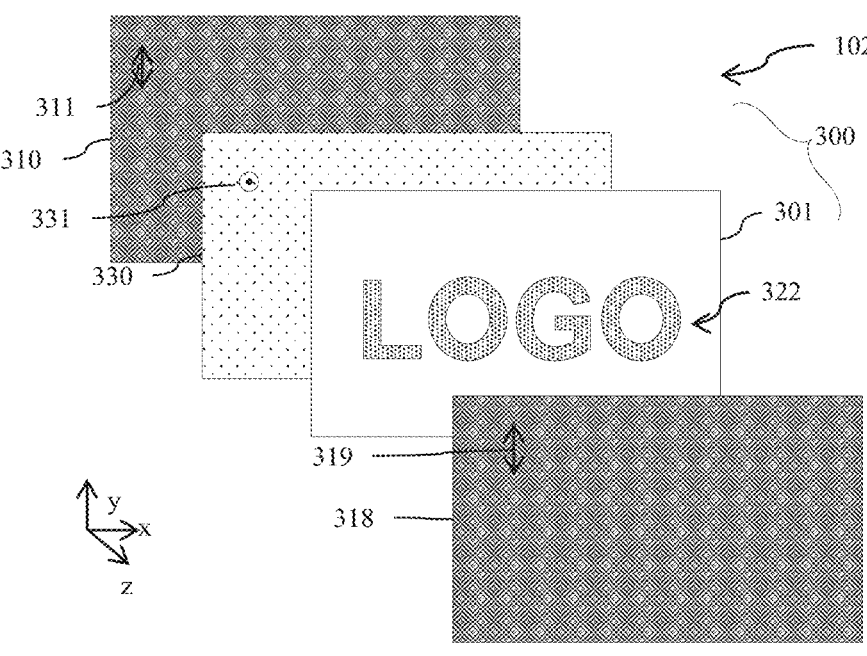
FIG. 16B is a schematic diagram illustrating a front perspective view of optical axis directions for a stack comprising a first polariser, negative C-plate passive compensation retarder, liquid crystal retarder and additional polariser.
Figure 16C:
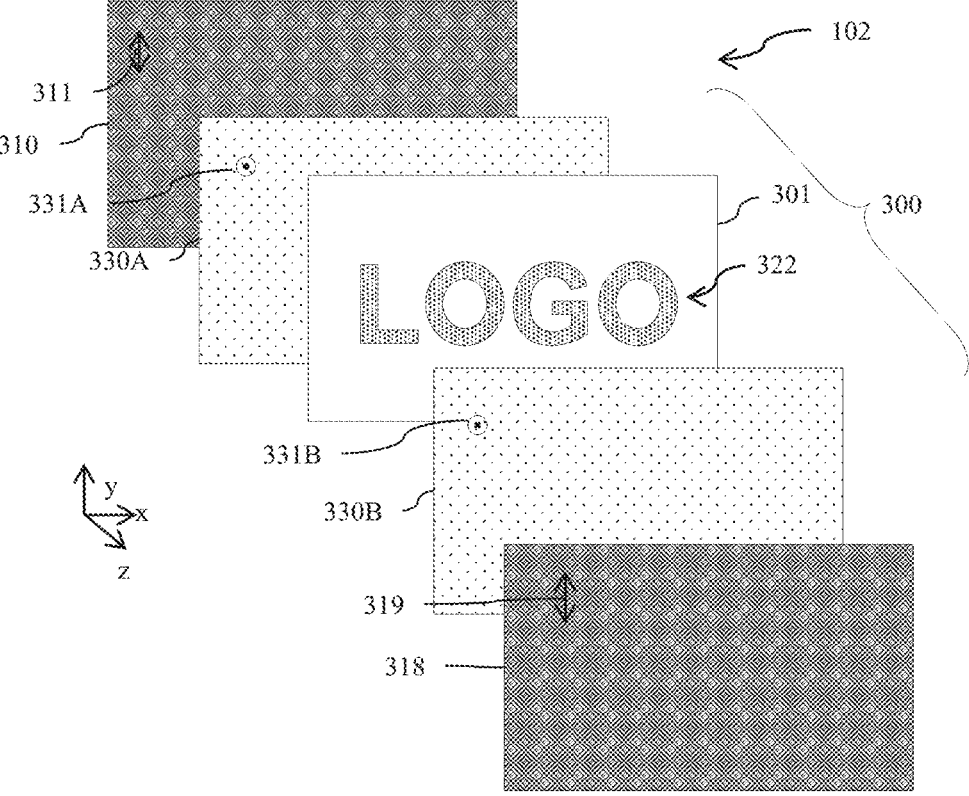
FIG. 16C is a schematic diagram illustrating a front perspective view of optical axis directions for a stack comprising a first polariser, negative C-plate passive compensation retarder, liquid crystal polar control retarder, further negative C-plate passive compensation retarder and additional polariser.

FIG. 16A is a schematic diagram illustrating a front perspective view of a stack comprising a first polariser 310, liquid crystal retarder 301 and additional polariser 318; FIG. 16B is a schematic diagram illustrating a front perspective view of a stack comprising a first polariser 310, negative C-plate passive compensation retarder 330, liquid crystal retarder 301 and additional polariser 318; and FIG. 16C is a schematic diagram illustrating a front perspective view of optical axis directions for a stack comprising a first polariser

40

Figure 16D:
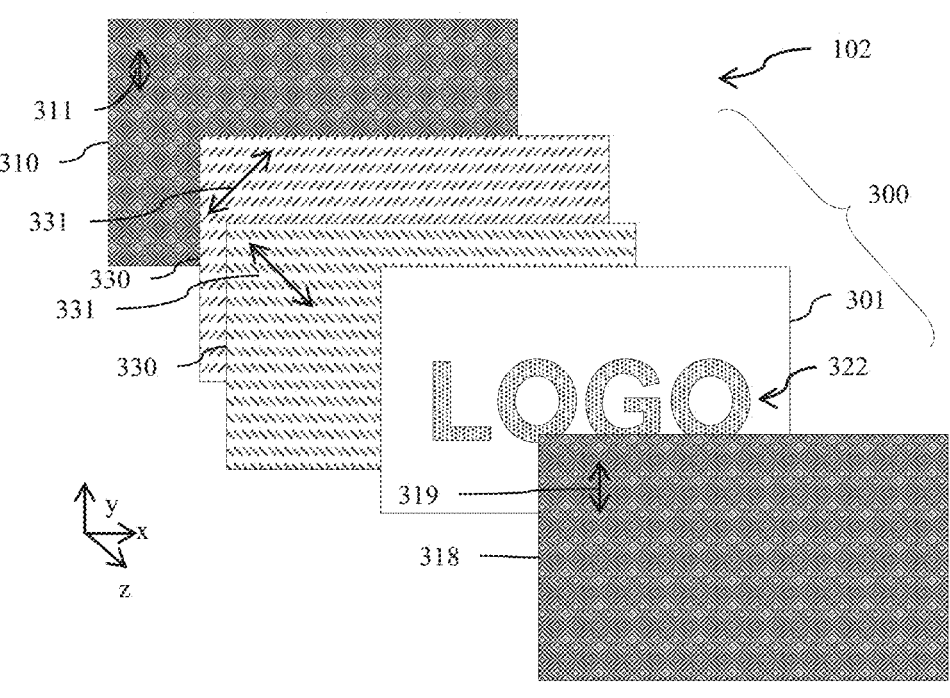
FIG. 16D is a schematic diagram illustrating a front perspective view of optical axis directions for a stack comprising a first polariser, crossed A-plate passive compensation retarder, liquid crystal retarder and additional polariser.
Figure 16E:
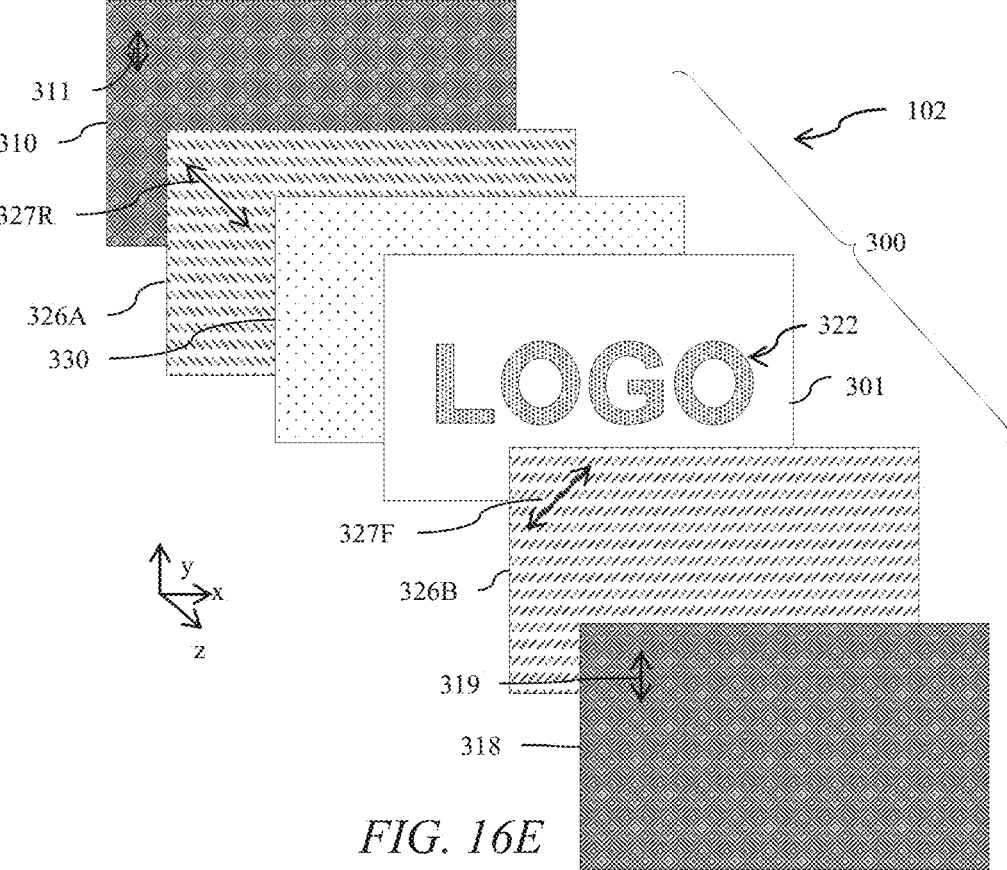
FIG. 16E is a schematic diagram illustrating a front perspective view of optical axis directions for a stack comprising a first polariser, quarter-wave plate, passive compensation retarder, liquid crystal polar control retarder, further quarter-wave plate and additional polariser.

310, negative C-plate passive compensation retarder 330, liquid crystal retarder 301, further negative C-plate passive compensation retarder 330 and additional polariser 318; FIG. 16D is a schematic diagram illustrating a front perspective view of a stack comprising a first polariser 310, crossed A-plate passive compensation retarder 330A, 330B, liquid crystal retarder 301 and additional polariser 318; and FIG. 16E is a schematic diagram illustrating a front perspective view of a stack comprising a first polariser 310, quarter-wave plate 326A, passive compensation retarder 330, liquid crystal retarder 301, further quarter-wave plate 326B and additional polariser 318. Features of the embodiments of FIGS. 16A-E not discussed in further detail may be assumed to correspond to the features with equivalent reference numerals as discussed above, including any potential variations in the features.

In the alternative embodiment of FIG. 16A, no passive compensation retarder 330 is provided. Advantageously cost and complexity is reduced.

In the alternative embodiment of FIG. 16B, the at least one passive compensation retarder 330 comprises a single passive compensation retarder 330 having an optical axis 331 perpendicular to the plane of the passive compensation retarder 330. Advantageously polar transmission may be reduced in the non-viewing directions.

In the alternative embodiment of FIG. 16C, the at least one passive compensation retarder 330 comprises a pair of passive compensation retarders 330A, 330B on opposite sides of the passive liquid crystal retarder 301 and having optical axes 331A, 331B perpendicular to the plane of the passive compensation retarder 330A. 330B. The passive retarders 330A, 330B may be provided as substrates for the layer 314 of liquid crystal material 414 or for the polarisers 310, 318. Advantageously cost, thickness and complexity may be reduced.

In the alternative embodiment of FIG. 16D, the at least one passive compensation retarder 330 comprises a pair of passive compensation retarders 330A, 330B on the same side of the passive liquid crystal retarder 301 and having optical axes 331A. 331B parallel to the plane of the passive compensation retarder 330A, 330B that are crossed. Advantageously the A-plates 330A. 330B may be fabricated with desirable retardance at lower cost than a C-plate of FIG. 16B.

In the alternative embodiment of FIG. 16E, the at least one polar control retarder 300 further comprises first and second quarter-wave plates 326A, 326B, wherein the first quarter-wave plate 326A is arranged on the opposite side of the at least one polar control retarder 300 from the additional polariser 318 and is arranged to convert a linearly-polarised polarisation state passed by the first polariser 310 into a circularly-polarised polarisation state, and the second quarter-wave plate 326B is arranged between the at least one polar control retarder 300 and the additional polariser 318 and is arranged to convert the circularly-polarised polarisation state into a linearly-polarised polarisation state that is passed by the additional polariser 318. In comparison to the embodiment illustrated in FIG. 3B, the transmission profile may be provided with increased rotational symmetry. Polar control retarders 300 further comprising quarter-wave plates 326A, 326B are described in U.S. Pat. No. 11,092,852, which is herein incorporated by reference in its entirety.

Methods to manufacture a layer 314 of liquid crystal material 414 comprising mark 322 will now be described.

Figure 17A:
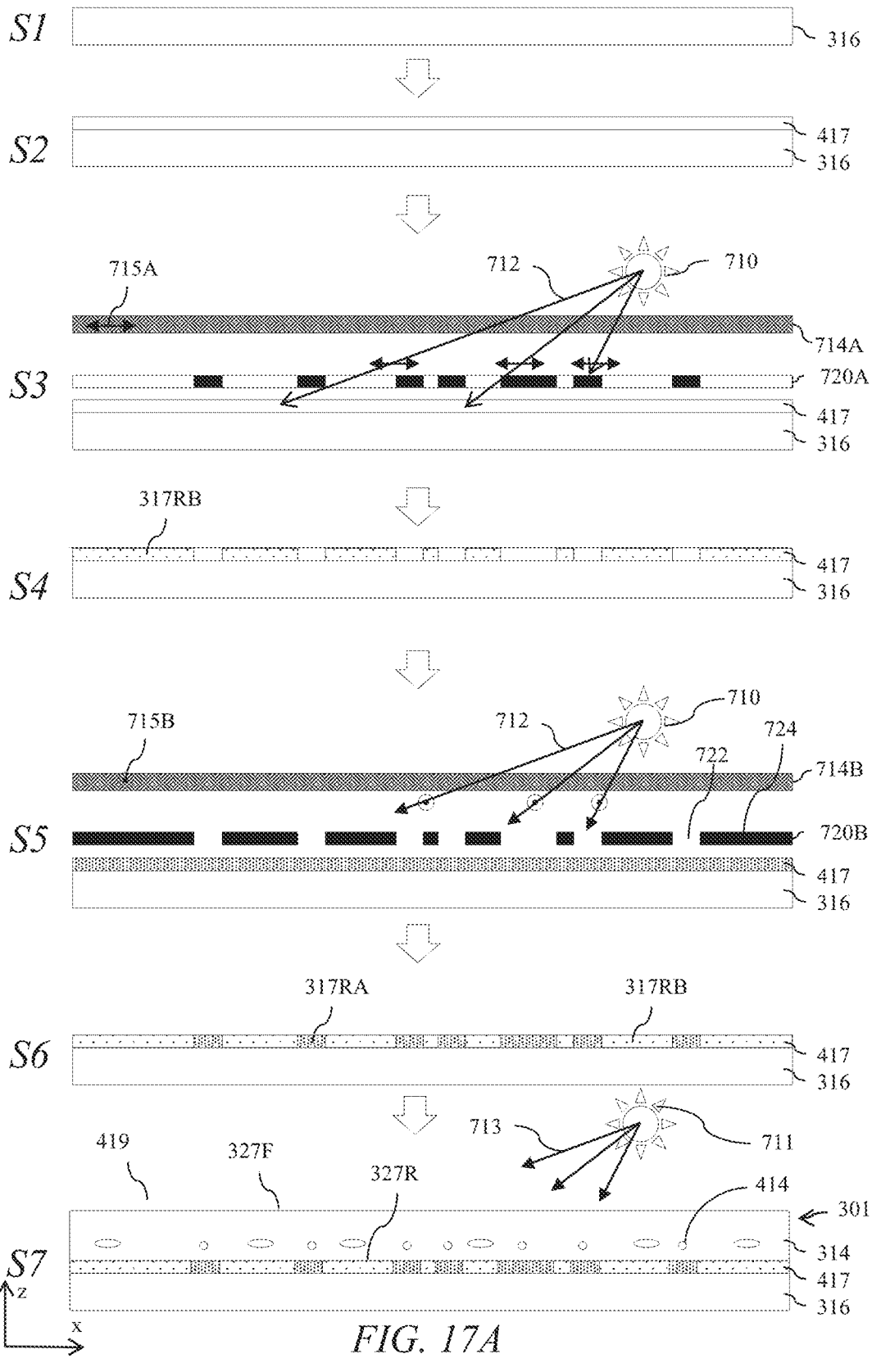
FIG. 17A is a schematic diagram illustrating a method to manufacture a patterned liquid crystal retarder comprising a mark and comprising a step to provide first and second alignment orientations using photoalignment.

FIG. 17A is a schematic diagram illustrating a method to manufacture a patterned liquid crystal retarder 301 comprising a mark 322 and comprising a step to provide first and second alignment orientations 417R, 417B using photoalignment. Features of the embodiment of FIG. 17A not discussed in further detail may be assumed to correspond to the features with equivalent reference numerals as discussed above, including any potential variations in the features.

In step S1, a substrate 316 is provided and in step S2, alignment layer 417 is provided on the substrate 316 wherein the alignment layer 417 comprises a photopolymer. In step S3, a polariser 714A is arranged between the alignment layer 417 and light source 710 that produces light 712 that is polarised by the polariser 714A with polarisation state 715A that may for example be a linearly-polarised polarisation state. Light source 712 may be for example an ultra-violet light source and may provide area illumination, line illumination on a web process or may be a scanned laser for example.

Mask 720A is provided with transmission regions 722 in the shape of the remainder 320B of the mark 322 and light blocking regions 724 in the shape of the mark 322. Light rays 712 that illuminate the alignment layer 417 material provide alignment functionality to the material of the alignment layer 417 material whereas masked regions do not provide alignment of the alignment layer 417.

In step S5, polariser 714B is arranged to transmit polarisation state 715B and mask 720B is provided in the shape of the mark region 320A. Step S6 illustrates a cured patterned alignment layer 417 with different alignment for regions 320A. 320B. In step S7, the layer 314 of liquid crystal material 414 is provided on the alignment layer 417 and material 414 at the surface the surface 327R takes up the alignment provided by the alignment layer 417. The material 414 is then cured by light rays 713 from source 711, where the upper surface 327F may be cured in the absence of oxygen to prevent inhibition of cure.

Figure 17B:
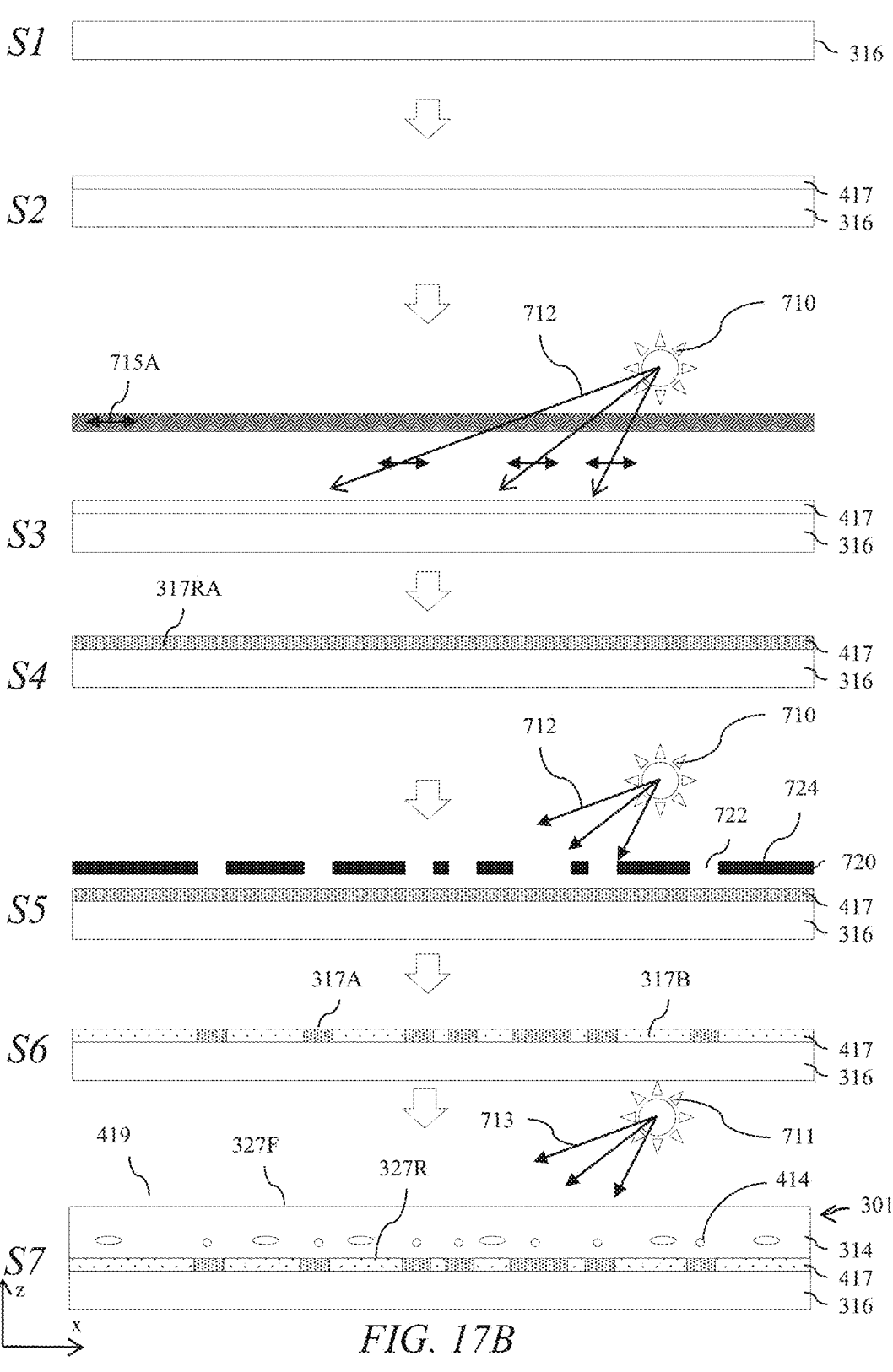
FIG. 17B is a schematic diagram illustrating a method to manufacture a patterned liquid crystal retarder comprising a mark and comprising a step to provide first and second alignment pretilts using photoalignment.

FIG. 17B is a schematic diagram illustrating a method to manufacture a patterned liquid crystal retarder 301 comprising a mark 322 and comprising a step to provide first and second alignment pretilts using photoalignment. Features of the embodiment of FIG. 17B not discussed in further detail may be assumed to correspond to the features with equivalent reference numerals as discussed above, including any potential variations in the features.

By way of comparison with FIG. 17A, in the alternative embodiment of FIG. 17B, in step S3 the layer 417 is uniformly illuminated to provide a uniform alignment layer direction as shown in step S4. In step S5, mask 720 is provided with transmission apertures 722 in the shape of a mark 322 and illuminated for a second time to reorient or adjust the surface anchoring energy of the alignment layer 417 in the regions 317A exposed through the transmission regions 722 of the mask 720. Advantageously complexity and cost may be reduced.

It may be desirable to provide alignment without photoalignment material for the alignment layer 417.

Figure 17C:
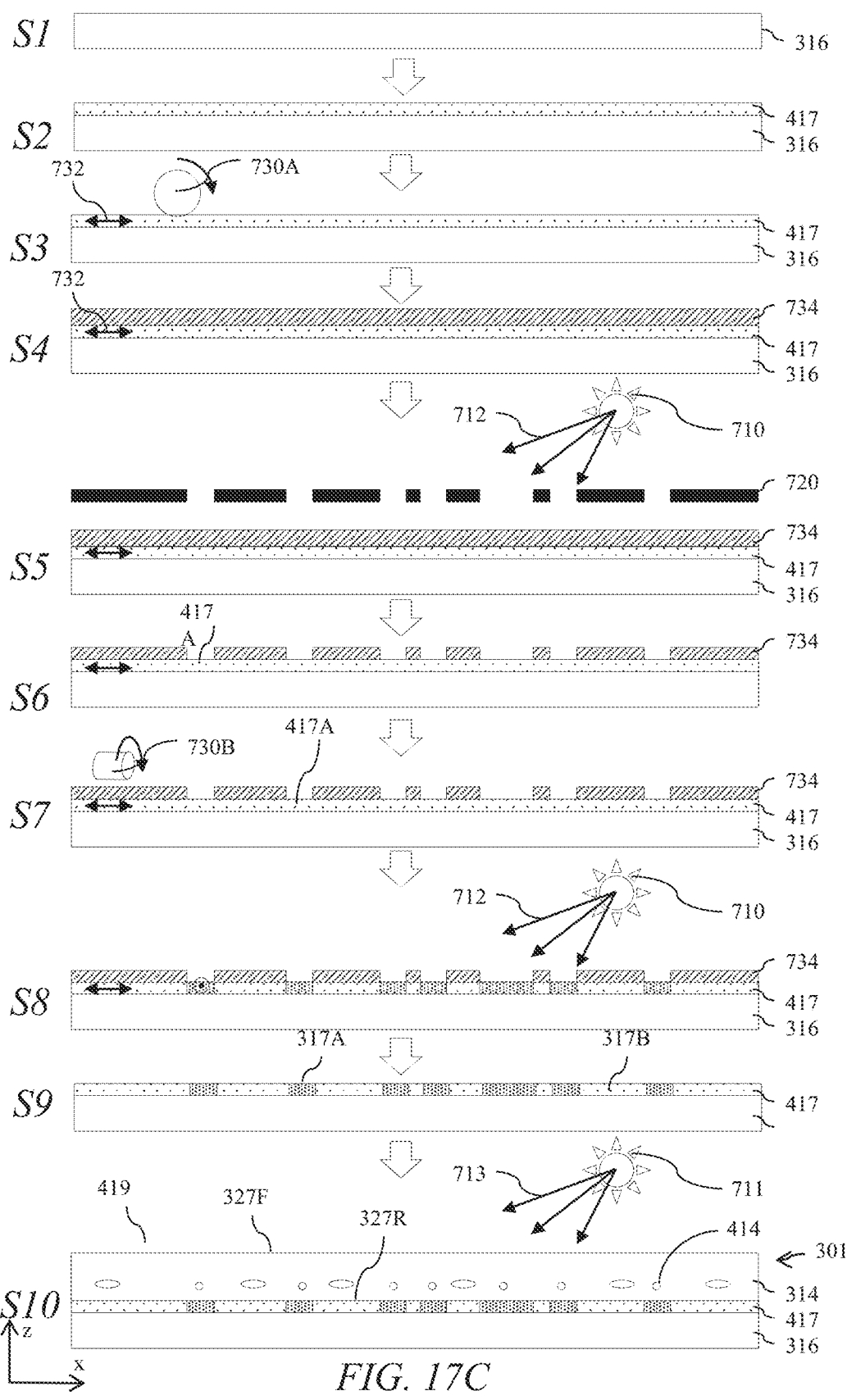
FIG. 17C is a schematic diagram illustrating a method to manufacture a patterned liquid crystal retarder comprising a mark and comprising a step to provide first and second alignment orientations using rubbed alignment.

FIG. 17C is a schematic diagram illustrating a method to manufacture a patterned liquid crystal retarder 301 comprising a mark 322 and comprising a step to provide first and second alignment orientations 417R, 417B using rubbed alignment. Features of the embodiment of FIG. 17C not discussed in further detail may be assumed to correspond to the features with equivalent reference numerals as discussed above, including any potential variations in the features.

By way of comparison with FIG. 17A, in the alternative embodiment of FIG. 17C, in step S3, a rubbing rolling 730 is arranged to provide rubbed alignment layer 417 orientation and pretilt 732. In step S4, photoresist layer 734 is provided on the rubbed alignment layer and in step S5 illuminated through mask 720 to expose the regions 417A of the alignment layer 417 in step S6 after processing of the exposed photoresist 734. In step S7, a second different rubbing of the regions 417A of the alignment layer 417 is provided and the photoresist removed by illumination by rays 712 as illustrated in step S8. In step S9, the alignment layer 417 with different rubbing directions is revealed and in step S10, the layer 314 of liquid crystal material 414 is provided as described hereinabove.

It may be desirable to provide a uniform alignment layer and achieve alignment of the layer 314 of liquid crystal material 414.

Figure 18A:
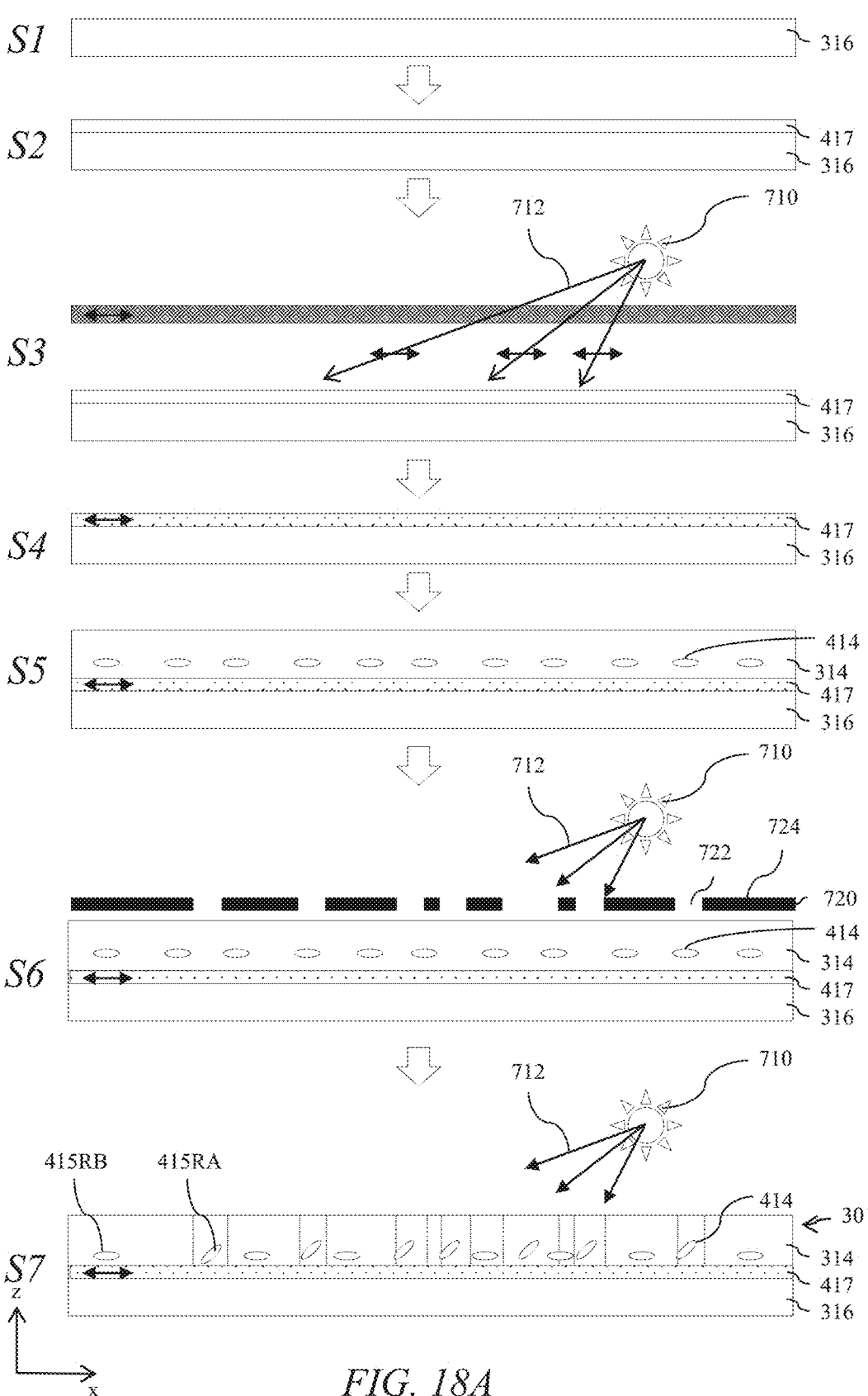
FIG. 18A is a schematic diagram illustrating a method to manufacture a patterned liquid crystal retarder comprising a mark and comprising a step to provide first and second alignment orientations using patterned curing of the liquid crystal layer.

FIG. 18A is a schematic diagram illustrating a method to manufacture a patterned liquid crystal retarder 301 comprising a mark 322 and comprising a step to provide first and second alignment orientations 417R. 417B using patterned curing of the liquid crystal layer 314. Features of the embodiment of FIG. 18A not discussed in further detail may be assumed to correspond to the features with equivalent reference numerals as discussed above, including any potential variations in the features.

By way of comparison with FIG. 17A, in the alternative embodiment of FIG. 18A, in step S5 the uniform alignment layer is provided with a layer 314 of uncured photo polymerizable liquid crystal material 414 that takes up the alignment of the alignment layer 417. In step S6, the mask 720 is provided and illuminated by source 710 with a first set of illumination conditions to provide a first alignment of the directors 415RA of the layer 314 of liquid crystal material 414. In step S7, both the cured liquid crystal material 414 and uncured liquid crystal material 414 are illuminated with a different illumination condition, for example with different time, temperature, luminous flux and polarisation state. Advantageously the complexity of preparation of the alignment layer 417 is reduced.

Figure 18B:
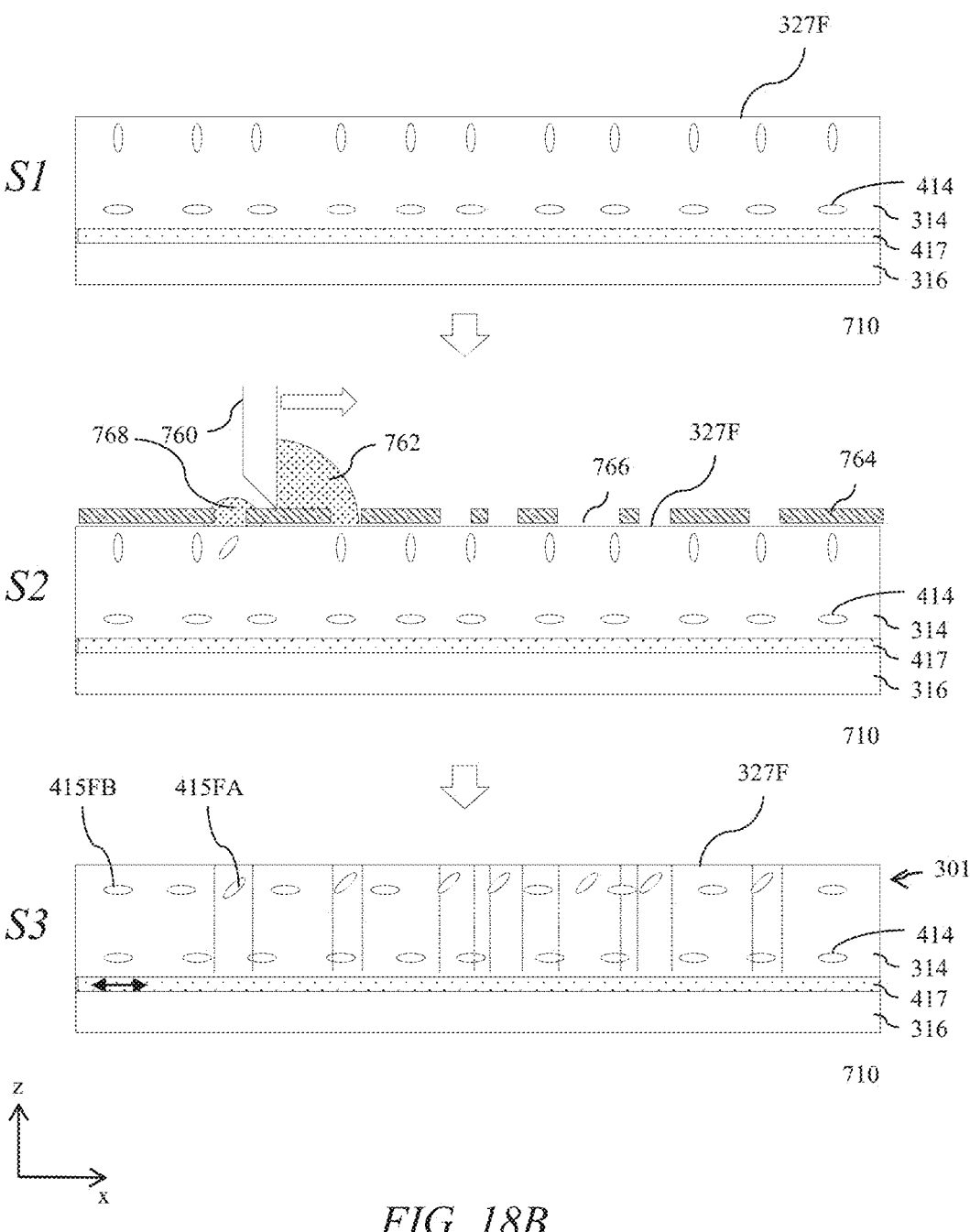
FIG. 18B is a schematic diagram illustrating a method to manufacture a patterned liquid crystal retarder comprising a mark and comprising a step to modify the surface alignment of liquid crystal molecules.

FIG. 18B is a schematic diagram illustrating a method to manufacture a patterned liquid crystal retarder 301 comprising a mark 322 and comprising a step to modify the surface alignment of liquid crystal molecules 414. Features of the embodiment of FIG. 18B not discussed in further detail may be assumed to correspond to the features with equivalent reference numerals as discussed above, including any potential variations in the features.

In the alternative embodiment of FIG. 18B, in step S1 a uniform layer 314 of liquid crystal material 414 is provided as described hereinabove. In coating step S2, a doctor blade 760 provides means to distribute a surface modifying material 762 through a screen 764 with apertures 766, depositing regions 768 of surface modifying material 762 in one of the regions 320A, 320B. Surface modifying material 762 may for example comprise a solvent that provides small alterations in the alignment of the surface in the region 768. After coating step S2 is completed, in step S3 the material 762 is removed, for example by washing and the director directions 415FA, 415FB provided to be different, achieving desirable visibility of the mark 322 during operation as described hereinabove. Advantageously the process of FIG. 18B may achieve reduced complexity and cost of fabrication.

Most generally, the present embodiments achieve layer 314 of liquid crystal material 414 that in operation spatially alter slightly the polarization transformation properties of the layer 314 of liquid crystal material 414 where altered reflection/transmission becomes visible.

The methods of FIGS. 17A-C and FIGS. 18A-B may be provided using web processing methods or by sheet processing methods for example.

It may be desirable to provide a voltage across the layer 314 of liquid crystal material 414 during manufacture of the liquid crystal polar control retarder 301 comprising mark 322.

Figure 19A:
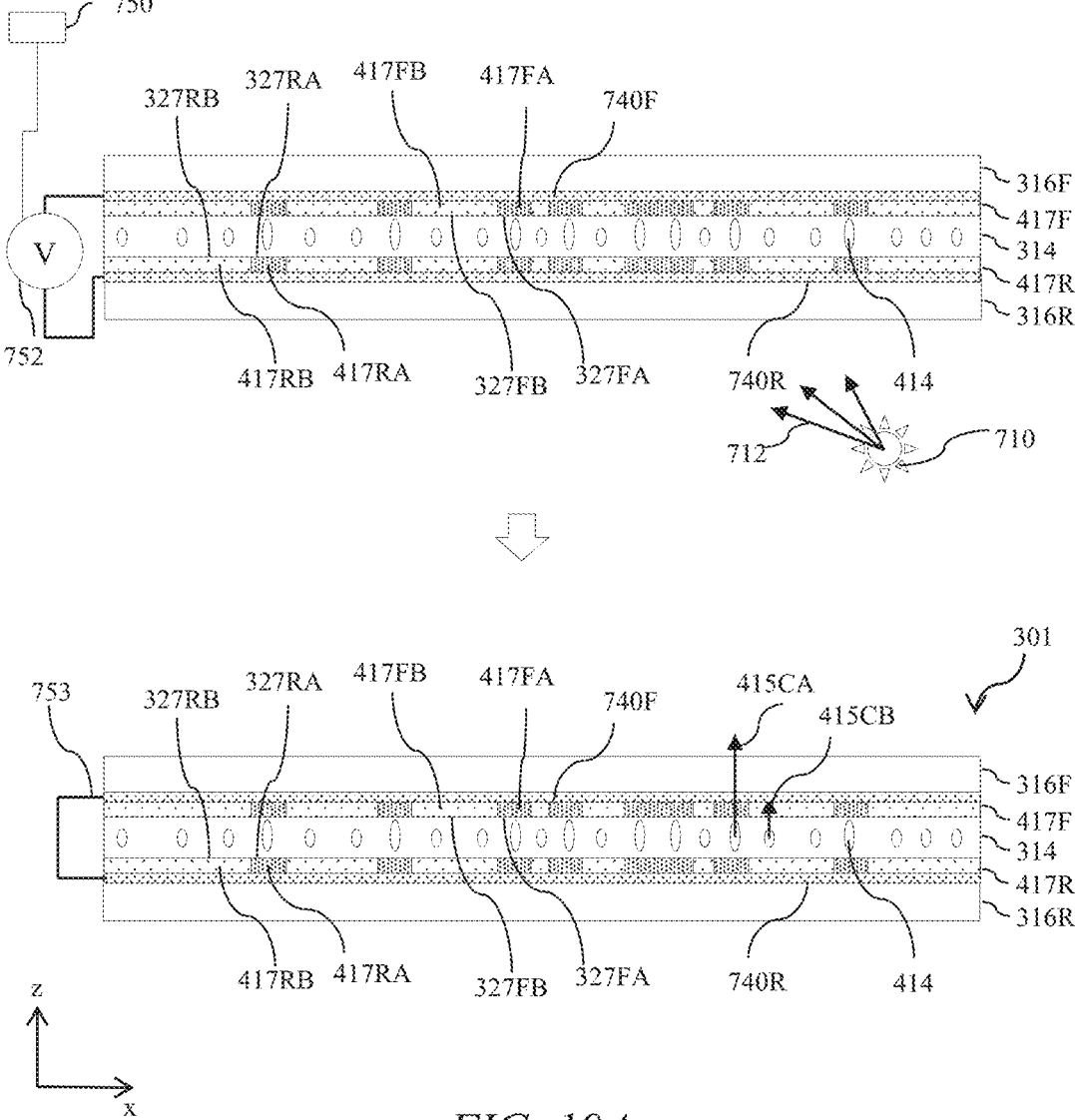
Figure 19C:
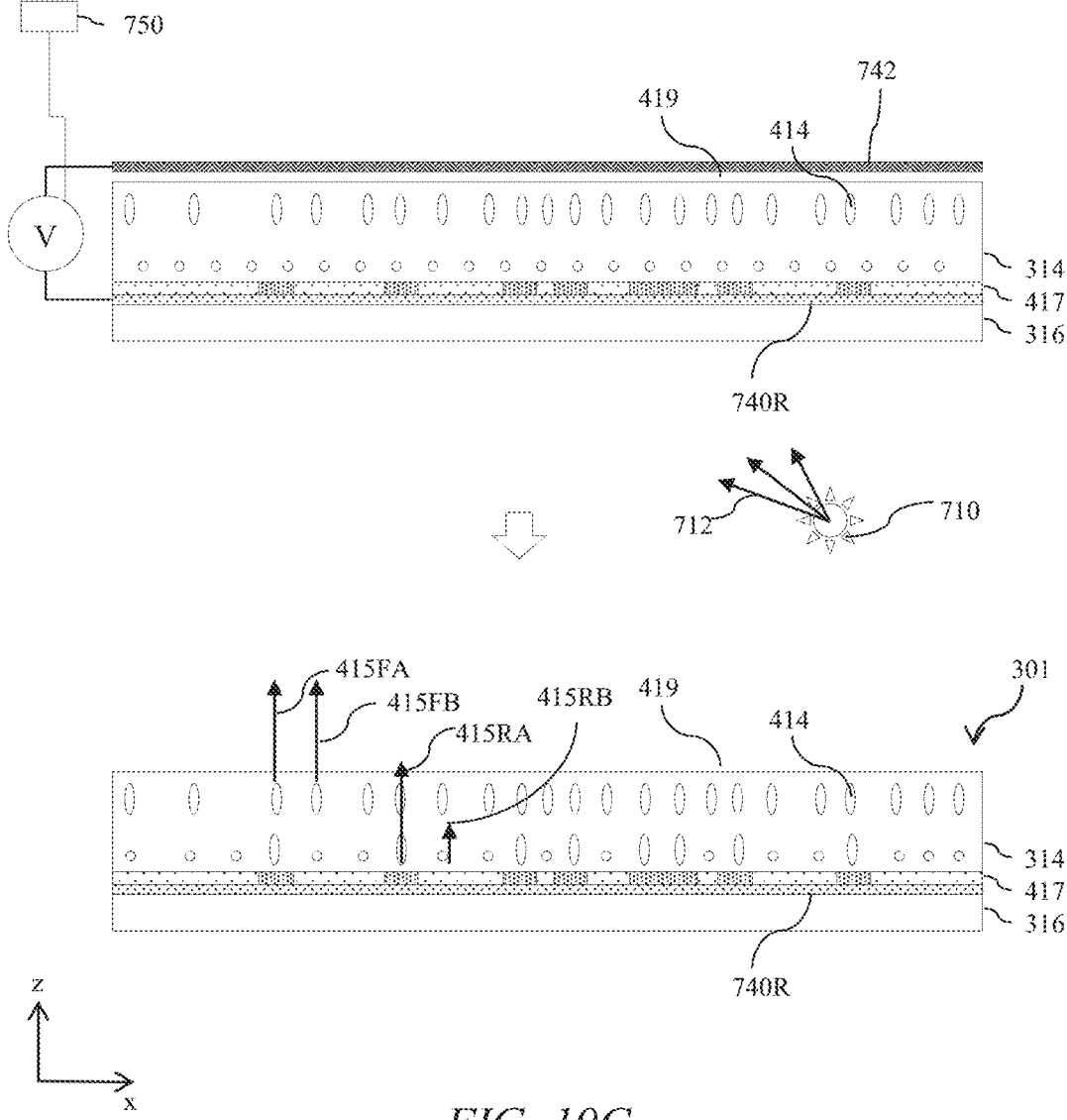
Figure 19D:
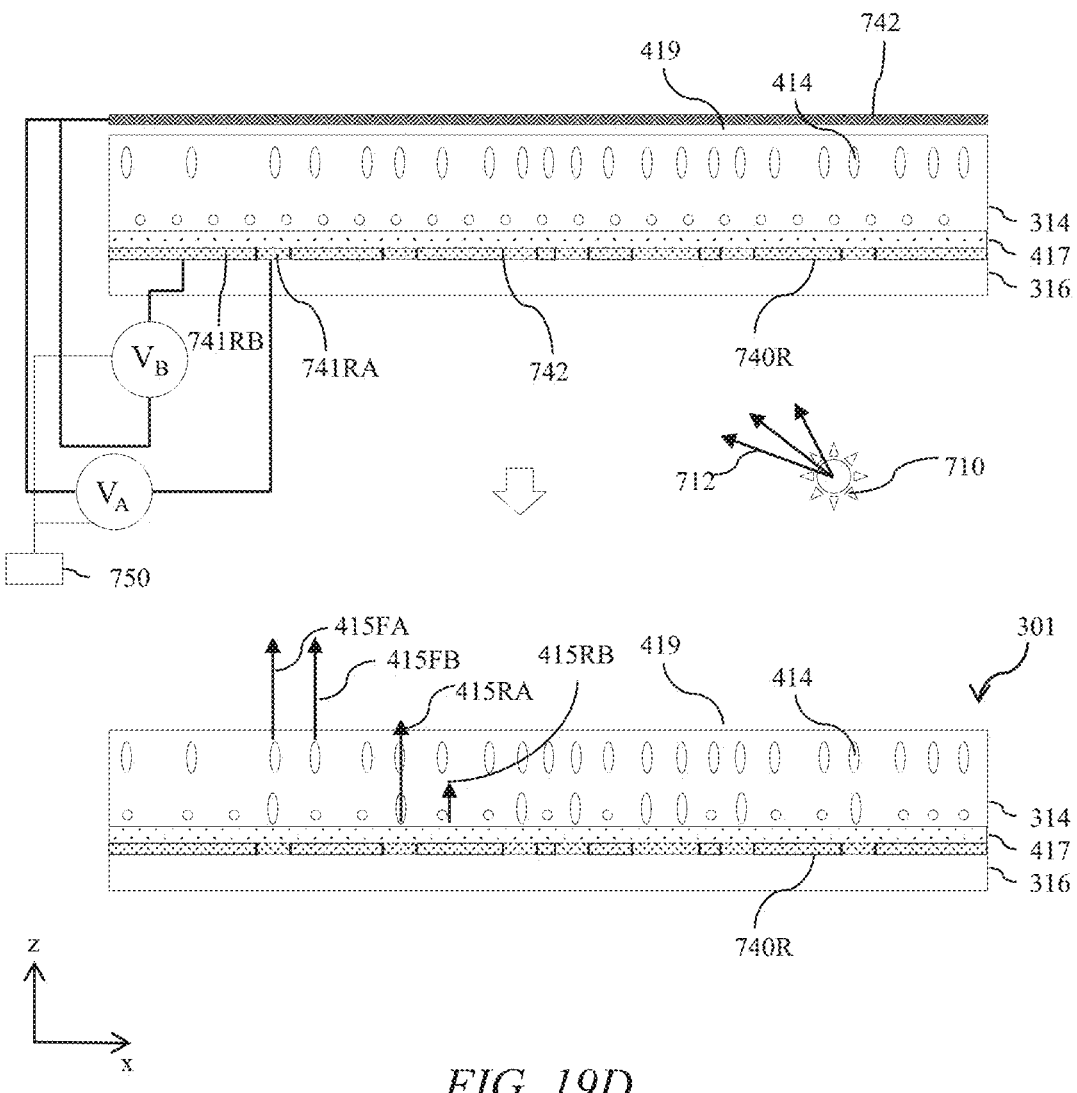

FIG. 19A is a schematic diagram illustrating side views of methods to manufacture a liquid crystal retarder comprising a mark wherein a voltage is applied across at least part of the layer 314 of liquid crystal material during manufacture and wherein the electrodes are not connected to a control circuit of the view angle control element, and as described in TABLE 7. Features of the embodiments of FIGS. 19A-C not discussed in further detail may be assumed to correspond to the features with equivalent reference numerals as discussed above, including any potential variations in the features.

During manufacture, the layer 314 of liquid crystal material 414 may be cured by light source 710 so that the liquid crystal material 414 alignment is frozen. Subsequently the control voltage V or control voltages VA. VB is removed. Desirable arrangements of the layer 314 of liquid crystal material 414 may be achieved to achieve high image security factor and high mark 322 visibility in direction 447. In an alternative embodiment, the electrodes 740R, 740F are connected to each other by electrical conductor 753. Build-up of differential charge in the layer 314 of liquid crystal material 414 may be reduced, advantageously achieving stable alignment of the layer 314 of liquid crystal material 414 in arrangements in which some unpolymerized liquid crystal material 414 is present in the layer 314.

TABLE 7

| FIG. | Rear electrode | Rear surface 327R | Front surface 327F | Front electrode |
|---|---|---|---|---|
| 19A | Transparent electrode 740R, uniform | Alignment layer 417R, patterned with mark 322 | Alignment layer 417F, patterned with mark 322 | Transparent electrode 740F, uniform |
| 19B | Transparent electrode 740R, uniform | Alignment layer 417R, uniform | Alignment layer 417F, uniform | Transparent electrode 740F, patterned with mark 322 |
| 19C | Transparent electrode 740R, uniform | Alignment layer 417R, patterned with mark 322 | Air gap 419 | External electrode 744F, uniform |
| 19D | Transparent electrode 740R, patterned with mark 322 in regions 741RA, 741RB | Alignment layer 417R, uniform | Air gap 419 | External electrode 744F, uniform |
| 19E | Transparent electrode 740R, uniform | Alignment layer 417R, uniform | Air gap 419 | External electrode 744F patterned with mark 322 |
| 19F | External electrode 744R, uniform | Alignment layer 417R, uniform | Air gap 419 | External electrode 744F patterned with mark 322 in region 745FB |

By way of comparison with the embodiments of FIGS. 14A-E, in the alternative embodiment of FIGS. 19A-E the liquid crystal polar control retarder 301 further comprises one of the electrodes 740R, 744R and one of electrodes 740F, 744F are arranged to apply independent control voltages across the layer 314 of liquid crystal material 414 in the at least one region 320A and in the remainder 320B of the layer 314 of liquid crystal material 414, the one of the electrodes 740R, 744R and one of electrodes 740F, 744F not being connected to a control circuit 750 of the view angle control element 102.

In the present embodiments, the patterned alignment layers 417 may be of the type illustrated elsewhere herein. TABLE 7 is a non-exhaustive list of embodiments, for example the patterned alignment layer 417R with regions 417RA, 417RB of FIG. 19C may be combined with the patterned electrode 740R with regions 741RB. 741RA of FIG. 19D. Improved control of the layer 314 of liquid crystal material 414 alignment may be provided, advantageously increasing security factor and mark 322 visibility in the direction 447.

The embodiments of FIGS. 19A-E illustrate that during one of the manufacturing steps, such one of the electrodes 740R, 744R and one of electrodes 740F, 744F may be used to apply a voltage V by voltage driver 752 or voltages VA. VB by voltage drivers 752A, 752B to the layer 314 of liquid crystal material 414, for example to apply the voltage as illustrated in TABLE 1 in order to provide desirable alignment of liquid crystal material 414 in the regions 320A, 320B.

The electrodes 740R, 740F and/or further electrode may be patterned to apply different voltages across the layer 314 of liquid crystal material 414 and in particular may provide different voltages in the regions 320A, 320B.

In the alternative embodiment of FIG. 19B, and FIGS. 19D-F, the layer 314 of liquid crystal material 414 has director 415 directions at surfaces 327F, 327R on opposite sides of the layer 314 of liquid crystal material 414 that are the same in the at least one region 320A and the remainder 320B of the layer 314 of liquid crystal material 414. The voltages VA. VB are arranged to provide reorientation of the liquid crystal material across the layer 314 of liquid crystal material 414 in the thickness direction Î to provide desirable difference between viewing angle properties of the view angle control element 102 between the region 320A and remainder 320B of the layer 314 of liquid crystal material 414.

In the alternative embodiment of FIG. 19F, the electrodes 744R, 744F are not comprised in the view angle control element 102 but are present for applying a voltage to the layer 314 of liquid crystal material 414 during manufacture. FIG. 19F further illustrates an alternative embodiment wherein no voltage is provided across the region 320A and a voltage is provided across the remainder 320B region of the layer 314 of liquid crystal material 414.

Some displays have wider profiles of light output than that illustrated in FIG. 3A. Such wide profiles may undesirably reduce the security factor S for non-viewing axis 447 directions. Embodiments to increase security factor for observers 47 will now be described.

Figures 20A, 20B, 20C:
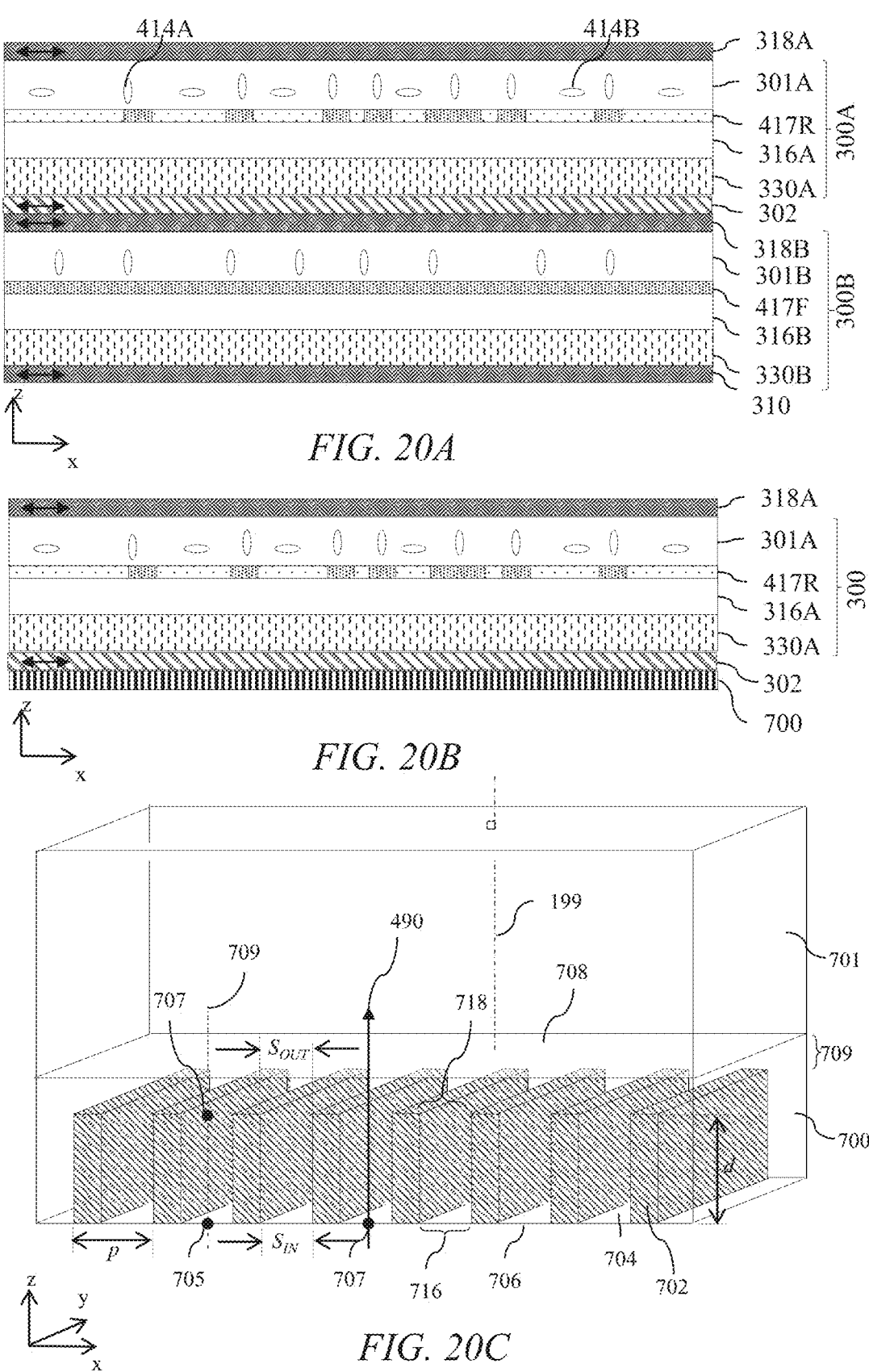
FIG. 20A is a schematic diagram illustrating a side view of a view angle control element comprising a liquid crystal retarder comprising a mark arranged between an additional polariser and further additional polariser; and a further view angle control element comprising a further polar control retarder for arrangement between a first polariser and the further additional polariser.
FIG. 20B is a schematic diagram illustrating a side view of a view angle control element comprising a liquid crystal retarder comprising a mark arranged between an additional polariser and further additional polariser comprising a reflective polariser; and a light control film arranged in series.
FIG. 20C is a schematic diagram illustrating in perspective side view a light control film comprising an array of transmissive regions extending between the input surface and the output surface, and absorptive regions between the transmissive regions extending at least partway between the input surface and the output surface.

FIG. 20A is a schematic diagram illustrating a side view of a view angle control element 102 comprising a liquid crystal retarder 301 comprising a mark 322 arranged between an additional polariser 318A and further additional polariser 318B; and a further polar control retarder 300B for arrangement between a spatial light modulator 48 output polariser 218 and the further additional polariser 318. Features of the embodiment of FIG. 20A not discussed in further detail may be assumed to correspond to the features with equivalent reference numerals as discussed above, including any potential variations in the features.

In the alternative embodiment of FIG. 20A, the additional polariser 318 is a first additional polariser 318A, the at least one polar control retarder 300 is at least one first polar control retarder 300A, and the view angle control element 102 further comprises a further additional polariser 318B, the further additional polariser 318B being a linear polariser; and at least one further polar control retarder 300B, wherein the further additional polariser 318B and the at least one further polar control retarder 300B are arranged on the opposite side of the at least one first polar control retarder 300A from the first additional polariser 318A with the further additional polariser 318B between the at least one first polar control retarder 300A and the at least one further polar control retarder 300B.

The first liquid crystal retarder 301A comprises alignment of directors 415A of the liquid crystal material 414A to provide a mark 322A as described elsewhere herein. The second liquid crystal retarder 301B may be uniform or may provide a different mark 322B by means of control of alignment of directors 415A of liquid crystal material 414B. The polar variation of transmission of the polar control retarder 300B between the polarisers 310, 318B may be similar or modified by different retardance selection to the profile of FIG. 3B for example.

In operation, the off-axis luminance along the non-viewing axis 447 is reduced in comparison to the embodiment of FIG. 1A for example. Advantageously security factor S may be increased in both regions 320A, 320B, while the mark 322A or marks 322A, 322B may be visible.

FIG. 20B is a schematic diagram illustrating a side view of a view angle control element 102 comprising a liquid crystal retarder 301 comprising a mark 322 arranged between an additional polariser 318A and further additional polariser 318B comprising a reflective polariser; and a light control film 700 arranged in series. Features of the embodiment of FIG. 20B not discussed in further detail may be assumed to correspond to the features with equivalent reference numerals as discussed above, including any potential variations in the features.

In comparison to FIG. 20A, in the alternative embodiment of FIG. 20B, a light control film 700 on a support substrate 352 is provided. The light control film comprises an input surface, an output surface facing the input surface, an array of transmissive regions extending between the input surface and the output surface, and absorptive regions between the transmissive regions and extends at least partway between the input surface and the output surface.

The structure and operation of the light control film 700 will now be described.

FIG. 20C is a schematic diagram illustrating in perspective side view a light control film 700 that comprises an input surface 706, an output surface 708 facing the input surface 706, an array of light transmissive regions 704 extending between the input surface 706 and the output surface 708, and absorptive regions 702 between the transmissive regions and extending partway between the input surface 706 and the output surface 708. Features of the embodiment of FIG. 20C not discussed in further detail may be assumed to correspond to the features with equivalent reference numerals as discussed above, including any potential variations in the features.

The array of transmissive regions 704 is a one-dimensional array of elongate transmissive regions 704, that are elongate in the y-axis direction.

The absorptive regions 702 between the transmissive regions 704 extend between the input surface 706 and the output surface 708. The light control film 700 is provided on a support substrate 701. The substrate 701 may be arranged on the input side 706 or the output side 708 of the light control film.

The light transmissive regions 704 are parallel sided and have surface normals in the plane of the light control film 700 such that the direction of maximum light transmission, for example ray 490, is normal to the plane of the light control film 700. The transmissive regions 704 have axes 709 defined in respect of each transmissive region 704 between centres 705, 707 of apertures 716, 718 of input and output ends 706, 708 of the transmissive regions 704 are normal to the plane (x-y plane) of the spatial light modulator 48 at all positions across the light control film 700.

The angular profile of the light control film 700 is determined by the absorption of the material of the absorptive regions 702, the thickness d of the absorptive regions 702 and the widths $S_{IN}$, $S_{OUT}$ of the apertures 716, 718. In the arrangement of FIG. 20C, the light control film 700 has a transmittance that has a profile with polar angle in a direction in which the array of transmissive regions repeats (x-axis) that is centred on the normal to the plane (x-y plane) of the spatial light modulator 48 at all positions across light control film.

In the embodiment of FIG. 20C, light absorbing region 704 do not extend between the input side and output side 706, 708 of the light control film. Rather, a layer 709 of transmissive material may be provided across the light control film. Such a layer may provide support for the light transmissive regions 704 during fabrication and may alternatively comprise a passive compensation retarder 330, a liquid crystal retarder 301 or a polariser 310, 318. Advantageously cost and complexity may be reduced.

Figure 20D:
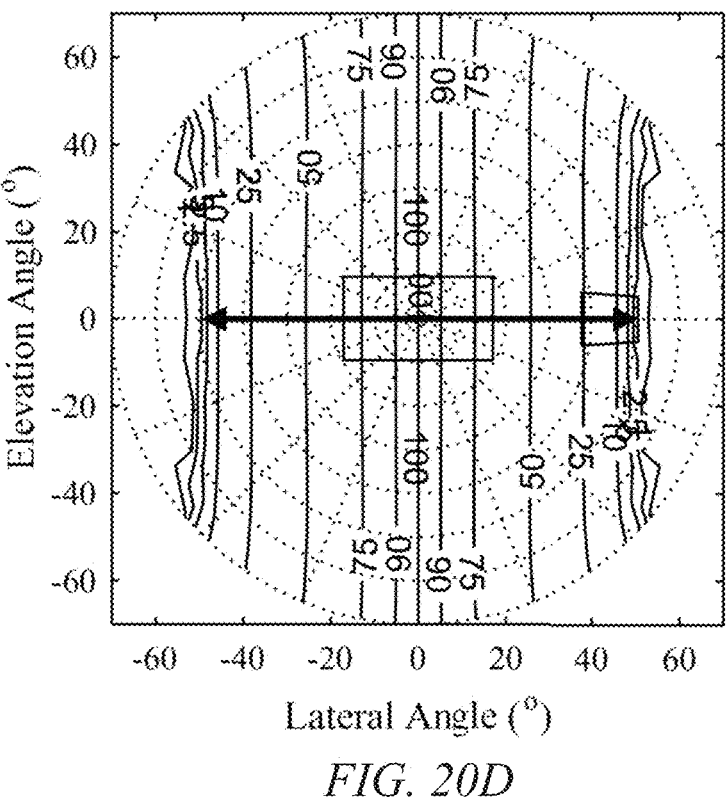
FIG. 20D is a schematic graph illustrating the polar variation of transmission for an illustrative light control film of FIG. 20C.

FIG. 20D is a schematic graph illustrating the polar variation of transmission for an illustrative light control film 700 of FIG. 20C. Advantageously off-axis luminance from the view angle control element 102 of FIG. 20B may be reduced.

Figure 20E:
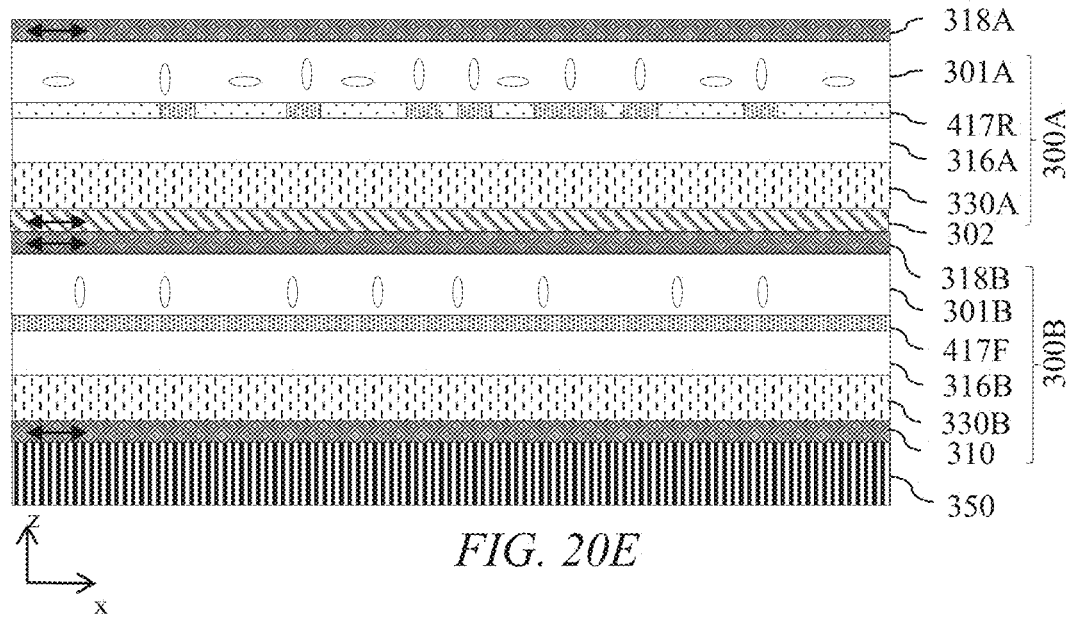
FIG. 20E is a schematic diagram illustrating a side view of a view angle control element comprising a liquid crystal retarder comprising a mark arranged between an additional polariser and further additional polariser; and a further polar control retarder for arrangement between a spatial light modulator output polariser and the further additional polariser and a light control film arranged in series.

FIG. 20E is a schematic diagram illustrating a side view of a view angle control element 102 comprising a liquid crystal retarder 301 comprising a mark 322 arranged between an additional polariser 318 and further additional polariser 318A; and a further polar control retarder 300B for arrangement between a spatial light modulator 48 output polariser 218 and the further additional polariser 318B and a light control film 700 arranged in series. Features of the embodiment of FIG. 20E not discussed in further detail may be assumed to correspond to the features with equivalent reference numerals as discussed above, including any potential variations in the features.

The embodiment of FIG. 20E may advantageously achieve further improvement in security factor along the axis 447 while achieving visibility of mark 322.

Various arrangements of display device 100 comprising a further view angle control element 103 will now be described.

Figure 21A:
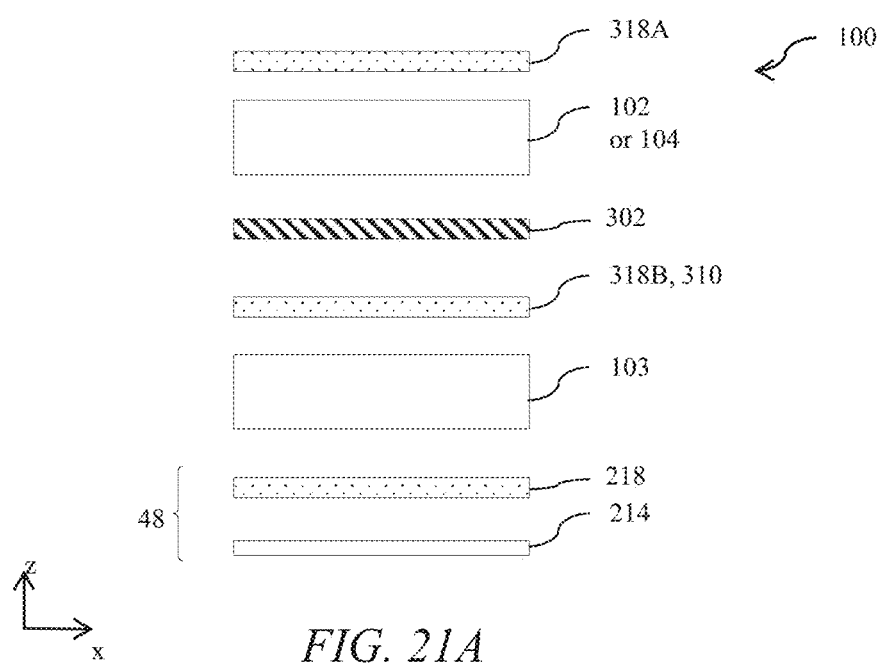
FIG. 21A and FIG. 21B are schematic diagrams illustrating a side view of a privacy display comprising a spatial light modulator, a view angle control element and a further view angle control element each arranged to receive light from the display output polariser.
Figure 21B:
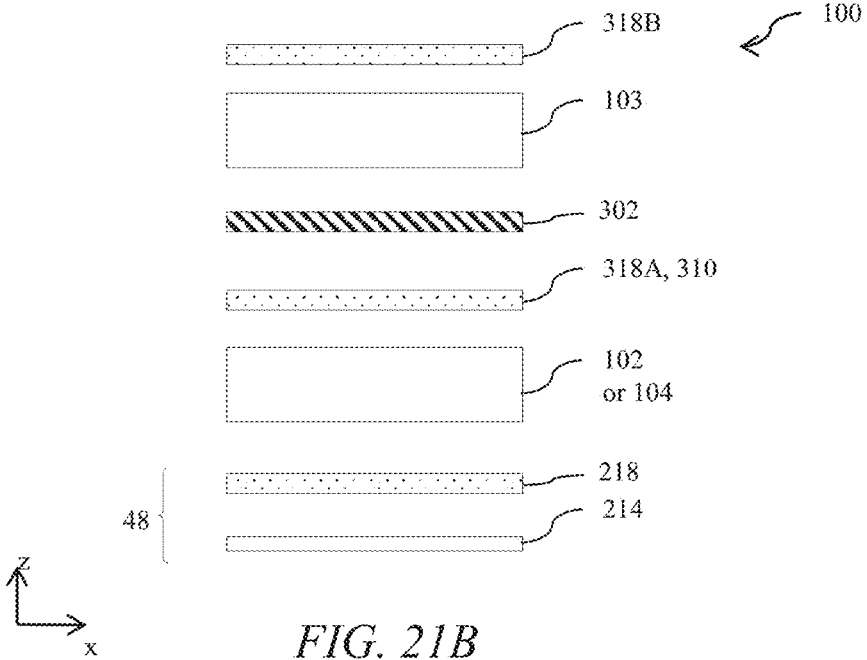

FIGS. 21A-B are schematic diagrams illustrating in side views privacy display devices 100 comprising a spatial light modulator, a view angle control element 102 and a further view angle control element 103 each arranged to receive light from the display output polariser 218. Features of the embodiments of FIGS. 21A-B not discussed in further detail may be assumed to correspond to the features with equivalent reference numerals as discussed above, including any potential variations in the features.

In comparison to FIG. 1A, in the alternative embodiments of FIGS. 21A-B, a further view angle control element 103 provides further suppression of transmission for off-axis viewing directions 447. Advantageously security factor may be increased. The view angle control element 103 may comprise a mark 322 so that two different marks 322A, 322B may be provided with different visibility in directions 447. Advantageously security factor, S may be increased, and more complex mark 322 appearance obtained. Spatial light modulators 48 that have wide distributions of light output may be used with desirable security factor, S in direction 447.

In comparison to the embodiment of TABLE 1, advantageously no voltage is applied during manufacture. Advantageously cost and complexity of manufacture is increased.

mark for an observer 45 near the direction 445 may be reduced and image uniformity improved.

A passive retarder for use in the further view angle control element 103 will now be described.

Figures 22A, 22B, 23A:
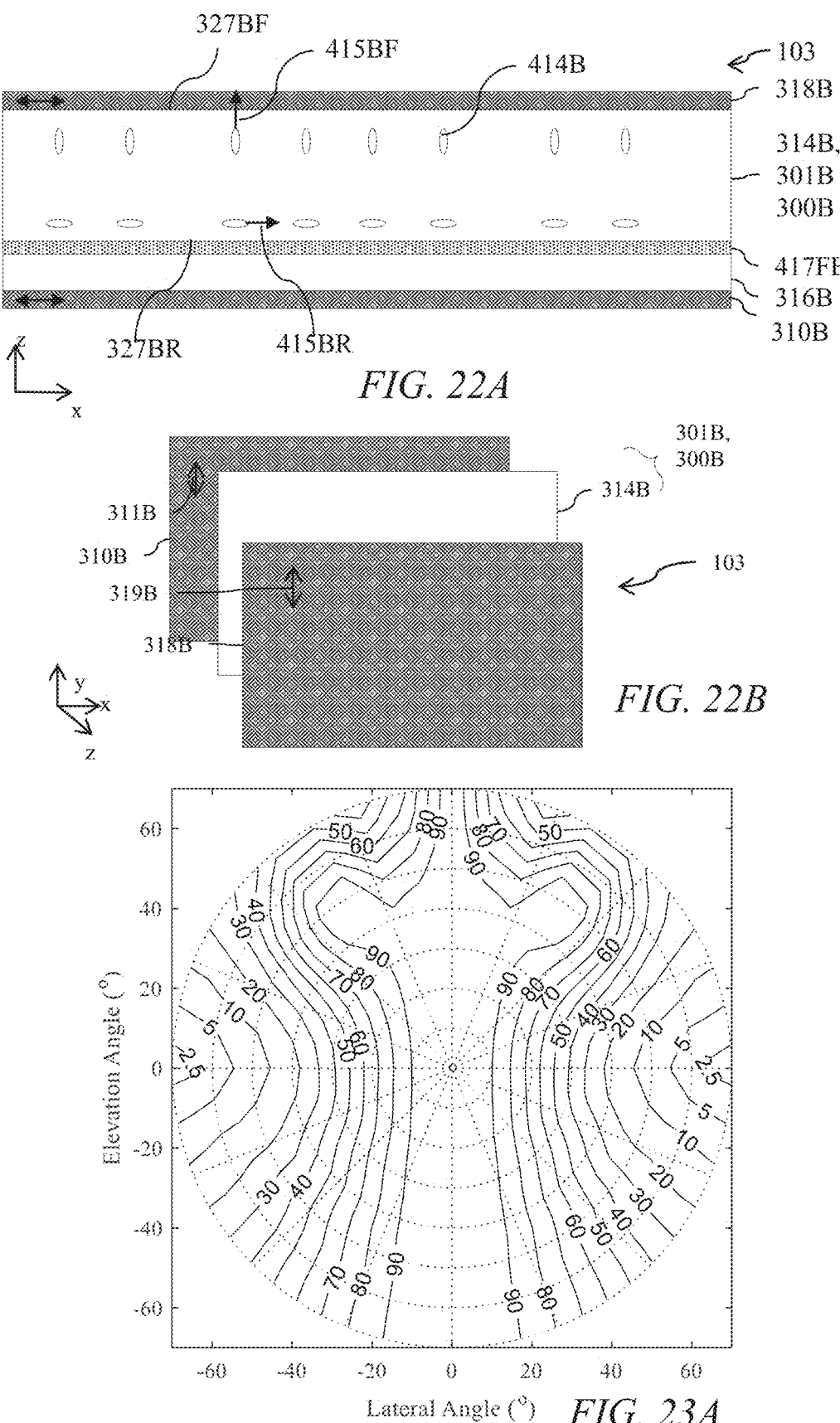
FIG. 22A is a schematic diagram illustrating a side view of a view angle control element comprising a uniform liquid crystal retarder not comprising a mark arranged between a further first polariser and a further additional polariser.
FIG. 22B is a schematic diagram illustrating a front view of the alternative further view angle control element of FIG. 22A.
FIG. 23A is a schematic graph illustrating the polar variation of transmission for a view angle control element of TABLE 8 and of FIG. 16A or FIG. 22B in the at least one region of the layer of liquid crystal material.

FIG. 22A is a schematic diagram illustrating a side view of a view angle control element 103 comprising a uniform layer 314B of liquid crystal material 414B not comprising a mark arranged between a further first polariser 310B and a further additional polariser 318B; and FIG. 22B is a schematic diagram illustrating a front view of the alternative further view angle control element 103 of FIG. 22A. Features of the embodiments of FIGS. 22A-B not discussed in further detail may be assumed to correspond to the features with equivalent reference numerals as discussed above, including any potential variations in the features.

By way of comparison with view angle control element 102 of the embodiments hereinabove, the further view angle control element 103 of FIGS. 22A-B may be uniform across the area of the display, that does not comprise a mark. An illustrative embodiment for the further view angle control element 103 is given in TABLE 8. Illustrative embodiments for the view angle control element 102 are given in TABLE 1 or in embodiments of view angle control element 102 with a mark 322 as described elsewhere herein.

TABLE 8

| Item | | Alignment type | LC layer 314B retardance | In-plane angle θ | Out of plane angle η | Voltage during manufacture |
|---|---|---|---|---|---|---|
| 103 | 415BR | Homogeneous | +4000 nm | $\theta_R = 90°$ | $\eta_R = 2°$ | 0 V |
| | 415BF | Homeotropic | {+1500~+5000 nm} | | | |
| | | | (+1000 nm~+6000 nm) | $\theta_F = 270°$ | $\eta_F = 88°$ | |
| | 330 | | Not present | | | |

Figures 21C, 21D, 21E:
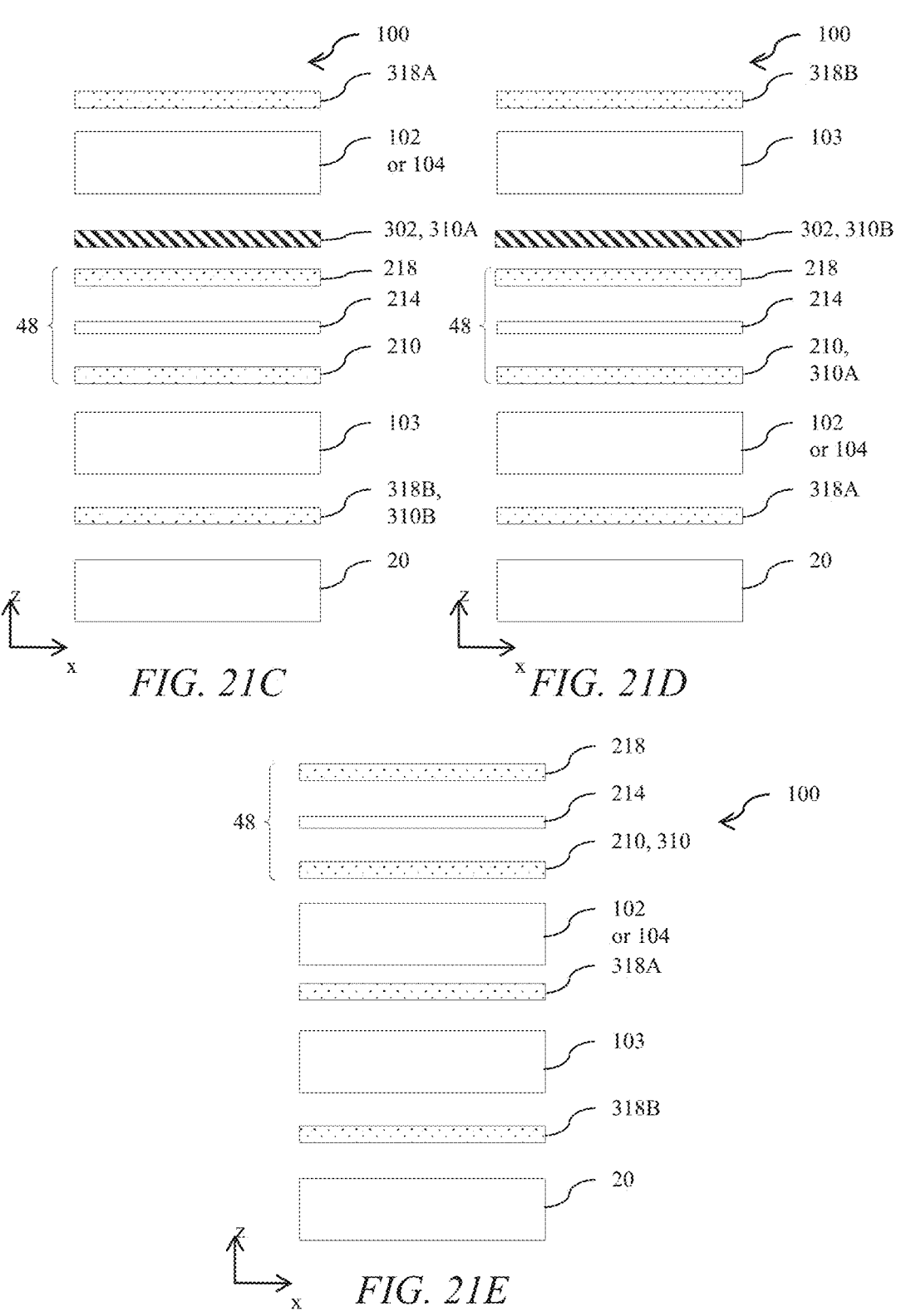
FIG. 21C is a schematic diagram illustrating a side view of a privacy display comprising a transmissive spatial light modulator illuminated by a backlight comprising a view angle control element arranged to receive light from the display output polariser and a further view angle control element arranged between the backlight and the spatial light modulator.
FIG. 21D is a schematic diagram illustrating a side view of a privacy display comprising a transmissive spatial light modulator illuminated by a backlight comprising a further view angle control element arranged to receive light from the display output polariser and a view angle control element arranged between the backlight and the spatial light modulator.
FIG. 21E is a schematic diagram illustrating a side view of a privacy display comprising a transmissive spatial light modulator illuminated by a backlight comprising a view angle control element arranged between the display input polariser and the additional polariser and a further view angle control element arranged between the additional polariser and a further additional polariser.

FIG. 21C is a schematic diagram illustrating a side view of a privacy display device 100 comprising a transmissive spatial light modulator 48 illuminated by a backlight 20 comprising a view angle control element 102 arranged to receive light from the display output polariser 218 and a further view angle control element 103 arranged between the backlight 20 and the spatial light modulator 48; FIG. 21D is a schematic diagram illustrating a side view of a privacy display device 100 comprising a transmissive spatial light modulator 48 illuminated by a backlight 20 comprising a further view angle control element 103 arranged to receive light from the display output polariser 218 and a view angle control element 102 arranged between the backlight 20 and the spatial light modulator 48; and FIG. 21E is a schematic diagram illustrating a side view of a privacy display device 100 comprising a transmissive spatial light modulator 48 illuminated by a backlight 20 comprising a view angle control element 102 arranged between the display input polariser 210 and the additional polariser 318A and a further view angle control element 103 arranged between the additional polariser 318A and a further additional polariser 318B. Features of the embodiments of FIGS. 21C-E not discussed in further detail may be assumed to correspond to the features with equivalent reference numerals as discussed above, including any potential variations in the features.

In comparison to FIGS. 21A-B, in the alternative embodiments of FIGS. 21C-E, a backlight 20 with reduced off-axis luminance may be provided, advantageously increasing security factor in direction 447. In FIG. 21C, the mark 322A may be provided with high reflectivity in direction 447. By comparison in FIGS. 21D-E, the mark may have reduced visibility in direction 447. Advantageously visibility of the TABLE 8 illustrates an embodiment of a further view angle control element 103 for arrangement outside a further first polariser 310B that is a linear polariser, the further view angle control element 103 comprising a further additional polariser 318B, the further additional polariser 318B being a linear polariser; and a further polar control retarder 300B for arrangement between the further first polariser 310B and the further additional polariser 318B, the further polar control retarder 300B including a further passive liquid crystal retarder 301B comprising a further layer 314B of liquid crystal material 414B; wherein the further layer 314B of liquid crystal material 414B has director directions 415BR, 415BF at surfaces disposed 327BR. 327BF adjacent to the further layer 314B of liquid crystal material 414B and on opposite sides thereof that are homogenous at one of the surfaces 327BR and homeotropic at the other of the surfaces 327BF; and no passive compensation retarder.

As illustrated in TABLE 8, the layer 314B of liquid crystal material 414B has a retardance for light of a wavelength of 550 nm in a range from 1000 nm to 6000 nm, preferably in a range from 1500 nm to 5000 nm and most preferably in a range from 3500 nm to 4500 nm. The further first polariser 310B and the further additional polariser 318B have electric vector transmission directions 311B, 319B that are parallel.

The embodiment of TABLE 8 alters the phase of the polarisation state of light propagating in the non-viewing direction wherein the retardance of the splayed layer 314 of liquid crystal material 414 provides adiabatic retardance properties. In comparison to a conventional A-plate retarder for example, such adiabatic retardance properties has reduced variation of colour change for transmitted light, that is the change in the colour coordinate is smaller. In other words, in the liquid crystal alignment of TABLE 8, and for example as illustrated in FIG. 1E, in the thickness direction $\hat{t}$ through the layer 314 of liquid crystal material 414, a gradual layer-by-layer change in tilt of optical axis direction 415 from 2° to 88° occurs. In operation, such layer-by-layer change of optical axis direction 415 does not operate as a uniform O-plate, advantageously achieving reduced chromatic variation with viewing angle of the transmission profile.

By way of comparison to display devices that are arranged to provide switching between a transmission profile with high transmission in the non-viewing direction 447 and reduced transmission in said non-viewing direction 447, in the present embodiments which are not switched, the arrangement of TABLE 8 does not use a passive compensation retarder 330. Advantageously cost, complexity and thickness is reduced. Further, a colour change of the passive compensation retarder 330 is not present. In operation, the alternative embodiment of TABLE 8 for use in the view angle control element 102 with a mark 322 or further view angle control element 103 that may be uniform has reduced colour change. Advantageously the change of display colour with viewing angle is reduced.

In alternative embodiments, the further view angle control element 103 may comprise other arrangements of layer 314 of liquid crystal material 414 comprising different alignments for example as described elsewhere herein.

The further view angle control element 103 may be provided by a view angle control element 102 or a switchable view angle control element 104 that may comprise switchable polar control retarders, for example as illustrated in TABLE 9 or as described in U.S. Pat. Nos. 10,126,575; 10,303,030; 10,976,578; and 11,092,851; all of which are herein incorporated by reference in their entireties. Advantageously a display that is switchable between a privacy mode and a share mode of operation may be provided.

In a privacy mode of operation, observer 47 in direction 447 may observe an image with high image security. In a switched share mode of operation, observers in directions 445L, 445R may view the display with high image visibility. Advantageously a switchable privacy display device 100 may be provided.

It may be desirable to provide a privacy display device with both a fixed mark 322 and also a switchable mark 1322.

Figure 24:
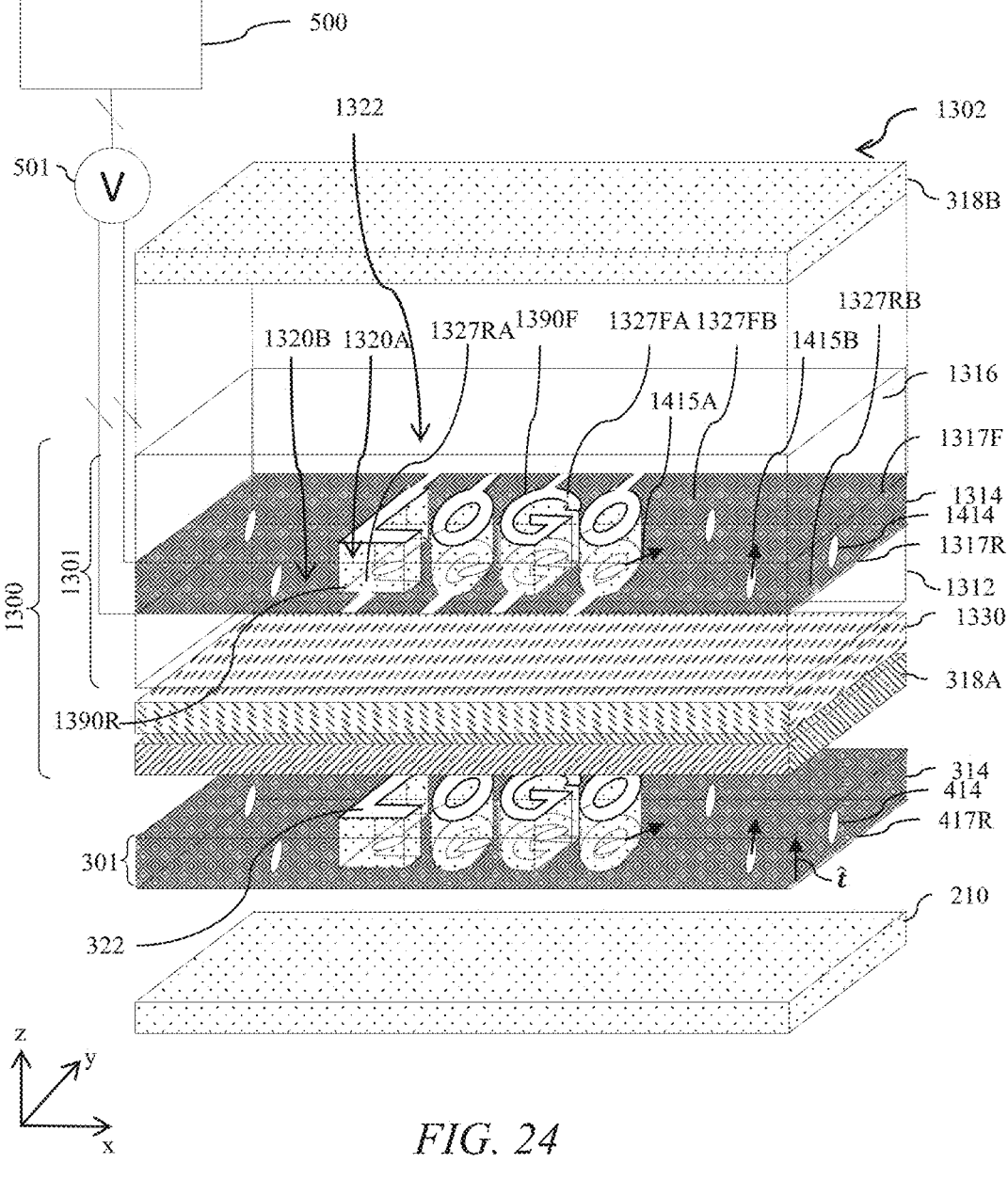
FIG. 24 is a schematic diagram illustrating a front perspective view of a switchable view angle control element comprising: a display polariser: a passive liquid crystal retarder comprising a mark; an additional polariser; and a switchable polar control retarder comprising a uniform passive retarder 1330, and a liquid crystal polar control retarder comprising patterned electrodes; and a further additional polariser.

FIG. 24 is a schematic diagram illustrating a front perspective view of a switchable view angle control element 1302 comprising: a display polariser 210: a passive liquid crystal retarder 301 comprising a mark 322; an additional polariser 318A; and a switchable polar control retarder 1300 comprising a uniform passive retarder 1330, and a liquid crystal polar control retarder 1301 comprising patterned electrodes 1317F. 1317R; and a further additional polariser 318B. Features of the embodiment of FIG. 24 not discussed in further detail may be assumed to correspond to the features with equivalent reference numerals as discussed above, including any potential variations in the features.

The structure and operation of the switchable polar control retarder 1300 comprising a switchable mark 1322 is described further in U.S. Pat. No. 11,892,717, which is herein incorporated by reference in its entirety. The switchable polar control retarder 1300 comprising the mark 1322 is different to the passive liquid crystal retarder 301 comprising a mark 322 of the present embodiments. In particular the passive liquid crystal retarder 301 advantageously achieves reduces cost, thickness and complexity in comparison to the switchable polar control retarder 1300.

Polar control retarder 1300 is arranged between the additional polariser 318A and further additional polariser 318B, the polar control retarder 1300 including a switchable liquid crystal retarder 1301 comprising a layer 1314 of liquid crystal material 414 arranged between substrates 1312, 1316

TABLE 9

| Item | Alignment type | LC layer 314A retardance | Passive compensation retarder 330 type & retardance | In-plane angle θ | Out of plane angle η | Voltage during operation |
|---|---|---|---|---|---|---|
| 104 417R | Homogeneous | 1000 nm | | $\theta_{RA} = 90°$ | $\eta_{RA} = 2°$ | 1.4 V (Privacy) |
| 417F | Homeotropic | | | $\theta_F = 270°$ | $\eta_F = 88°$ | 5 V (Share) |
| 330 | | | Negative C-plate −880 nm | | 90° | |

Figures 23B, 23C:
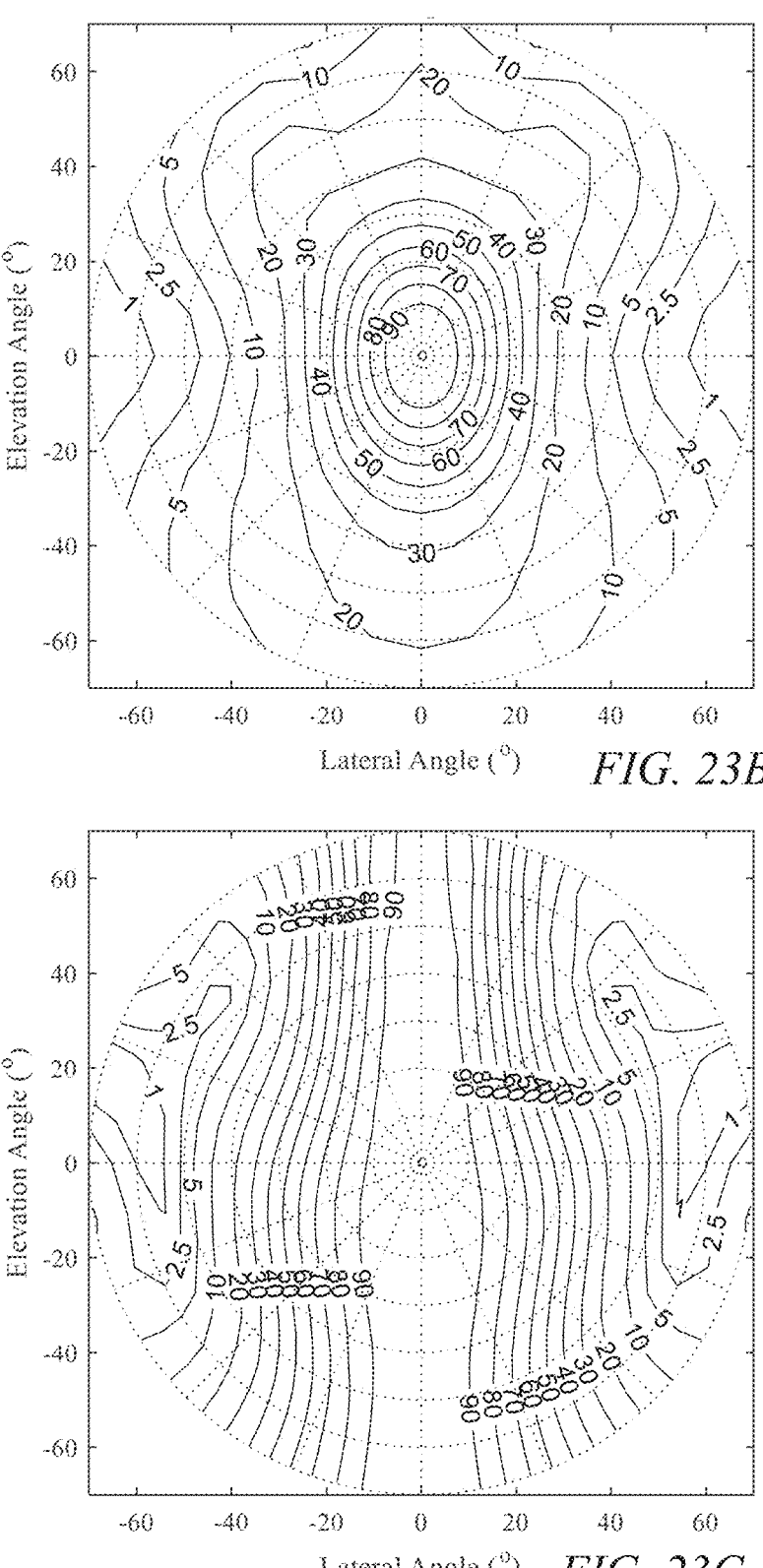
FIG. 23B is a schematic graph illustrating the polar variation of luminous intensity for a wide angle backlight combined with the transmission profile of FIG. 23A.
FIG. 23C is a schematic graph illustrating the polar variation of transmission for a view angle control element of TABLE 9.
Figure 23D:
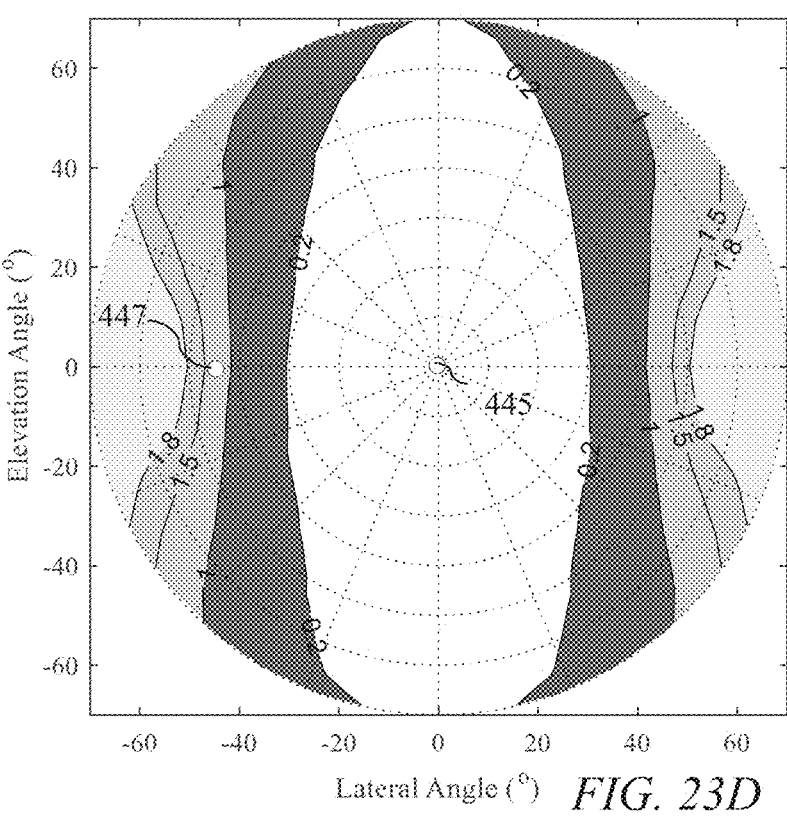
FIG. 23D is a schematic graph illustrating the polar variation of security factor for the luminous intensity profile of FIG. 23B and the polar control retarder of TABLE 9 in privacy mode of operation.
Figure 23E:
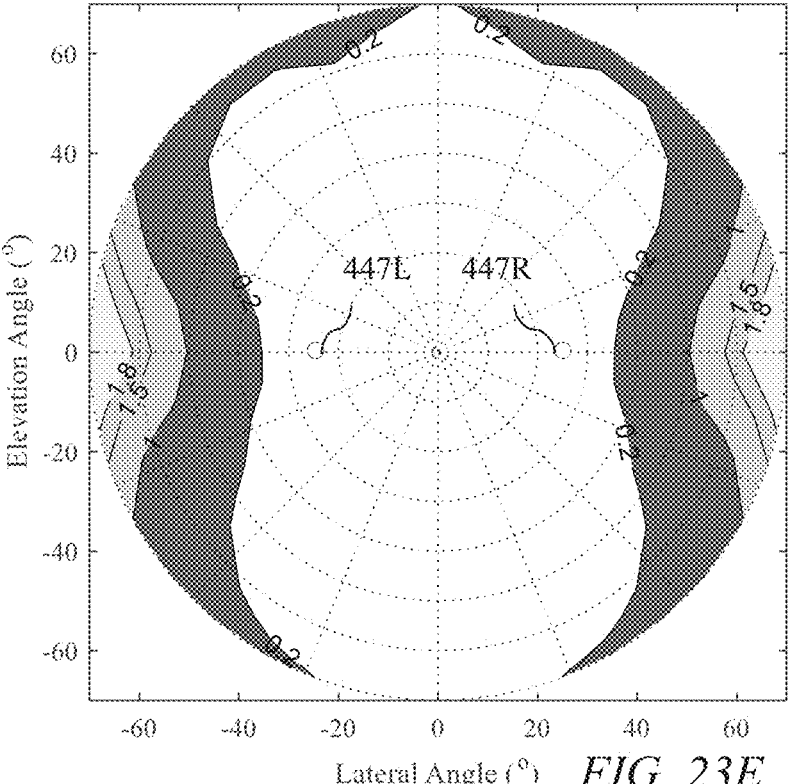
FIG. 23E is a schematic graph illustrating the polar variation of security factor for the luminous intensity profile of FIG. 23B and the polar control retarder of TABLE 9 in share mode of operation.

FIG. 23A is a schematic graph illustrating the polar variation of transmission for a view angle control element of TABLE 8 and of FIG. 16A or FIG. 22B in the at least one region of the layer of liquid crystal material; FIG. 23B is a schematic graph illustrating the polar variation of luminous intensity for a wide angle backlight combined with the transmission profile of FIG. 23A; FIG. 23C is a schematic graph illustrating the polar variation of transmission for a view angle control element of TABLE 9; FIG. 23D is a schematic graph illustrating the polar variation of security factor for the luminous intensity profile of FIG. 23B and the polar control retarder of TABLE 9 in privacy mode of operation; and FIG. 23E is a schematic graph illustrating the polar variation of security factor for the luminous intensity profile of FIG. 23B and the polar control retarder of TABLE 9 in share mode of operation. Features of the embodiment of FIGS. 23A-E not discussed in further detail may be assumed to correspond to the features with equivalent reference numerals as discussed above, including any potential variations in the features.

that are provided with transparent electrodes 1317F. 1317R arranged on opposite sides of the layer 1314 of liquid crystal material 414.

At least one of the first and second transmissive electrodes 1317F, 1317R is patterned in areas 1327A, 1327B separated by gaps 1390. In the embodiment of FIG. 24, the first transmissive electrode 1317F is patterned with areas 1327FA, 1327FB and the second transmissive electrode 1317R is patterned with areas 1327RA, 1327RB. The electrode 1317F comprises first and second areas 1327FA, 1327FB separated by gaps 1390F and the electrode 1317R comprises first and second areas 1327RA, 1327RB separated by gaps 1390R. In the embodiment of FIG. 24, the electrode 1317F is shown as between the electrode 1317R and the additional polariser 1318. In an alternative embodiment of FIG. 24 and in alternative embodiments of those described hereinbelow, the electrode 1317R may be arranged between the electrode 1317F and the additional polariser 1318.

The electrodes 1317F, 1317R provide plural addressable regions 1320A, 1320B of the layer 1314 of liquid crystal material 414, being plural addressable mark regions 1320A (or in a more general case at least one addressable mark region 1320A) in a shape of a mark 1322 for display to an off-axis observer 47, and plural addressable background regions 1320B in the shape of the background to the mark 1322 (i.e. the inverse of the mark 1322). In at least one of the modes of operation of the display device 100, the regions 1320A, 1320B are addressed with a desirable drive scheme, such that the alignment direction 415A of the liquid crystal material 414 in the mark region 1320A is different to the alignment direction 415B of the liquid crystal material 414 in the background region 1320B.

In the embodiment of FIG. 24, both of the first and second transmissive electrodes 1317F, 1317R are patterned with areas 1327FA, 1327FB, 1327RA, 1327RB that are in the shape of a mark 1322 that comprises the text 'LOGO'. More generally the mark 1322 may be an icon or text or some other graphical image.

The control system 500 is arranged to apply voltages across the first and second transmissive electrodes 1317F, 1317R for driving the layer 1314 of liquid crystal material 414.

The polar control retarder of FIG. 24 further comprises at least one passive compensation retarder 1330. Such passive compensation retarder 1330 may comprise C-plates, A-plates or combinations thereof and advantageously achieves an increased size of polar region over which reduced luminance and increased reflectivity can be achieved as will be described hereinbelow. The passive retarder 1330 is uniform across the switchable view angle control element 1300 and by way of comparison with the passive liquid crystal retarder 301 does not comprise a mark.

The display output polariser 210, additional polariser 318A and further additional polariser 318B may have electric vector transmission directions respectively that are parallel. Advantageously transmission efficiency is increased.

The structure and operation of the polar control retarder 1300, additional polariser 318 and reflective polariser is described in U.S. Pat. No. 11,092,851, which is herein incorporated by reference in its entirety.

Control system 500 is arranged to provide control of voltage driver 501 that is arranged to drive the voltage to the electrode areas 1327FA, 1327FB, 1327RA, 1327RB respectively, as will be described hereinbelow.

By way of comparison with the passive liquid crystal retarder 301 comprising a mark 322, the switchable polar control retarder 1300 comprising the mark 1322 is switchable between various modes, wherein in some modes the mark 1322 is not visible. Such marks 1322 may be different to the mark 322 so that additional mark information may be provided. Advantageously more complex mark information may be provided.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A view angle control element for arrangement outside a first polariser that is a linear polariser, the view angle control element comprising:

an additional polariser, the additional polariser being a linear polariser; and at least one polar control retarder for arrangement between the first polariser and the additional polariser, the at least one polar control retarder including a passive liquid crystal retarder comprising a layer of liquid crystal material, wherein the layer of liquid crystal material has at least one region in a shape of a mark for display to an observer arranged such that:

along a predetermined viewing axis, relative phase shifts are introduced to orthogonal polarisation components of light that are sufficiently small in the at least one region and the remainder of the layer of liquid crystal material that the mark is not visible; and along a non-viewing axis at a different angle from the viewing axis, relative phase shifts are introduced to orthogonal polarisation components of light that are different in the at least one region and the remainder of the layer of liquid crystal material such that the mark is visible;

wherein the layer of liquid crystal material has profiles of splay of the director directions across the thickness direction of the layer of liquid crystal material that are different in the at least one region and the remainder of the layer of liquid crystal material;

wherein the layer of liquid crystal material has director directions at surfaces on opposite sides of the layer of liquid crystal material in the at least one region that are one of: (a) homogenous at both surfaces; (b) homogenous at one of the surfaces and homeotropic at the other of the surfaces; or (c) homeotropic at both surfaces; and the layer of liquid crystal material has director directions at surfaces on opposite sides of the layer of liquid crystal material in the remainder of the layer of liquid crystal material are one of: (a) homogenous at both surfaces; (b) homogenous at one of the surfaces and homeotropic at the other of the surfaces; or (c) homeotropic at both surfaces, that is different from the at least one region.

2. A view angle control element according to claim 1, wherein the layer of liquid crystal material has director directions at surfaces on opposite sides of the layer of liquid crystal material that are homogenous at both surfaces in the at least one region and the remainder of the layer of liquid crystal material.

3. A view angle control element according to claim 2, wherein the director directions have twist across the thickness direction of the layer of liquid crystal material.

4. A view angle control element according to claim 1, wherein the layer of liquid crystal material has director directions at surfaces on opposite sides of the layer of liquid crystal material that are homeotropic at both surfaces in the at least one region and the remainder of the layer of liquid crystal material.

5. A view angle control element according to claim 1, wherein the layer of liquid crystal material has director directions at surfaces on opposite sides of the layer of liquid crystal material that are homogenous at one of the surfaces in the at least one region and the remainder of the layer of liquid crystal material and are homeotropic at the other of the surfaces in the at least one region and the remainder of the layer of liquid crystal material.

6. A view angle control element according to claim 1, where the liquid crystal material is a polymerised liquid crystal material.

7. A view angle control element according to claim 1, wherein the layer of liquid crystal material has director directions at surfaces on opposite sides of the layer of liquid crystal material that are the same in the at least one region and the remainder of the layer of liquid crystal material.

8. A view angle control element according to claim 1, further comprising electrodes arranged to apply independent control voltages across the layer of liquid crystal material in the at least one region and in the remainder of the layer of liquid crystal material, the electrodes not being connected to a control circuit of the view angle control element.

9. A view angle control element according to claim 8, wherein the electrodes are connected to each other by an electrical conductor.

10. A view angle control element according to claim 1, wherein the layer of liquid crystal material has thicknesses that are different in the at least one region and the remainder of the layer of liquid crystal material.

11. A view angle control element according to claim 1, wherein the at least one polar control retarder further comprises at least one passive compensation retarder.

12. A view angle control element according to claim 11, wherein the at least one passive compensation retarder comprises:

a single passive compensation retarder having an optical axis perpendicular to the plane of the passive compensation retarder;

a pair of passive compensation retarders on opposite sides of the passive liquid crystal retarder and having optical axes perpendicular to the plane of the passive compensation retarder; or a pair of passive compensation retarders on the same side of the passive liquid crystal retarder and having optical axes parallel to the plane of the passive compensation retarder that are crossed.

13. A view angle control element according to claim 1, wherein the at least one polar control retarder further comprises first and second quarter-wave plates, wherein the first quarter-wave plate is arranged on the opposite side of the at least one polar control retarder from the additional polariser and being arranged to convert a linearly-polarised polarisation state passed by the first polariser into a circularly-polarised polarisation state, and the second quarter-wave plate is arranged between the at least one polar control retarder and the additional polariser and is arranged to convert the circularly-polarised polarisation state into a linearly-polarised polarisation state that is passed by the additional polariser.

14. A view angle control element according to claim 1, wherein the predetermined viewing axis is normal to a plane of the view angle control element.

15. A view angle control element according to claim 1, wherein the mark is a symbol or logo or icon or text.

16. A view angle control element according to claim 1, wherein, in one or both of the at least one region and the remainder of the layer of liquid crystal material, the layer of liquid crystal material has director directions at surfaces on at least one side of the layer of liquid crystal material that have pretilt angles with components in a plane of the layer of liquid crystal material having orientations that change monotonically along a predetermined axis across at least part of a display device.

17. A view angle control element according to claim 1, further comprising a light control film, wherein the light control film comprises an input surface, an output surface facing the input surface, an array of transmissive regions extending between the input surface and the output surface, and absorptive regions between the transmissive regions and extend at least partway between the input surface and the output surface.

18. A view angle control element according to claim 1, wherein the additional polariser is a first additional polariser, the at least one polar control retarder is at least one first polar control retarder, and the view angle control element further comprises:

a further additional polariser, the further additional polariser being a linear polariser; and at least one further polar control retarder, wherein the further additional polariser and the at least one further polar control retarder are arranged on the opposite side of the at least one first polar control retarder from the first additional polariser with the further additional polariser between the at least one first polar control retarder and the at least one further polar control retarder.

19. A view angle control element according to claim 1, wherein the relative phase shifts introduced to orthogonal polarisation components of light along the non-viewing axis in both the at least one region and the remainder of the layer of liquid crystal material are greater than the relative phase shifts introduced to orthogonal polarisation components of light along the viewing axis in the at least one region and the remainder of the layer of liquid crystal material.

20. A view angle control element according to claim 1, being for use in a display device comprising a spatial light modulator arranged to output light and a display polariser arranged on a side of the spatial light modulator, the display polariser being the first polariser, the view angle control element being for arrangement on the same side of the spatial light modulator as the display polariser outside the display polariser.

21. A view angle control element according to claim 20, wherein the display polariser is an output polariser arranged on an output side of the spatial light modulator, the view angle control element being for arrangement on the output side of the spatial light modulator outside the display polariser.

22. A view angle control element according to claim 21, further comprising a reflective polariser arranged on the opposite side of the at least one polar control retarder from the additional polariser, the reflective polariser being a linear polariser.

23. A view angle control element according to claim 1, wherein the view angle control element further comprises the first polariser.

24. A view angle control element according to claim 23, wherein the first polariser is a reflective polariser.

25. A transparent sheet having the view angle control element according to claim 23 fixed thereto.

26. A view angle control element according to claim 1, further comprising:

a further view angle control element for arrangement outside a further first polariser that is a linear polariser, the further view angle control element comprising: a further additional polariser, the further additional polariser being a linear polariser; and a further polar control retarder for arrangement between the further first polariser and the further additional polariser, the further polar control retarder including a further passive liquid crystal retarder comprising a further layer of liquid crystal material.

27. A view angle control element according to claim 26, wherein the further layer of liquid crystal material has a retardance for light of a wavelength of 550 nm in a range from 1000 nm to 6000 nm, preferably in a range from 2000 nm to 5000 nm and most preferably in a range from 3000 nm to 4000 nm.

28. A display device comprising:

the view angle control element according to claim 1;

a spatial light modulator arranged to output light; and a display polariser arranged on a side of the spatial light modulator, the display polariser being the first polariser.

29. A display device according to claim 28, wherein the spatial light modulator is a transmissive spatial light modulator and the display device further comprises a backlight arranged to supply light to the spatial light modulator.

30. A display device according to claim 28, wherein the spatial light modulator is an emissive spatial light modulator, the display polariser is an output polariser arranged on an output side of the spatial light modulator and the view angle control element is arranged on the output side of the spatial light modulator outside the display polariser.

31. A display device according to claim 28, further comprising a further first polariser and a further additional polariser, wherein the further first polariser and the further additional polariser have electric vector transmission directions that are parallel.

32. A view angle control element for arrangement outside a first polariser that is a linear polariser, the view angle control element comprising:

an additional polariser, the additional polariser being a linear polariser; and at least one polar control retarder for arrangement between the first polariser and the additional polariser, the at least one polar control retarder including a passive liquid crystal retarder comprising a layer of liquid crystal material, wherein the layer of liquid crystal material has at least one region in a shape of a mark for display to an observer arranged such that:

along a predetermined viewing axis, relative phase shifts are introduced to orthogonal polarisation components of light that are sufficiently small in the at least one region and the remainder of the layer of liquid crystal material that the mark is not visible; and along a non-viewing axis at a different angle from the viewing axis, relative phase shifts are introduced to orthogonal polarisation components of light that are different in the at least one region and the remainder of the layer of liquid crystal material such that the mark is visible;

wherein the layer of liquid crystal material has profiles of splay of the director directions across the thickness direction of the layer of liquid crystal material that are different in the at least one region and the remainder of the layer of liquid crystal material;

wherein the layer of liquid crystal material has director directions at surfaces on opposite sides of the layer of liquid crystal material that are different in the at least one region and the remainder of the layer of liquid crystal material.

33. A view angle control element according to claim 32, wherein the director directions have pretilt angles with components out of a plane of the layer of liquid crystal material that are different in the at least one region and the remainder of the layer of liquid crystal material.

34. A view angle control element according to claim 32, wherein the director directions have pretilt angles with components in a plane of the layer of liquid crystal material that have different orientations in the at least one region and the remainder of the layer of liquid crystal material.

35. A view angle control element according to claim 32, further comprising an alignment layer disposed adjacent to the layer of liquid crystal material on one of the sides of the layer of liquid crystal material, the alignment layer being arranged to provide an alignment in the layer of liquid crystal material.

36. A view angle control element according to claim 35, wherein the alignment layer has different anchoring strengths in the at least one region and the remainder of the layer of liquid crystal material.

37. A view angle control element according to claim 35, further comprising a further alignment layer disposed adjacent to the layer of liquid crystal material on the other side of the layer of liquid crystal material, the further alignment layer being arranged to provide an alignment in the layer of liquid crystal material.

38. A view angle control element according to claim 35, further comprising an air gap adjacent to the layer of liquid crystal material on the other side of the layer of liquid crystal material.

39. A view angle control element for arrangement outside a first polariser that is a linear polariser, the view angle control element comprising:

an additional polariser, the additional polariser being a linear polariser; and at least one polar control retarder for arrangement between the first polariser and the additional polariser, the at least one polar control retarder including a passive liquid crystal retarder comprising a layer of liquid crystal material, wherein the layer of liquid crystal material has at least one region in a shape of a mark for display to an observer arranged such that:

along a predetermined viewing axis, relative phase shifts are introduced to orthogonal polarisation components of light that are sufficiently small in the at least one region and the remainder of the layer of liquid crystal material that the mark is not visible; and along a non-viewing axis at a different angle from the viewing axis, relative phase shifts are introduced to orthogonal polarisation components of light that are different in the at least one region and the remainder of the layer of liquid crystal material such that the mark is visible; and a further view angle control element for arrangement outside a further first polariser that is a linear polariser, the further view angle control element comprising: a further additional polariser, the further additional polariser being a linear polariser; and a further polar control retarder for arrangement between the further first polariser and the further additional polariser, the further polar control retarder including a further passive liquid crystal retarder comprising a further layer of liquid crystal material;

wherein the further layer of liquid crystal material has director directions at surfaces disposed adjacent to the further layer of liquid crystal material and on opposite sides thereof that are homogenous at one of the surfaces and homeotropic at the other of the surfaces; and comprises no passive compensation retarder.

40. A display device comprising:

a view angle control element for arrangement outside a first polariser that is a linear polariser, the view angle control element comprising:

an additional polariser, the additional polariser being a linear polariser; and at least one polar control retarder for arrangement between the first polariser and the additional polariser, the at least one polar control retarder including a passive liquid crystal retarder comprising a layer of liquid crystal material, wherein the layer of liquid crystal material has at least one region in a shape of a mark for display to an observer arranged such that:

along a predetermined viewing axis, relative phase shifts are introduced to orthogonal polarisation components of light that are sufficiently small in the at least one region and the remainder of the layer of liquid crystal material that the mark is not visible; and along a non-viewing axis at a different angle from the viewing axis, relative phase shifts are introduced to orthogonal polarisation components of light that are different in the at least one region and the remainder of the layer of liquid crystal material such that the mark is visible;

a spatial light modulator arranged to output light; and a display polariser arranged on a side of the spatial light modulator, the display polariser being the first polariser;

wherein the relative phase shifts introduced to orthogonal polarisation components of light along the non-viewing axis are sufficiently high that the operational image is not visible, when a security factor $S_n$ defined at the angle in question is, for at least one of the at least one region of the layer of liquid crystal material and the remainder of the layer of liquid crystal material, at least 1.0, where the security factor $S_n$ is given by the equation:

$$S_n = \log_{10}\left[1 + \rho_n \cdot \alpha/(\pi \cdot P_n)\right]$$

wherein:

$\rho_n$ is the reflectivity of the display device at the angle in question;

$P_n$ is the ratio of the luminance of the display device at the angle in question to the maximum luminance of the display device;

$\pi$ is a solid angle in units of steradians; and $\alpha$ is a factor having a value of 4.0 steradians.

* * * * *